US012114157B2

(12) United States Patent
Yoshino et al.

(10) Patent No.: US 12,114,157 B2
(45) Date of Patent: Oct. 8, 2024

(54) SERVICE START METHOD AND COMMUNICATION SYSTEM

(71) Applicant: NIPPON TELEGRAPH AND TELEPHONE CORPORATION, Tokyo (JP)

(72) Inventors: Manabu Yoshino, Tokyo (JP); Takashi Yamada, Tokyo (JP); Hiroo Suzuki, Tokyo (JP); Jun-Ichi Kani, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 28 days.

(21) Appl. No.: 17/255,354

(22) PCT Filed: Jun. 26, 2019

(86) PCT No.: PCT/JP2019/025466
§ 371 (c)(1),
(2) Date: Dec. 22, 2020

(87) PCT Pub. No.: WO2020/004498
PCT Pub. Date: Jan. 2, 2020

(65) Prior Publication Data
US 2021/0266742 A1 Aug. 26, 2021

(30) Foreign Application Priority Data
Jun. 29, 2018 (JP) .................................. 2018-125459

(51) Int. Cl.
*H04L 9/40* (2022.01)
*H04W 12/06* (2021.01)
*H04W 12/40* (2021.01)

(52) U.S. Cl.
CPC ....... *H04W 12/068* (2021.01); *H04L 63/0876* (2013.01); *H04W 12/40* (2021.01)

(58) Field of Classification Search
CPC ............... H04W 12/068; H04W 12/40; H04L 63/0876
See application file for complete search history.

(56) References Cited

U.S. PATENT DOCUMENTS 10,686,781 B1 * 6/2020 Kaditz ................ H04L 63/0853
2008/0232819 A1 * 9/2008 Mukai ..................... H04L 47/70
398/168

(Continued)

FOREIGN PATENT DOCUMENTS

EP 2887566 A1 6/2015
EP 3157223 A1 4/2017

(Continued)

OTHER PUBLICATIONS

"Basic Technical Course, GE-PON Technology, 4th, GE-PON Systematization Function", NTT Technology Journal, Nov. 2005.

*Primary Examiner* — Nelson S. Giddins

(57) ABSTRACT

A service start method is a service start method executed by a communication system, and the service start method includes: a step of acquiring identification information or authentication information of a device, a customer, or a service; a step of making authentication of the device, the customer, or the service to succeed when the identification information or the authentication information has been acquired together with information that is associated with the customer or a customer's location in advance, or when the identification information or the authentication information has been acquired from a terminal or a line that is associated with the customer in advance; and a step of starting provision of the service for the device for which the authentication has succeeded.

19 Claims, 16 Drawing Sheets

(56) References Cited

U.S. PATENT DOCUMENTS

| | | | |
|---|---|---|---|
| 2009/0269063 A1 | 10/2009 | Bernard et al. | |
| 2012/0185927 A1 | 7/2012 | Nors | |
| 2012/0294613 A1* | 11/2012 | Hood | H04Q 11/0067 398/67 |
| 2013/0163989 A1* | 6/2013 | Wu | H04J 14/0238 398/66 |
| 2013/0301481 A1 | 11/2013 | Inoue | |
| 2015/0334108 A1* | 11/2015 | Khalil | H04L 63/0815 726/8 |
| 2017/0353449 A1 | 12/2017 | Ohbitsu | |
| 2018/0083964 A1* | 3/2018 | Guo | H04L 63/1466 |
| 2018/0103341 A1* | 4/2018 | Moiyallah, Jr. | G06F 3/04842 |
| 2019/0243955 A1* | 8/2019 | Rome | G06F 21/46 |

FOREIGN PATENT DOCUMENTS

| | | | |
|---|---|---|---|
| JP | 2006352286 A | 12/2006 | |
| JP | 2011130251 A | 6/2011 | |
| JP | 2015173317 A | 10/2015 | |
| WO | WO-2012073404 A1 | 6/2012 | |
| WO | WO-2016143027 A1 | 9/2016 | |

* cited by examiner

SERVICE START METHOD AND COMMUNICATION SYSTEM

CROSS-REFERENCE TO RELATED APPLICATIONS

This application is a 371 U.S. National Phase of International Application No. PCT/JP2019/025466 filed on Jun. 26, 2019, which claims priority to Japanese Application No. 2018-125459 filed on Jun. 29, 2018. The entire disclosures of the above applications are incorporated herein by reference.

TECHNICAL FIELD

The present invention relates to a service start method and a communication system.

Priority is claimed on Japanese Patent Application No. 2018-125459, filed Jun. 29, 2018, the content of which is incorporated herein by reference.

BACKGROUND ART

A passive optical network (PON) system, which is one of the optical access systems, is a system in which an optical line terminal (OLT) and a plurality of optical network units (ONUs) are connected via an optical distribution network (ODN). The optical distribution network has passive elements, such as optical splitters and optical fibers.

The Ethernet passive optical network (EPON) system and the 10 gigabit Ethernet (10GE)-PON system are systems in which a physical interface and a communication control protocol between the OLT and the ONUs, and the like are standardized in accordance with IEEE802.3ah, IEEE802.3av, or the like. The broadband passive optical network (BPON) system, the gigabit passive optical network (GPON) system, the 10 gigabit-capable symmetric (XGS)-PON system, and the next-generation passive optical network 2 (NGPON2) system are systems that are standardized in accordance with ITU-T Recommendation G.983-9 series or the like.

The OLT is installed in a telephone central office or the like. The OLT is connected to the ONUs via the ODN and executes monitoring and control of the ONUs. The OLT is connected to the upper network. The ONUs are installed in customer premises, in customer building premises, or in the vicinity of customers. The ONUs are connected to the OLT and also to terminals of customers.

In communication in, for example, IEEE802.3ah, a point-to-multipoint discovery (P2MP discovery) function identifies logical links between the OLT and the ONUs on the basis of logical link identifiers (LLIDs). The logical links, which are also units of monitoring and control, are set up between the OLT and the ONUs, thereby the terminals of the customers can communicate with the upper network.

In the PON system, an authentication apparatus involved in authentication of a device, a customer, or a service, holds information necessary for authenticating the device (e.g., an ONU), the customer, or the service. The authentication apparatus authenticates a device, a customer, or a service on the basis of information unique to the device or the customer (hereinafter referred to as "identification information") (hereinafter also referred to as "authentication information"). The identification information or the authentication information is transmitted from the device toward the OLT. The identification information or the authentication information is, for example, a media access control (MAC) address of a device, a serial number of a device, a customer identification (ID), a password, a private key or public key corresponding to the device or the customer, a value that is generated based thereon (a generated hash value, an encrypted value), or the like. The authentication apparatus makes authentication of the device, the customer, or the service to succeed if the information necessary for the authentication of the device, the customer, or the service matches unique information transmitted from the device to the OLT.

When the authentication of the device, the customer, or the service has succeeded, the OLT enables the upper network and the customer to communicate via the ONU and the OLT, on the basis of information related to the service that has been set in the OLT in advance.

A device (e.g., an ONU) that is mistakenly connected to the PON system may be able to illegally access the PON system. For this reason, if it is not confirmed that the device is a legitimate device (a device of a legitimate customer), an authentication function that does not permit communication even if a logical link is established, will be necessary for authentication of a device and/or the opening of a line and/or a service via the device.

For authentication of ONUs in an EPON system, a mechanism (a mechanism such as IEEE802.1X standard) that can install an authentication function, such as a password authentication protocol (PAP), a challenge handshake authentication protocol (CHAP), and transport layer security (TLS), may be used. The IEEE802.1X standard defines an extensible authentication protocol (EAP) frame and a control method thereof. The EAP frame can also be used in EPON systems (see Non-Patent Document 1).

PRIOR ART DOCUMENT

Non-Patent Document

Non-patent document 1: "Basic Technical Course, GE-PON Technology, 4th, GE-PON Systematization Function", NTT Technology Journal, 2005.11.

SUMMARY OF THE INVENTION

Problems to be Solved by the Invention

For example, an on-site worker of a telecommunications carrier registers identification information or authentication information in an authentication apparatus. The authentication apparatus is arranged in at least one of the inside of the OLT or the outside of the OLT (e.g., a controller). When the authentication apparatus is arranged in the inside of the OLT, at the customer premises, an off-site worker of the telecommunications carrier installs a device (e.g., an ONU) and sets unique information. The off-site worker of the telecommunications carrier associates the unique information with customer information. In this case, the on-site worker of the telecommunications carrier needs to notify the OLT of the associated information. The telecommunications carrier needs to cause the on-site worker and the off-site worker to work in this way. The off-site worker of the telecommunications carrier performs the association and the notification at, for example, the customer premises. In this case, the off-site worker of the telecommunications carrier brings out at least a part of the customer information to the outside of the site.

At the time of an opening operation of the device installed in the customer premises, the on-site worker and the off-site worker perform their respective duties, and thus it is difficult to reduce the man-hours required for the on-site worker and the off-site worker to work. In addition, in the opening operation of the device, it is difficult to shorten the working times of the on-site worker and the off-site worker because a waiting time for the work is required.

Similarly, also for replacement of a failed device (e.g., an ONU), a change operation in which the on-site worker re-registers the device in the OLT, an operation in which the off-site worker replaces the device, and an operation in which the off-site worker or the on-site worker associates unique information with customer information are necessary to replace the device. In addition, the off-site worker may mistakenly install the device in an inappropriate customer premises.

For example, the on-site worker associates identification information of the device with customer information at a logistics center (a delivery center) or the like. The on-site worker notifies the off-site worker of the associated information by using a written directive or the like. It is necessary to cause the on-site worker to work in this way. There is a risk that the device will be installed in an inappropriate customer premises as a result of erroneous dispatch or pilferage of the device required for service. As a result of the pilferage of the associated information, there is a possibility that an inappropriate ONU that spoofs a legitimate ONU may illegally access the PON system. Since the device is delivered after the identification information of the device and the customer information are associated with each other and the device is installed after the delivery of the device is completed, a margin of a waiting time of the work is required and it is difficult to shorten the work time.

In this case, since the on-site worker associates the unique information (identification information or authentication information) with the customer information in the logistics center, the combination of the unique information and the customer information also becomes known in the logistics center. As the number of places where information becomes known increases, the risk of leakage of the customer information increases.

Similarly, regarding the transfer of a device (e.g., an ONU), a change operation in which the on-site worker re-registers the device in the OLT, an operation in which the off-site worker or the customer replaces the device, and an operation in which the off-site worker or the on-site worker associates the unique information and the customer information with a new installation site, are necessary to replace the device.

In this way, the conventional communication system has a problem in that it is not possible to reduce the operating man-hours of workers of the telecommunications carrier in regard to the service start of a communication system, especially an optical access system, and failure repair.

In view of the above circumstances, it is an object of the present invention to provide a service start method and a communication system capable of reducing the operating man-hours of workers of a telecommunications carrier in regard to the service start of a communication system, especially an optical access system, and failure repair.

Means for Solving the Problems

One aspect of the present invention is a service start method executed by a communication system, and the service start method includes: a step of acquiring identification information or authentication information of a device, a customer, or a service; a step of making authentication of the device, the customer, or the service to succeed when the identification information or the authentication information together with information that is associated with the customer or a customer's location in advance has been acquired, or when the identification information or the authentication information has been acquired from a terminal or a line that is associated with the customer or the customer's location in advance; and a step of starting provision of the service for the device or the customer for which the authentication has succeeded.

Thereby, the communication system can discriminate the customer and authenticate the device or the like on the basis of the fact that the communication system has received the identification information or the authentication information of the device and the information that is associated with the customer or the customer's location in advance together, without registering the identification information or the authentication information of the device in association with the customer in advance. The communication system can discriminate the customer and authenticate the device or the like on the basis of the fact that the communication system has received the identification information or the authentication information of the device from the terminal or the line that is associated with the customer in advance, without registering the identification information or the authentication information of the device in association with the customer in advance. For example, when a service is ordered, the communication system associates the customer with an identifier such as a telephone number or a serial number of a terminal (e.g., a mobile phone) or a line. The communication system receives the identification information or the authentication information of the device from the terminal or the line that is associated with the customer in advance. Thereby, the communication system can indirectly associate the identification information or the authentication information of the device with the customer via the terminal or the line that is associated with the customer in advance. The communication system associates the identification information or the authentication information of an installation location (e.g., an optical outlet) with the customer's location in advance. The format of the identification information or the authentication information of the installation location is, for example, the format of a quick response (QR) code (registered trademark; the same applies hereinafter). The format of the identification information or the authentication information of the installation location may be, for example, the format of a near field communication (NFC) tag, such as a radio frequency identifier (RFID) or Felica (registered trademark; the same applies hereinafter). The communication system transmits the identification information or the authentication information of the device and the identification information or the authentication information of the installation location within a predetermined time. Thereby, the communication system can indirectly associate the identification information or the authentication information of the device with the customer via the identification information or the authentication information of the associated installation location. In the following, the identification information or the authentication information is represented by using a QR code as an example.

It should be noted that the association between the identification information or the authentication information of the device and the customer may be validated if the temporal deviation is within an allowable range. When a third party visits or sneaks into the customer home, there is a possibility that the third party will capture information such as a QR code of the device with a camera. From the viewpoint of preventing either the information such as a QR code or the information acquired by the off-site worker in the past from being used, it is desirable that the information such as a QR code should be encrypted in a format in which the time is specified using, for example, TOTP (RFC 6238), which is a time-based one-time password.

Thereby, the communication system has an advantageous effect of making it easy to prevent erroneous delivery and/or pilferage of devices.

Advantageous Effect of the Invention

According to the present invention, it is possible to reduce the operating man-hours of workers of a telecommunications carrier in regard to the service start of a communication system, especially an optical access system, and failure repair.

MODES FOR CARRYING OUT THE INVENTION

Embodiments of the present invention will be described in detail with reference to the drawings.

In the embodiments described below, a communication system receives identification information or authentication information of a device, a customer, or a service via an authenticated or associated line or terminal. The communication system trusts the identification information or the authentication information of the device, the customer, or the service on the basis of the trustworthiness of the authenticated or associated line or terminal. The communication system successfully authenticates the device, the customer, or the service on the basis of the trusted identification information or authentication information. The line may be a line of a mobile phone of a customer or the like, a virtual private network (VPN) or the like provided from the central office, or a line authenticated using a public distributed ledger or the like (e.g., a block chain). The identification information or the authentication information may be registered in the public distributed ledger.

The authenticated or associated line (an optical line, etc.) or terminal (a mobile phone, etc.) is preferably the customer's own line or terminal associated with the device or service to be authenticated.

The authenticated or associated line may be a line other than that of the customer associated with the device or the service to be authenticated. The authenticated or associated terminal may be a terminal of a customer other than the customer associated with the device or service to be authenticated. It is desirable that the customer other than the customer associated with the device or service to be authenticated should be, for example, a person with parental authority of the customer, a family member of the customer, a conservator of the customer, an agent of the customer, a contracted individual, or a contracted corporation that is associated with the device or service to be authenticated.

Figure 1:
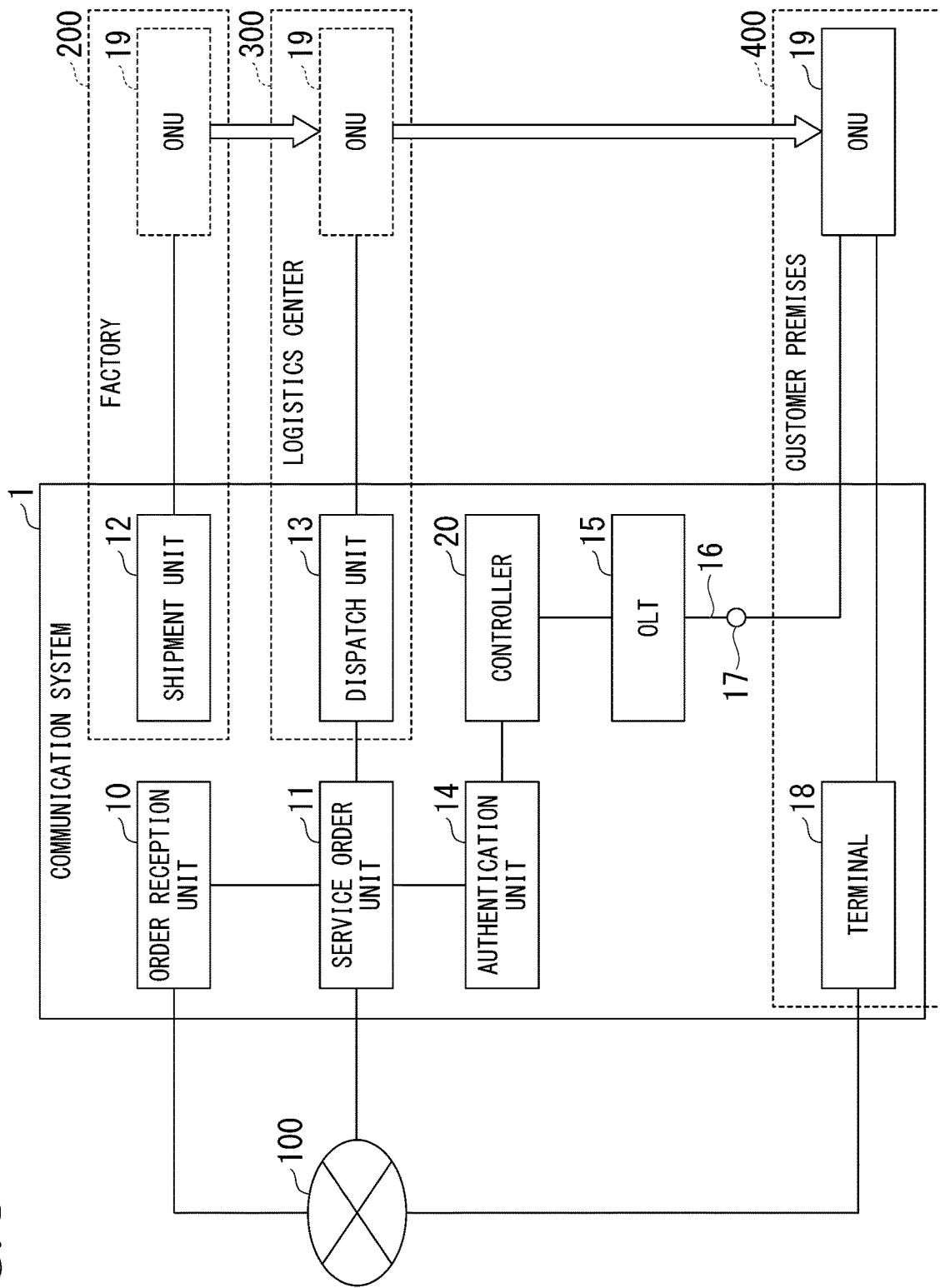
FIG. 1 is a diagram showing a first example of the configuration of a communication system.

FIG. 1 is a diagram showing an example of the configuration of a communication system 1. The communication system 1 includes an order reception unit 10, a service order unit 11, a shipment unit 12, a dispatch unit 13, an authentication unit 14, an OLT 15, an optical fiber 16, an optical branch network 17, a terminal 18, and a controller 20.

The communication system 1 is a system that authenticates ONUs 19. Here, authentication is confirmation that opening of a line, opening of a service, registration of a device, or the like is allowed. In the following, authentication is not limited to registration by means of normal authentication of an ONU by an OLT. For example, when the OLT is controlled by a controller that only performs flow control, does not authenticate the ONU by means of a separate authentication function, and registers the ONU when there is a registration request from the ONU, the following may correspond to registration by authentication.

By not assigning a bandwidth for conducting user traffic flowing through a link via the ONU and the OLT until authentication, provision of the service is not actually started even if the ONU is registered. By not conducting the user traffic to a link, a channel, a virtual local area network (VLAN), or a route that is not permitted to connect, provision of the service is not actually started even if the ONU is registered. By not assigning or activating the link, the channel, the VLAN, or the route through which the user traffic is conducted, provision of the service is not actually started even if the ONU is registered.

In these states, when a bandwidth and/or connection for conducting the user traffic flowing through the link via the ONU and the OLT has been assigned, provision of the service is started. When a bandwidth to which the input/output of the channel at the time of registration of the ONU are connected has been assigned to the channel, the link, the VLAN, or the route that is conducting, provision of the service is started. When the input/output of the channel at the time of registration of the ONU conducts a gateway, a firewall, an upper switch, or a router, provision of the service is started. The channel, the link, the VLAN, and/or the route themselves may be assigned or activated instead of assigning the bandwidth, and blocking by, for example, user policy control (UPC), a shaper, and/or a gateway in the middle of the route may be canceled. In the following, such processing is also included in a trigger for start of the service by the authentication.

Some or all of the functional units of the communication system 1 are realized by using hardware, such as large scale integration (LSI) and/or an application specific integrated circuit (ASIC). Some or all of the functional units may be realized by a processor, such as a central processing unit (CPU) executing a program stored in a memory. Each functional unit may include a non-volatile recording medium (a non-transitory recording medium), such as a flash memory or a hard disk drive (HDD).

The order reception unit 10, the service order unit 11, the shipment unit 12, the dispatch unit 13, the authentication unit 14, the OLT 15, and the controller 20 are information processing apparatuses, such as a server or a control apparatus. The order reception unit 10, the service order unit 11, the shipment unit 12, the dispatch unit 13, the authentication unit 14, and the OLT 15 are operated by, for example, a predetermined on-site worker.

The authentication unit 14 may hold information or authority that enables reference to necessary information. The shipment unit 12 is provided in, for example, a factory 200 that manufactures an ONU 19. The dispatch unit 13 is provided in a logistics center 300 that dispatches the ONU 19. The ONU 19 dispatched from the logistics center 300 is provided in a customer premises 400. There may be a plurality of customer premises 400 and/or ONUs 19.

First, the configuration of the communication system 1 will be described for when the communication system 1 executes the operation shown in case "A-4" of FIG. 2 or the operation shown in case "B-4" of FIG. 3.

Figure 2:
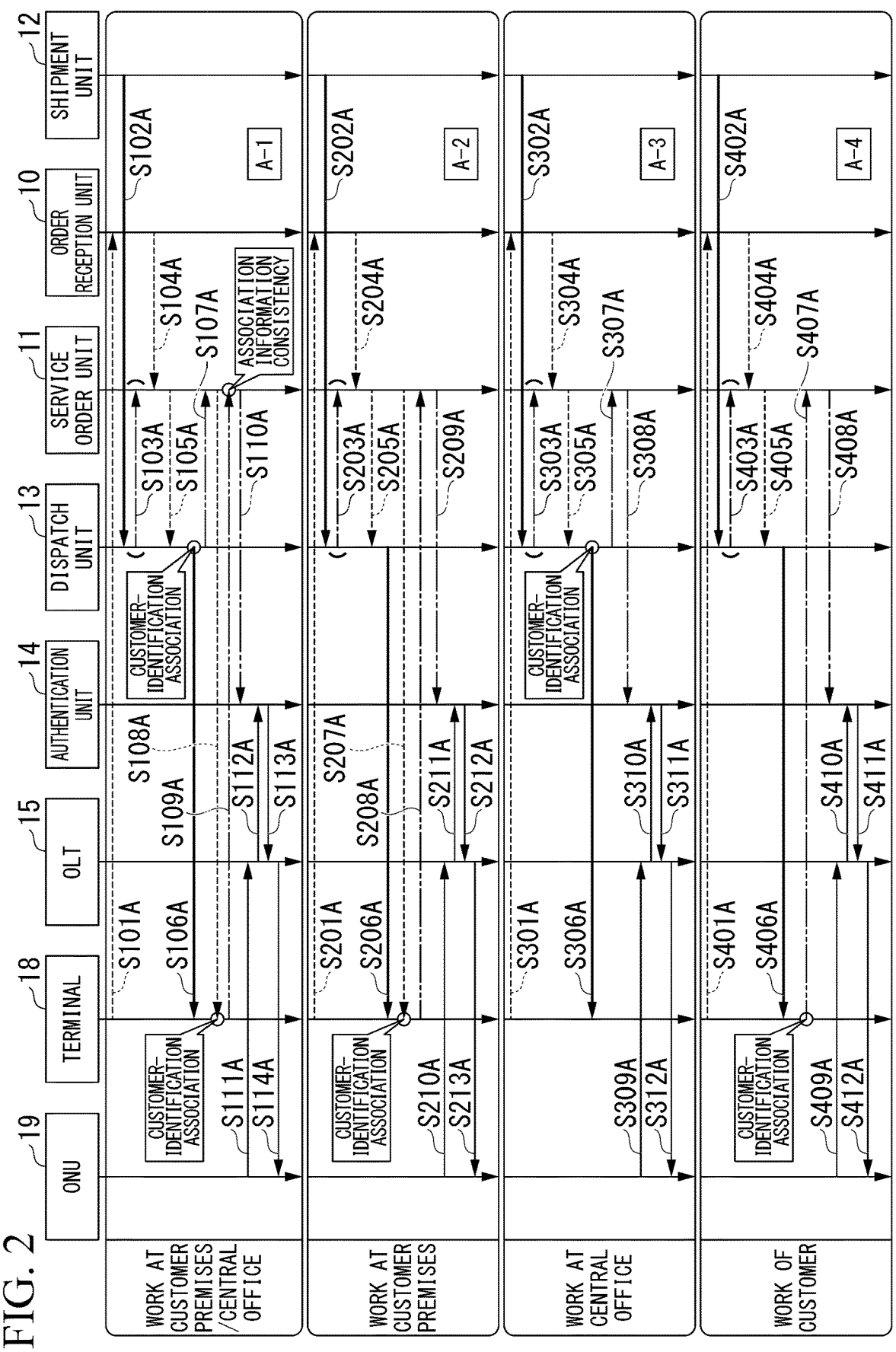
FIG. 2 is a sequence diagram showing an operation of the communication system when unique identification information or authentication information assigned to an ONU at the time of shipment from a factory is used for authentication.

FIG. 2 is a sequence diagram showing an operation of the communication system 1 when identification information or authentication information that is specific to the ONU and is assigned at the time of shipment from the factory is used for authentication. In FIG. 2, the vertical arrows from top to bottom indicate the flow of time. The horizontal arrows connecting the vertical arrows indicating the flow of time indicate the interaction between the functional units.

In FIG. 2, the identification information or the authentication information of the device, and the information that is associated with the customer or the customer's location in advance are transmitted together, thereby association of the information on the customer or the customer's location with the identification information or the authentication information (hereinafter referred to as "customer-identification association") is executed. Alternatively, the "customer-identification association" is executed by transmitting the identification information or the authentication information of the device from the terminal or the line that is associated with the customer in advance. For example, in case "A-4", the "customer-identification association" is executed, for example, as the work of the customer. After executing the "customer-identification association", the OLT accepts a registration/opening request from the ONU. Specifically, the identification information or the authentication information of the device is acquired by the terminal from, for example, a bar code, a QR code, an RFID, an NFC tag, or the like assigned to the device, the information that is associated with the customer or the customer's location in advance and that has been obtained by e-mail, Web access, or the like or provided in the form of a bar code, a QR code, an RFID, an NFC tag, or the like or the information that is associated with the customer or the customer's location in advance and that has been generated by applying predetermined processing on the basis of a value obtained by e-mail, Web access, or the like or provided in the form of a bar code, a QR code, an RFID, an NFC tag, or the like is acquired by the terminal, and both pieces of information are transmitted together, thereby association is performed. For example the identification information or the authentication information of the device is acquired from, for example, a bar code, a QR code, an RFID, an NFC tag, or the like assigned to the device, using the device connected to the terminal or the line that is associated with the customer in advance, and is transmitted, thereby association is performed. Here, the e-mail, the destination of the Web access, the bar code, the QR code, the RFID, and the NFC tag may be different for each service to be opened or for each process such as opening, closing, or changing of the terminal and/or the service, or they may be the same and a service and/or a process may be selected using an application or the like and may be sent together with selection information thereof, thereby association may be performed.

It should be noted that when the ONU is registered after authentication based on the "customer-identification association", the timing for the ONU to request registration from the OLT may be before the "customer-identification association" is executed.

The figure describes that the ONU makes a request after association, and it is sufficient that the request is accepted on or after the association. When accepting the request before association, the link, the channel, the VLAN, and/or the route connected thereto may be in a non-conductive state. When the ONU can transmit the registration request, the ONU transmits the registration request. The time when the registration request can be sent: may be set at a predetermined time interval even if there is no new or additional ONU to be registered; may be set at a predetermined time interval only when the ONUs that can be registered have not reached the upper limit even if there is no new or additional ONU to be registered; may be set only when there is an ONU to be associated; or may be set only after execution of association. That is, the figure corresponds to the latter two cases, and the former two cases correspond to the case of transmitting the request before the association.

It should be noted that the communication system 1 may perform association using at least one of the following (01) to (24):

(01) Device identification information acquired together with information that is associated with the customer in advance;
(02) Device authentication information acquired together with information that is associated with the customer in advance;
(03) Customer identification information acquired together with information that is associated with the customer in advance;
(04) Customer authentication information acquired together with information that is associated with the customer in advance;
(05) Service identification information acquired together with information that is associated with the customer in advance;
(06) Service authentication information acquired together with information that is associated with the customer in advance;
(07) Device identification information acquired together with information that is associated with the customer's location in advance;
(08) Device authentication information acquired together with information that is associated with the customer's location in advance;
(09) Customer identification information acquired together with information that is associated with the customer's location in advance;
(10) Customer authentication information acquired together with information that is associated with the customer's location in advance;
(11) Service identification information acquired together with information that is associated with the customer's location in advance;
(12) Service authentication information acquired together with information that is associated with the customer's location in advance;
(13) Device identification information acquired from a terminal that is associated with the customer in advance;
(14) Device authentication information acquired from a terminal that is associated with the customer in advance;
(15) Customer identification information acquired from a terminal that is associated with the customer in advance;
(16) Customer authentication information acquired from a terminal that is associated with the customer in advance;
(17) Service identification information acquired from a terminal that is associated with the customer in advance;
(18) Service authentication information acquired from a terminal that is associated with the customer in advance;
(19) Device identification information acquired from a line that is associated with the customer in advance;
(20) Device authentication information acquired from a line that is associated with the customer in advance;
(21) Customer identification information acquired from a line that is associated with the customer in advance;
(22) Customer authentication information acquired from a line that is associated with the customer in advance;
(23) Service identification information acquired from a line that is associated with the customer in advance;
(24) Service authentication information acquired from a line that is associated with the customer in advance.

The communication system can discriminate the customer and authenticate the device or the like on the basis of the fact that the identification information or the authentication information of the device and the information that is associated with the customer or the customer's location in advance have been received together or on the basis of the fact that the identification information or the authentication information of the device has been received from the terminal or the line that is associated with the customer in advance, without registering the identification information or the authentication information of the device in association with the customer in advance. When the customer has ordered the service, the communication system associates a customer with an identifier such as a telephone number or a serial number of a terminal (a mobile phone, etc.) and/or an identifier such as a contractor number of a line. The communication system receives the identification information or the authentication information of the device from the associated terminal or line. Thereby, the communication system can indirectly associate the identification information or the authentication information of the device with the customer via the associated terminal or line. The communication system associates the identification information or the authentication information of the installation location (e.g., an optical outlet) in the form of a QR code or the like with the customer's location in advance. Thereby, the communication system can indirectly associate the identification information or the authentication information of the device with the customer through the identification information or the authentication information of the associated installation location.

Here, "received together", "acquired together", and "transmitted together" mean received, acquired, or transmitted with the same frame or the like; received, acquired, or transmitted adjacently in time; processed with the same encryption key or authentication key and received, acquired, or transmitted; or the like. When respective pieces of information are transmitted in different frames or the like, adjacently in time is, for example, the average time of the times required to transmit the respective pieces of information after being acquired, the result obtained by adding the average time to the result obtained by multiplying the variance of the average time by a coefficient, or is a predetermined time (an upper limit time of a predetermined work time, etc.). When the respective pieces of information are transmitted via different functional units, it is a time in which the differences between transmission times through the different functional units, and/or the buffered times are taken into consideration. With respect to the predetermined time, delay variations in frame transmission and the like may be taken into consideration.

It should be noted that the association between the identification information or the authentication information of the device and the customer may be validated if the temporal deviation is within an allowable range. When a third party visits or sneaks into the customer premises, there is a possibility that the third party will capture information such as a QR code of the device with a camera. In the case of reconfiguring the same device, there is a possibility that communications sent in the past may be intercepted and saved. From the viewpoint of not allowing the off-site worker to use both the information such as a QR code and the information acquired by the off-site worker in the past, it is desirable that the information such as a QR code should be encrypted in a format in which the time is specified using, for example, TOTP, which is a time-based one-time password.

The problem that misconnection (misconnection to the branch fiber, the optical outlet at the installation location, and the like) that occurs when the passive element multiplexes or branches the signals is difficult to identify can be suppressed by the use of information on the customer's location (information on the installation location etc.). This advantageous effect can also be obtained in the same manner in the later-described embodiments in which position information is used.

The order reception unit 10 accepts an order for opening a service from the customer. When the identification information or the authentication information transmitted from the terminal or the line that is associated with the customer is associated in advance with the customer, it is desirable that the order reception unit 10 should acquire order data from the terminal 18, which is a smartphone or the like, via a communication line 100, such as a telephone line or the Internet. In this case, the terminal or the line used for ordering can be associated with the customer. The result of associating the customer with the terminal or the line may be notified at any time before the service start (e.g., when placing an order). In this case, the service does not need to be ordered using the terminal or the line that is associated with the customer in advance. The order reception unit 10 passes the order data of the service to the service order unit 11. Although the order reception unit 10 is illustrated as a single configuration, it may have a plurality of configurations. The order reception unit 10 may also serve as the service order unit 11. This also applies to the following embodiments.

The service order unit 11 may instruct the shipment unit 12 to ship the ONU 19 in accordance with the order data from the customer (not shown). The service order unit 11 may instruct the shipment of the ONU 19 for each order from the customer. A plurality of orders may be combined. The service order unit 11 may give an instruction in accordance with a plan, a forecast, or an inventory quantity (e.g., an inventory quantity of devices in a factory). For example, the service order unit 11 may instruct the shipment of the ONU 19 if the inventory quantity exceeds a predetermined value. The service order unit 11 may instruct the shipment of the ONU 19 in accordance with the inventory quantity of the ONUs 19 in the logistics center (e.g., if the inventory quantity falls below a threshold value). The service order unit 11 may instruct the shipment of the ONU 19 in accordance with the number of ONUs for which the shipment at the factory 200 or the logistics center 300 has not been allocated (e.g., if the inventory quantity falls below a threshold value). From the viewpoint of suppressing retention of customer information by making the correspondence between the customer and the ONU unknown when one of the plurality of ONUs to which the identification information or the authentication information within a predetermined range is assigned is delivered to the customer, it is desirable that either the instruction or the shipment should not be executed for each order. When executed for each order, it is desirable to instruct or ship so that the identification information or the authentication information of the shipped ONU is not uniquely determined.

The shipment unit 12 ships the ONU 19 to the logistics center 300. The service order unit 11 may instruct the shipment unit 12 to ship the ONU 19 in accordance with each order from the customer, may instruct the shipment unit 12 to ship a plurality of ONUs 19 in accordance with a plurality of orders that are bundled together, or may instruct the shipment unit 12 to ship the ONU 19 in accordance with a plan, a forecast, or an inventory quantity (e.g., an inventory quantity of devices in a factory).

It should be noted that the shipment unit 12 is illustrated as a single configuration, but it may have a plurality of configurations. As long as the connectivity between the factory of the same type of ONU or the OLT 15 and the shipment unit 12 can be ensured, only one shipment unit 12 may be provided for a plurality of factories that manufacture different types of ONUs 19. When the factory 200 also serves as the logistics center 300, the factory 200 does not need to include the shipment unit 12. This also applies to the following embodiments.

The dispatch unit 13 executes a process of dispatching the ONU 19. Thereby, the ONU 19 is dispatched to the customer premises 400. It should be noted that in order for the service order unit 11 to confirm consistency between the information from the terminal associated with the customer information and the shipment information, the dispatch unit 13 may acquire the unique identification information of the ONU 19 assigned to the customer. The dispatch unit 13 acquires the unique identification information and performs a process to be performed by a consistency unit described later or a process equivalent thereto, thereby the dispatch unit 13 can use the unique identification information as material for confirming the consistency of the authentication related to the service start. On the other hand, from the viewpoint of suppressing retention of customer information by making the correspondence between the customer and the ONU unknown when one of the plurality of ONUs to which the identification information or the authentication information within a predetermined range is assigned is delivered to the customer, the dispatch unit 13 does not need to acquire the unique identification information.

Here, in case "A-4", the identification information or the authentication information is assigned to the ONU at the time of shipment, and thus the shipment unit 12 may pass the assigned identification information or authentication information to the service order unit 11. The dispatch unit 13 may acquire the identification information or the authentication information and pass the acquired identification information or the authentication information to the service order unit 11. The dispatch unit 13 passes the identification information or the authentication information and performs the process to be performed by the consistency unit or a process equivalent thereto, thereby the dispatch unit 13 can use the identification information or the authentication information as material for confirming the consistency of the authentication related to the service start. On the other hand, from the viewpoint of suppressing retention of information related to the customer by making the correspondence between the customer and the ONU unknown when one of the plurality of ONUs to which the identification information or the authentication information within a predetermined range is assigned is delivered to the customer, the information needs not be acquired.

In case "B-4", the identification information or the authentication information used for starting the service is not assigned at the time of shipment or is not used even if assigned, and thus the identification information or the authentication information may be assigned and associated in accordance with the instruction of the service order unit 11. When the identification information, the authentication information itself, or the identification information and the authentication information can be uniquely calculated on the basis of the instruction, the service order unit 11 performs the process to be performed by the consistency unit or a process equivalent thereto, thereby the unique identification information is used as material for confirming the consistency of the authentication related to the service start. On the other hand, from the viewpoint of suppressing retention of customer information by making the correspondence between the customer and the ONU unknown when one of the plurality of ONUs to which the identification information or the authentication information within a predetermined range is assigned is delivered to the customer, it is desirable that the identification information or the authentication information to be assigned should be made information that cannot be uniquely identified within an allowable range. Further, when one of the plurality of ONUs to which the identification information or the authentication information within a predetermined range is assigned is delivered to the customer, it is desirable that the identification information or the authentication information within a predetermined range should be made information that cannot be uniquely identified within an allowable range. When the same identification information or the authentication information is, for example, a MAC address, the allowable range is the range of numbers determined by the manufacturer and/or the model, and is a range excluding already assigned and unusable addresses. It should be noted that in cases of "B-1" to "B-4", even if some identification information or authentication information is assigned to the ONU at the time of shipment, separate identification information or authentication information may be assigned to the ONU without using the assigned identification information or authentication information. The associating unit associates the assigned identification information or authentication information with the customer.

The shipment unit 12 may generate identification information or authentication information and pass the generated identification information or authentication information to the service order unit 11. By passing the identification information or the authentication information and performing processing to be performed by the consistency unit or a process equivalent thereto, the identification information or the authentication information can be used as material for confirming the consistency of the authentication related to the service start. On the other hand, from the viewpoint of suppressing retention of information related to the customer by making the correspondence between the customer and the ONU unknown when one of the ONUs provided with the identification information or the authentication information within a predetermined range is delivered to the customer, the information needs not be passed.

At the customer premises 400 (a customer's location), the identification information or the authentication information of the device (an ONU, etc.) and the information that is associated with the customer or the customer's location in advance are transmitted together, thereby the identification information or the authentication information of the device is associated with the customer or the customer's location. The identification information or the authentication information of the device (an ONU, etc.) is transmitted from the terminal or the line that is associated with the customer in advance, thereby the identification information or the authentication information of the device is associated with the customer or the customer's location. The identification information or the authentication information may be associated with the customer or the customer's location by transmitting the identification information of the ONU from the line that is associated with the customer in advance. The terminal that is associated with the customer in advance may transmit the information that is associated with the customer or the customer's location in advance.

The device (an ONU, etc.) to be associated with the customer may transmit information that is associated with the customer or the customer's location in advance. For example, the information that is associated with the customer or the customer's location in advance is transmitted via the opened line and the device itself (i.e., a line of a PON and the ONU), thereby the line or the ONU is associated with the customer. The configuration for executing this association corresponds to a configuration for sending the identification information or the authentication information of the ONU or the like (a registration request includes normal information related to the ONU) and the information that is associated with the customer or the customer's location in advance. For example, when the identification information or the authentication information of the ONU or the like is sent at the time of a registration request, the information that is associated with the customer or the customer's location in advance may be sent in the same frame as the registration request, in the frame in a predetermined range before or after the frame of the registration request, or in the frame after the registration request (the service may be started for trial, generally before service starts, before legitimate service starts).

An already associated line may be used instead of an already associated terminal. The line may be associated at the time of ordering the service or after the order is placed. The line may be associated by using association when placing an order.

The service order unit 11 acquires the identification information or the authentication information of the ONU 19 (a device) from the terminal 18 or line that is associated with the customer in advance, to thereby acquire information representing the association between the customer and the identification information or the authentication information (hereinafter referred to as "association information"). The service order unit 11 acquires the association information by acquiring the identification information or the authentication information of the ONU 19 (a device) together with the information that is associated with the customer or the customer's location in advance. That is, the service order unit 11 may receive the information that is associated with the customer or the customer's location in advance and the identification information of the ONU 19. The service order unit 11 may receive the identification information or the authentication information of the ONU 19 from the terminal 18 or line that is associated with the customer in advance. The service order unit 11 may execute both of these reception processes. Here, although the identification information or the authentication information is illustrated as the identification information or the authentication information of the ONU 19, identification information or authentication information related to the service to be started (e.g., identification information or authentication information of a set top box, a gateway, or a customer device) can be used similarly.

It is desirable that information should be transmitted via a relatively secure route (a telephone line, a leased line, a VPN, etc.) so as not to be able to be tampered with and/or eavesdropped, or so as to be able to detect any tampering and/or eavesdropping of information. It is desirable that information cannot be tampered with and/or eavesdropped by using encryption, key information, or the like, or that any tampering and/or eavesdropping of information can be detected. When a set of information is sent, it is desirable that the set of information should be encrypted. The set of information may be encrypted in a format in which the time is specified, such as in time-based TOTP. From the viewpoint of suppressing replay attacks, it is desirable that the password can be used only once. It is desirable to save the used TOTP for each device or customer ID. When a customer contracts for a plurality of devices and/or services, it is desirable to save as many TOTPs as the number of contracts. A counter-based HOTP (HMAC-based one-time password, RFC 4226) may be used.

It should be noted that with the HOTP, resynchronization is required if synchronization is lost. In this case, the communication system is provided with an interface for resynchronization. For example, in the process of resynchronization, an OTP device generates two or more consecutive OTPs. The device resynchronizes using the OTPs transmitted from the OTP device. In the TOTP, authentication information is exchanged in consideration of delay and delay variation. For example, the device uses the authentication information that has been subjected to statistical processing (processing for deriving the average of transmission times from the place where the TOTP is generated, etc.) and synchronizes at a time shifted by the transmission time. The transmission time is, for example, the time required for transmission from the terminal to the authentication unit. From the viewpoint of preventing resynchronization from being executed frequently, it is desirable that only the temporal deviation corresponding to the delay variation should be allowed and the device should be synchronized.

When a terminal (a customer's mobile phone, etc.) is associated with a device (an ONU, etc.) or a fixed line (an optical line, etc.), the position information of the installation location of the fixed line (an optical outlet, etc.) may be used for the association. It suffices if the terminal (a customer's mobile phone, etc.) is within a predetermined distance from the location where the device (an ONU, etc.) is connected or the position of the device (an ONU, etc.). Here, the predetermined distance may include an error assumed as an error in the installation position.

The communication system may save a history of position information of a terminal (a customer's mobile phone, etc.) at each time. The history of position information may be used to associate the terminal with a device or a fixed line. For example, the communication system may save the history of the position information of the terminal for the time from when the customer ordered a service contract using the terminal to when the device or the like is authenticated. For example, the communication system may save the history of position information of the terminal for the time from when the terminal of the customer last used the line to when the device is authenticated. When radio waves of a satellite, such as those of the global positioning system, are used to measure the position of the terminal, the time during which the radio waves of the satellite could not be captured may be excluded from the target time when the history is saved. When the radio waves of a base station are used for measuring the position of the terminal, the time during which the radio waves of the base station could not be captured may be excluded from the target time when the history is saved.

The problem that misconnection (misconnection to the branch fiber or the installation location (e.g., an optical outlet)) that occurs when the passive element multiplexes or branches the signals is difficult to identify can be suppressed by the use of information on the customer's location (information such as an optical outlet, etc.). This advantageous effect can also be obtained in the same manner in the later-described embodiments in which position information is used.

The information that is associated with the customer or the customer's location in advance is, for example, identification information of the installation location (e.g., an optical outlet) installed in the customer premises 400. The identification information of the installation location is represented by, for example, a one-dimensional code such as a bar code, a two-dimensional code such as a QR code, or an NFC tag. For example, when the communication system 1 includes a database in which the identification information of the installation location is associated with the address, the room number, or the like, the customer is associated with the installation location on the basis of the information stored in the database. The customer may order the service by operating the already associated terminal 18 (a registered terminal) to input the identification information (customer information) of the installation location into the order data. The terminal 18 of the customer may read the barcode, the QR code, or the NFC tag to thereby read the identification information or the authentication information, which is represented in the barcode or QR code format or is represented in the NFC tag readable format, and then transmit the identification information or the authentication information to the service order unit 11. The terminal 18 of the customer may transmit the information that is associated with the customer or the customer's location in advance using a device (an ONU, etc.) to be associated with the customer. The terminal 18 of the customer transmits the information that is associated with the customer or the customer's location in advance via, for example, an opened line and/or the device itself (i.e., a line of a PON and/or an ONU), to thereby associate the line or the ONU with the customer. The configuration for executing this association corresponds to a configuration for sending the identification information or the authentication information of the ONU or the like (a registration request includes normal information related to the ONU) and the information that is associated with the customer or the customer's location in advance. For example, when identification information or authentication information of the ONU or the like is sent at the time of a registration request, information that is associated with the customer or the customer's location in advance may be sent in the same frame as the registration request, in the frame before or after the frame of the registration request, or in the frame after the registration request (the service may be started for trial, generally before service starts, before legitimate service starts).

The terminal 18 that is associated with the customer in advance is, for example, a mobile terminal, such as a smartphone. The line that is associated with the customer in advance is, for example, a telephone line. It is desirable that this line should be a line for which spoofing is difficult (a telephone line, a short message service (SMS) line, etc.). When order data or the like passes through the communication line 100, such as the Internet, it is desirable to make spoofing of the transmitter of the order data or the like difficult, by using a VPN or the like and/or authentication or the like. The identification information of the terminal 18 or line that is associated with the customer in advance (e.g., a telephone number and/or information about a terminal) may be input to the order data as the customer information at the time of ordering the service opening, or may be input to predetermined data as the customer information after ordering the service opening. The identification information of the terminal 18 or line that is associated with the customer in advance may be written in the order data as customer information, by ordering the ONU 19 through the terminal 18 and/or line that is associated with the customer in advance. Here, the identification information of the terminal 18 is, for example, a terminal number such as an international mobile equipment identity (IMEI) or a mobile equipment identifier (MEID) or a MAC address.

When the terminal 18 has been changed after association, the authentication unit 14 needs to acquire the change information of the terminal 18 in order for the authentication unit 14 to correctly authenticate the ONU 19 using the changed identification information of the terminal 18. When the terminal 18 has been resold, information on the resale destination of the terminal 18 (resale information) is required. It should be noted that when the position information of the terminal 18 and the identification information of the terminal 18 are combined, the authentication unit 14 can correctly authenticate the ONU by using the resale information of the terminal 18.

If the customer frequently changes the contracted telecommunications carrier and the customer has few opportunities to change the terminal 18, it is better to use the identification information of the terminal 18 for authentication. If the customer does not frequently change the contracted telecommunications carrier but the customer often changes the terminal 18, it is better to use the identification information of the subscriber identity module (SIM) card for authentication. In particular, when the business operator of the terminal 18 buys and sells a communication system for service start, for example, an optical access network (a PON system), and the terminal 18 all together, the SIM card of the terminal 18 is changed less frequently; therefore, it is better to use the identification information of the SIM card of the terminal 18 for authentication of the ONU 19. The identification information of the terminal 18 or the line is, for example, identification information stored in the SIM card.

The telecommunications carrier can acquire the identification information by executing a command such as READ_PHONE_STATE and a permit operation with permission in the terminal 18 in which, for example, Android (registered trademark; the same applies hereinafter), which is one of the operating systems, is operating. The identification information of the terminal 18 is, for example, an international mobile subscription identity (IMSI) representing a maximum 15-digit identification number conforming to the ITU-T E.212 standard.

The identification information of the terminal 18 may be, for example, a mobile subscriber integrated service digital network number (MSISDN), which is a mobile phone number. The identification information of a terminal may be, for example, an integrated circuit card ID (ICCID), which is a serial number of the SIM card itself. When the IMSI is used for authentication, the authentication unit 14 may authenticate the ONU 19 using the output value of an authentication algorithm that uses key information stored in the SIM card.

The identification number stored in the SIM card of the terminal 18 may be a fixed number. The identification number stored in the SIM card may be the subscription manager (SM), trusted service manager (TSM), or the like recorded in "Embedded SIM", "soft SIM", "embedded universal integrated circuit card (eUICC)", or the like. The identification number stored in the SIM card may be a code (system architecture enhancement (SAE) temporary mobile subscriber identity (S-TMSI)) assigned to identify the terminal in the mobility management entity (MME), or an IP address assigned by the MME. The MME is a logical node that accommodates a base station (eNodeB) in a mobile phone network and provides mobility control and the like.

The authentication unit 14 is an apparatus that authenticates a device (the ONU 19, etc.) and/or a service start and authenticates the opening of a service via the authenticated device. The authentication unit 14 receives the identification information or the authentication information of the ONU 19 or the like from the service order unit 11. The identification information or the authentication information is information used for authentication. The authentication unit 14 authenticates the ONU 19 on the basis of the acquired authentication information. When the service order unit has received together the identification information or the authentication information of the device and the information that is associated with the customer or the customer's location in advance, the authentication unit 14 determines whether or not the device is a legitimate device and/or whether or not the service to be opened via the device is a legitimate service on the basis of the information received together by the service order unit. The authentication unit 14 determines whether or not the device is a legitimate device and whether or not the service to be opened via the device is a legitimate service on the basis of the identification information or the authentication information of the device received by the service order unit from the terminal or the line that is associated with the customer in advance. The authentication unit 14 authenticates the ONU 19 (a device), which is an apparatus to be authenticated and the service to be opened on the basis of the determination result.

The authentication unit 14 has an advantageous effect that authentication can be performed without registering the identification information and the authentication information of the ONU 19 in the OLT 15 via the controller 20 or the like when the service is ordered.

Upon the authentication by the authentication unit 14, configuration information and software, such as application software or firmware, in accordance with a contract may be downloaded from another apparatus (e.g., the controller of the OLT (not shown)) to the OLT, the ONU, or the customer-side apparatus (e.g., a set top box, a gateway, or a customer device). The software may be configured. A startup process or the like may be executed. Management such as OAM may be performed in accordance with the status of the device or a device of the OLT connected to the device and the status of the business operator who provides the service. Software related to other functions may be downloaded. The authentication unit and/or the DHCP server on the controller side may dynamically allocate the network address using a dynamic host configuration protocol (DHCP) or the like. The configuration information may be transmitted to the ONU or the customer-side apparatus, which are hosts.

The OLT 15 communicates with the ONU 19 via a transmission line of the PON system, which is one of the optical access networks. The optical fiber 16 and the optical branch network 17 configure the transmission line of the PON system.

The above system is provided with the order reception unit 10, the service order unit 11, the shipment unit 12, the dispatch unit 13, the authentication unit 14, the controller (not shown) of the OLT 15, the OLT 15, the optical fiber 16, the optical branch network 17, and the terminal 18. Each unit may have a single configuration or a plurality of configurations. For example, the order reception unit 10, the service order unit 11, the authentication unit 14, and the controller of the OLT 15 may be integrated, or the shipment unit 12 and the dispatch unit 13 may be integrated. The same also applies to "A-1", "A-2", "A-3", "B-1", "B-2", and "B-3" in the following embodiments.

Figure 3:
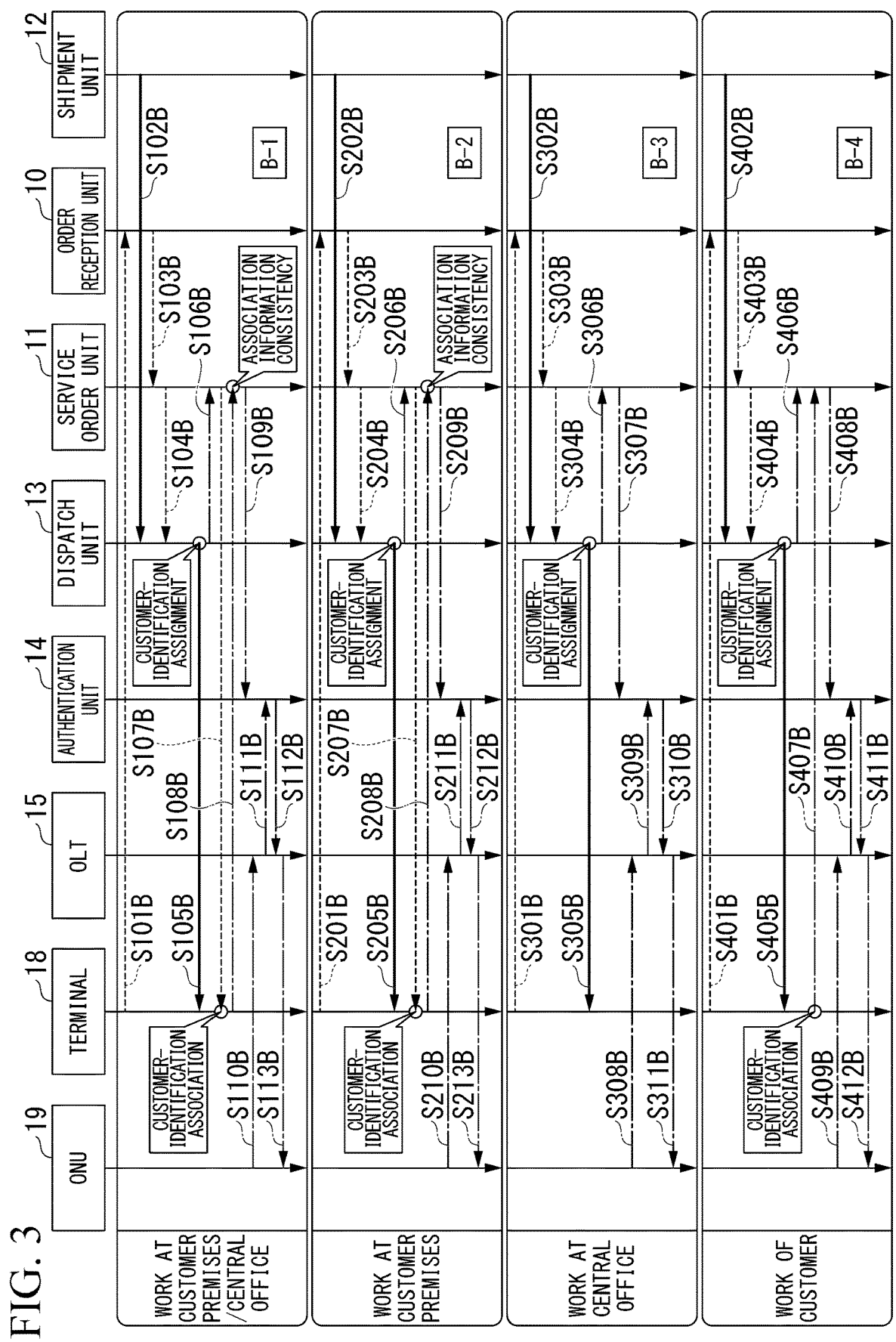
FIG. 3 is a sequence showing an operation of the communication system when identification information or authentication information that is different from the unique identification information assigned to the ONU at the time of shipment from the factory is assigned to the ONU.

Next, differences of the configuration of the communication system 1 when the operation shown in case "A-1" of FIG. 2 is executed or when the operation shown in case "B-1" or "B-2" of FIG. 3 is executed, from the configuration of the communication system 1 when the operation shown in case "A-4" of FIG. 2 is executed or when the operation shown in case "B-4" of FIG. 3 is executed, will be described.

In the communication system 1, before the service order unit 11 issues an instruction to the terminal 18, the dispatch unit 13 (a preceding stage associating unit) associates the customer information with the identification information of the ONU 19 on the basis of the instruction. The service order unit 11 issues the instruction in accordance with the assignment of the ONU 19 to the customer. After the instruction from the service order unit 11 is issued, the terminal (a later stage associating unit) associates the identification information of the ONU 19 with the customer information on the basis of the instruction, through an operation by the off-site worker of the communication carrier. Here, the preceding stage associating unit (not shown) provided in the dispatch unit performs the association in the dispatch unit. The later stage associating unit (not shown) provided in the terminal performs the association in the terminal. First, the operation will be described for case A-1. In case B-1, the preceding stage associating unit assigns the identification information to the ONU and associates the identification information with the customer information.

When the communication system 1 includes the associating unit in both the dispatch unit 13 and the terminal 18 (case "A-1" of FIG. 2 and case "B-1" and "B-2" of FIG. 3), the service order unit 11 confirms the consistency between the association information output from the dispatch unit 13 and the association information output from the terminal 18 in the customer premises 400.

It should be noted that the authentication unit 14 may authenticate the ONU 19 on the basis of at least one of the association information output from the dispatch unit 13, the association information output from the terminal 18 of the customer in the customer premises 400, and the association information output from the service order unit 11, as well as the position information of the terminal (as for a functional unit, the acquisition unit and/or the associating unit) or the ONU 19.

Here, in case "A-1", case "B-1", and case "B-2", the identification information or the authentication information acquired by the terminal does not need to be associated because they are associated by the preceding associating unit. The authentication unit 14 may perform authentication on the basis of the position information of the terminal (as for a functional unit, the acquisition unit) that acquires the identification information or the authentication information, or the position information of the ONU of which identification information or authentication information is acquired. In this case, the consistency unit confirms the consistency of the identification information or the authentication information. It should be noted that in case "A-1", case "B-1", and case "B-2", the communication system does not need to include the consistency unit. In that case, the consistency of the identification information or the authentication information does not need to be confirmed.

It should be noted that in the above, the communication system is provided with the shipment unit and the dispatch unit. When the customer procures a device (an ONU, etc.) or when the customer uses an existing device, the communication system does not need to include the shipment unit and the dispatch unit. The "customer-identification association" is possible even if the identification information or the authentication information of the device and the information that is associated with the customer or the customer's location in advance are received together, or even if the identification information or the authentication of the device is received from the terminal or the line that is associated with the customer in advance.

Next, another configuration of the communication system 1 will be described for when the communication system 1 executes the operation shown in cases "A-1", "A-2", and "A-4" of FIG. 2 or the operation shown in cases "B-1", "B-2", and "B-4" of FIG. 3.

The communication system acquires the position information of the terminal or the device within a predetermined time range relative to the time when the terminal or the device transmitted the identification information or the authentication information of the device. When the position information indicates a position within the predetermined range, the communication system authenticates the device and starts provision of the service. Thereby, it is possible to prevent the service from being started when the device is erroneously placed instead of the customer's location.

Here, when information of the time and the position is used, the temporal deviation of the time when the terminal or the device transmitted the identification information or the authentication information from the time when acquired by the acquisition unit, such as the service order unit 11, must be within an allowable range. The temporal deviation of the time when the terminal or the device transmitted the identification information or the authentication information from the time when associated by the associating unit must be within an allowable range. Within an allowable range is, for example, less than or equal to the time normally required to move from one installation location (e.g., an optical outlet) to another installation location (e.g., another optical outlet) or less than or equal to the time normally required to move from a customer premises to another customer premises. In this setting, the time when the terminal or the device transmitted the identification information or the authentication information is replaced with the time when associated or the time when acquired. That is, when the acquisition unit acquires the position information of the terminal or the device within the predetermined time range relative to the time when the identification information or the authentication information is acquired and the position information indicates the position within the predetermined range, the authentication unit 14 performs authentication and the OLT 15 starts the service. When the acquisition unit acquires the position information of the terminal or the device within the predetermined time range relative to the time when the identification information or the authentication information was associated and the position information indicates the position within the predetermined range, the authentication unit 14 may perform authentication and the OLT 15 may start the service. The position of the terminal or the device that transmitted the identification information or the authentication information may be the same as the position of the acquisition unit or the associating unit. It should be noted that the terminal and/or line that is associated with the customer in advance does not need to be used for the association. Even if the terminal of the off-site worker acquires the identification information or the authentication information of devices of a plurality of customers, the associating unit can execute association by associating the sequential order of the work for each customer or the scheduled work time with the identification information or the authentication information. In this case, the terminal that has acquired the information cannot directly associate the identification information or the authentication information of the device with the customer information by itself. The associating unit acquires the information necessary for the association (the sequential order in which the information is acquired, the time zone in which the information is acquired, etc.) and the associating unit indirectly executes the association. Therefore, the acquisition operation is a part of the association operation. The associating unit includes an authentication unit or a service order unit that refers to the sequential order and/or the time zone, and an acquisition unit. In this situation, the position of the associating unit in this example is the same as that of the acquisition unit.

Furthermore, when a third party visits or sneaks into the customer premises, there is a possibility that the third party will capture information such as a QR code of the device with a camera. From the viewpoint of not allowing the third party to use both the information such as a QR code and the information acquired by the off-site worker in the past, it is desirable that the information such as a QR code should be encrypted in a format in which the time is specified using TOTP, which is a time-based one-time password, or the like. From the viewpoint of suppressing replay attacks, it is desirable that the information such as a QR code can be used only once.

To this end, the communication system saves, for example, a used TOTP for each device or customer ID. When a plurality of devices correspond to the customer ID, the communication system may hold TOTPs the number of which corresponding to a predetermined number such as the number of contracts, the predetermined number may be made the upper limit, and when the predetermined number is reached, TOTPs may be invalidated in order from the oldest TOTP. When the upper limit is reached or immediately before the upper limit is reached, the communication system may notify a predetermined contact address (e.g., an associated terminal and/or line of a customer) to that effect (the upper limit reached). The HOTP, which is a counter-based OTP, may be used.

From the viewpoint of preventing resynchronization from being frequently executed, it is desirable that only a temporal deviation corresponding to the delay variation should be allowed and the device should be synchronized.

Next, differences of another configuration of the communication system 1 when the communication system 1 executes the operations shown in cases "A-1", "A-2", and "A-4" of FIG. 2 and the operations shown in cases "B-1", "B-2", and "B-4" of FIG. 3 from the above will be described.

In this configuration, when the identification information or the authentication information of the device is included in information within a predetermined range including a plurality of elements, the communication system authenticates the device, the customer, or the service and starts the service. It should be noted that the plurality of elements are two or more pieces of information. The predetermined range is a range in which the information indicating which information is associated with which customer is indeterminate until the number of elements becomes 1 or less.

Here, the group of identification information or authentication information is shown as a group of identification information or authentication information within a predetermined range including a plurality of elements. The group of identification information or authentication information may be customer information or customer's location information that may have a single association, and a group of identification information or authentication information within a predetermined range including a plurality of elements. The group of identification information or authentication information may be customer information or customer's location information that may be association within a predetermined range including a plurality of elements, and single identification information or authentication information. Alternatively, the group of identification information or authentication information may be customer information or customer's location information that may be association within a predetermined range including a plurality of elements, and a group of identification information or authentication information within a predetermined range including a plurality of elements. These also apply to other configurations.

Association between the device and the customer is finally determined by receiving the identification information or the authentication information of the device together with the information that is associated with the customer or the customer's location in advance. Alternatively, the association between the device and the customer is finally determined by receiving the identification information or the authentication information of the device from the terminal or the line that is associated with the customer in advance. The communication system has an advantageous effect of facilitating the protection of personal information by making the association between the device and the customer unknown until final determination. The communication system has an advantageous effect that it is possible to restrict the use of devices other than the devices that have been provided.

Here, the information within a predetermined range may be held by the associating unit (the terminal 18, etc.), and when the identification information of the device is read, the associating unit (the terminal 18, etc.) may determine whether or not association is permitted. The associating unit (the terminal 18, etc.) may transmit a "flag representing out-of-range" and the associating information to the authentication unit or the like. The authentication unit may determine that authentication of the device is not permitted on the basis of the flag and the association information. Further, the service order unit or the authentication unit may hold identification information or authentication information within a predetermined range. The service order unit or the authentication unit may determine that authentication of the device is not permitted. When device registration such as a registration request has been requested or a service start or the like has been requested, the service order unit or the authentication unit may handle the request by not permitting the registration. This also applies to other configurations and/or examples. It should be noted that the above two other configurations may be combined, or the following configurations may be combined.

In the communication system 1, the authentication unit 14 authenticates the ONU 19 depending on whether or not the identification information and the authentication information of the ONU 19 are within a predetermined range.

Next, with respect to the configuration of the communication system 1 when the communication system 1 executes the operation shown in case "A-4" of FIG. 2 or the operation shown in case "B-4" of FIG. 3, the configuration of the communication system 1 when the operation shown in case "A-1", "A-2", or "A-3" of FIG. 2 or the operation shown in case "B-1", "B-2", or "B-3" of FIG. 3 is executed will be described.

Next, the operation of the communication system 1 will be described.

FIG. 2 is a sequence diagram showing an operation of the communication system 1 when unique identification information assigned to the ONU at the time of shipment from a factory is used for authentication.

In case "A-1", the order reception unit 10 receives an order for service opening from the customer (step S101A). Here, the terminal 18 of the customer may order the service opening by transmitting the customer information to the order reception unit 10 in accordance with an operation by the customer. The transmitted customer information may be associated with the terminal 18 of the customer. The order reception unit 10 passes the order data to the service order unit (step S104A).

The service order unit 11 may instruct the shipment unit 12 to ship the ONU 19 in accordance with the order data from the customer. A plurality of orders may be combined. The service order unit 11 may give an instruction in accordance with a plan, a forecast, or an inventory quantity (e.g., an inventory quantity of devices in a factory). From the viewpoint of suppressing retention of customer information by making the correspondence between the customer and the ONU unknown when one of the plurality of ONUs to which the identification information or the authentication information within a predetermined range is assigned is delivered to the customer, it is desirable that either the instruction or the shipment should not be executed for each order. When executed for each order, it is desirable to instruct or ship so that the identification information or the authentication information of the shipped ONU is not uniquely determined.

The shipment unit 12 delivers the ONU 19 having the identification information or the authentication information unique to the ONU, to the logistics center 300 at the time of shipment from the factory (step S102A). The ONU 19 may be shipped by an operation by an on-site worker.

In the logistics center 300, the dispatch unit 13 transmits the individual identification information or authentication information displayed as a QR code or the like to the service order unit 11 (step S103A). Here, the dispatch unit may transmit the individual identification information or authentication information, or the shipment unit may transmit the individual identification information or authentication information. Moreover, the transmission process may also be executed by an operation performed by an on-site worker. When the individual identification information or authentication information is transmitted to the service order unit through the association information, step S103A may be omitted.

In case "A-1", the identification information or the authentication information is assigned to the ONU at the time of shipment, and thus the shipment unit 12 may pass the identification information or the authentication information assigned to the ONU to the service order unit. The dispatch unit 13 may acquire the identification information or the authentication information, and pass the acquired identification information or authentication information to the service order unit 11.

The service order unit 11 transmits customer information including the customer's location information represented by a QR code or the like to the dispatch unit 13 (step S105A).

The dispatch unit 13 associates the customer information with the identification information or the authentication information. The dispatch unit 13 dispatches the ONU 19 having the identification information or the authentication information corresponding to the association to the customer premises 400 on the basis of the transmitted customer information (step S106A).

In case "A-1", the dispatch unit 13 transmits the association information to the service order unit 11 (step S107A).

The service order unit 11 sends a written directive in which the customer information or a customer's location (e.g., represented by a QR code) is described to the customer premises (a customer's location). The service order unit 11 passes the written directive in which the customer information or the customer's location is described to the off-site worker, who carries the written directive with him/her during the work. Instead of the off-site worker carrying the written directive, the service order unit 11 may transmit the written directive to the terminal operated by the off-site worker. At the customer premises, the identification information or the authentication information of the device is associated with the customer information described in the written directive in accordance with an operation by the off-site worker using the terminal or the like (step S108A).

In case "A-1", the terminal transmits the association information associated, for example, by reading the QR code or the like to the service order unit 11 in accordance with an operation by the off-site worker. The service order unit 11 confirms the consistency between the association information acquired from the dispatch unit 13 and the association information acquired from the terminal. That is, the service order unit 11 confirms that the ONU 19 associated with the customer is installed in the corresponding customer premises 400 (step S109A). The service order unit 11 transmits the authentication information to the authentication unit 14 on the basis of the association information (step S110A).

Here, in case "A-1" and case "B-1", the association is executed by the preceding stage associating unit, and thus the identification information or the authentication information acquired by the terminal does not need to be associated. In this case, the consistency unit confirms the consistency of the identification information or the authentication information. It should be noted that in cases "A-1", "B-1", and "B-2", the communication system does not need to include the consistency unit. In that case, the consistency of the identification information or the authentication information does not need to be confirmed.

In the communication system 1 of the present example, determination of any of; whether or not the time when the information was transmitted is within a predetermined range and whether or not the position detected in the time before or after that time is within a predetermined range as in modified examples 1, 3, and 5 described below, and whether or not the identification information or the authentication information of the device (an ONU, etc.) is information included within a predetermined range as in modified examples 2 and 4 described later may be made. It is desirable that the determination result should be reflected in; the reception of the association information by the service order unit, the input of the association information or the authentication information from the service order unit to the authentication unit, and the determination of whether or not authentication has been permitted by the authentication unit.

As in modified examples 1, 3, and 5, there is an advantageous effect that it is possible to reduce the possibility that problems such as incorrect placement of a device (an ONU, etc.) will occur. Further, as in modified examples 2 and 4, there is an advantageous effect that it can be determined whether or not the device (an ONU, etc.) has been dispatched from the dispatch unit, without the individual devices and the association information of the customer being held in a distributed manner.

In case "A-1", the ONU 19 in the customer premises 400 transmits a service start request (e.g., a registration request)

to the OLT 15 (step S111A). The OLT 15 inquires of the authentication unit 14 whether or not authentication has been permitted (step S112A). The authentication unit 14 transmits information representing permission of the authentication to the OLT 15 on the basis of authentication information (step S113A). The OLT 15 transmits service start information (e.g., registration information for registration) to the ONU 19 (step S114A).

In case "A-1", there are 14 exchanges (steps), and work by the dispatch unit (customer-identification association) and visit of an off-site worker to the customer premises 400 (customer-identification association) are necessary.

In case "A-2", the order reception unit 10 accepts an order for service opening from the customer (step S201A). The order reception unit passes order data to the service order unit (step S204A).

The service order unit 11 may instruct the shipment unit 12 to ship the ONU 19 in accordance with the order data from the customer (not shown).

At the time of shipment from the factory, the shipment unit 12 ships the ONU 19 having identification information or authentication information unique to the ONU to the logistics center 300 (step S202A).

The dispatch unit 13 transmits the identification information or the authentication information displayed as a QR code or the like to the service order unit 11 (step S203A). When individual identification information or authentication information is transmitted to the service order unit through the association information, step S203A may be omitted.

In case "A-2", the identification information or the authentication information is assigned to the ONU at the time of shipment, and thus the shipment unit 12 may pass the identification information or the authentication information assigned to the ONU to the service order unit. The dispatch unit 13 may acquire the identification information or the authentication information and pass the acquired identification information or authentication information to the service order unit 11.

The service order unit 11 transmits customer information including customer's location information represented by a QR code or the like to the dispatch unit 13 (step S205A).

The dispatch unit 13 dispatches the ONU 19 having the unique identification information or authentication information to the customer premises 400 on the basis of the transmitted customer information (step S206A).

In case "A-2", the service order unit 11 sends a written directive in which the customer information or customer's location information (e.g., information represented by a QR code) is described to the customer premises. At the customer premises, the customer information is associated with the individual identification information (a QR code, etc.) described in the written directive in accordance with an operation by the off-site worker using the terminal or the like (step S207A).

In case "A-2", the terminal associates the identification information or the authentication information of the device with the customer information described in the written directive in accordance with an operation by the off-site worker and transmits the association information to the service order unit 11 (step S208A). The service order unit 11 transmits the authentication information to the authentication unit 14 on the basis of the association information (step S209A).

In the communication system 1 of the present example, determination of any of; whether or not the time when the information was transmitted is within a predetermined range and whether or not the position detected in the time before or after that time is within a predetermined range as in modified examples 1, 3, and 5, and whether or not the identification information or the authentication information of the device (an ONU, etc.) is information included within a predetermined range as in modified examples 2 and 4 may be made. It is desirable that the determination result should be reflected in; the reception of the association information by the service order unit, the input of the association information or the authentication information from the service order unit to the authentication unit, and the determination of whether or not authentication has been permitted by the authentication unit.

As in modified examples 1, 3, and 5, there is an advantageous effect that it is possible to reduce the possibility that problems such as incorrect placement of a device (an ONU, etc.) will occur. Further, as in modified examples 2 and 4, there is an advantageous effect that it can be determined whether or not the device (an ONU, etc.) has been dispatched from the dispatch unit, without the individual devices and the association information of the customer being held in a distributed manner.

In case "A-2", the ONU 19 in the customer premises 400 transmits a service start request (e.g., a registration request) to the OLT 15 (step S210A). The OLT 15 inquires of the authentication unit 14 whether or not authentication has been permitted (step S211A). The authentication unit 14 transmits information representing permission of the authentication to the OLT 15 on the basis of the authentication information (step S212A). The OLT 15 transmits information for the service start (e.g., registration information for registration) to the ONU 19 (step S213A).

In case "A-2", there are 13 exchanges (12 exchanges if identification is not performed), and visit of an off-site worker to the customer premises 400 (customer-identification association) is necessary. An advantageous effect is that the work of the on-site worker at the logistics center 300 is reduced. A problem is that it is difficult to identify whether or not it is a legitimate ONU (a dispatched ONU). Even inappropriate ONUs will be connected to the PON system. It should be noted that even if one-to-one identification of the ONU cannot be made, it is possible to identify the ONU 19 on the basis of whether or not the positional information or the like of the ONU 19 is within a predetermined range.

In case "A-3", the order reception unit 10 receives an order for service opening from the customer (step S301A). The order reception unit 10 passes order data to the service order unit 11 (step S304A).

The service order unit 11 may instruct the shipment unit 12 to ship the ONU 19 in accordance with the order data from the customer (not shown).

At the time of shipment from the factory, the shipment unit 12 ships the ONU 19 having identification information or authentication information unique to the ONU to the logistics center 300 (step S302A).

The dispatch unit 13 transmits the identification information or the authentication information displayed as a QR code or the like to the service order unit 11 (step S303A). When individual identification information or authentication information is transmitted to the service order unit through the association information, step S303A may be omitted.

In case "A-3", the identification information or the authentication information is assigned to the ONU at the time of shipment, and thus the shipment unit 12 may pass the identification information or the authentication information assigned to the ONU to the service order unit. The dispatch unit 13 may acquire the identification information or the authentication information and pass the acquired identification information or authentication information to the service order unit 11.

The service order unit 11 transmits customer information including customer's location information represented by a QR code or the like to the dispatch unit 13 (step S305A).

The dispatch unit 13 associates the customer information with the identification information or the authentication information. The dispatch unit 13 executes a process of dispatching the ONU 19 having the identification information or the authentication information corresponding to the association to the customer premises 400 on the basis of the transmitted customer information (step S306A).

In case "A-3", the dispatch unit 13 transmits the association information to the service order unit 11 (step S307A). The service order unit 11 transmits the authentication information to the authentication unit 14 on the basis of the association information (step S308A).

In the communication system 1 of the present example, determination of any of; whether or not the time when the information was transmitted is within a predetermined range and whether or not the position detected in the time before or after that time is within a predetermined range as in modified examples 1, 3, and 5, and whether or not the identification information or the authentication information of the device (an ONU, etc.) is information included within a predetermined range as in modified examples 2 and 4 may be made. It is desirable that the determination result should be reflected in; the reception of the association information by the service order unit, the input of the association information or the authentication information from the service order unit to the authentication unit, and the determination of whether or not authentication has been permitted by the authentication unit.

As in modified examples 1, 3 and 5, there is an advantageous effect that it is possible to reduce the possibility that problems such as incorrect placement of the device (an ONU, etc.) will occur. Further, as in modified examples 2 and 4, there is an advantageous effect that it can be determined whether or not the device (an ONU, etc.) has been dispatched from the dispatch unit, without the individual devices and the association information of the customer being held in a distributed manner.

In case "A-3", the ONU 19 in the customer premises 400 transmits a service start request (e.g., a registration request) to the OLT 15 (step S309A). The OLT 15 inquires of the authentication unit 14 whether or not authentication has been permitted (step S310A). The authentication unit 14 transmits information representing permission of the authentication to the OLT 15 on the basis of the authentication information (step S311A). The OLT 15 transmits service start information (e.g., registration information for registration) to the ONU 19 (step S312A).

In case "A-3", there are 12 exchanges. An advantageous effect is that it is not necessary for an off-site worker to visit the customer premises 400. Off-site work (at the customer premises, etc.) is reduced. Since the service order unit 11 does not transmit the written directive to the outside, the risk of leakage is reduced. A problem is that the branch fiber with which the ONU 19 communicates and the identification information of the installation location (e.g., an optical outlet) at the end of the branch fiber are unknown. Therefore, even an inappropriate ONU can connect to the PON system.

In case "A-4", the order reception unit 10 receives an order for service opening from the customer (step S401A). The order reception unit 10 passes order data to the service order unit 11 (step S404A).

At the time of shipment from the factory, the shipment unit 12 ships the ONU 19 having identification information or authentication information unique to the ONU to the logistics center 300 (step S402A).

The dispatch unit 13 transmits the identification information or the authentication information displayed as a QR code or the like to the service order unit 11 (step S403A). When individual identification information or authentication information is transmitted to the service order unit through the association information, step S403A may be omitted.

In case "A-4", the identification information or the authentication information is assigned to the ONU at the time of shipment. Therefore the shipment unit 12 may pass the identification information or the authentication information assigned to the ONU to the service order unit. The dispatch unit 13 may acquire the identification information or the authentication information and pass the acquired identification information or authentication information to the service order unit 11.

The service order unit 11 transmits customer information including customer's location information represented by a QR code or the like to the dispatch unit 13 (step S405A).

The dispatch unit 13 dispatches the ONU 19 having the identification information or the authentication information of the device at the time of shipment from the factory to the customer premises 400 (step S406A).

In case "A-4", in the customer premises 400, the identification information or the authentication information of the device (an ONU, etc.) and the information that is associated with the customer or the customer's location in advance are transmitted together, thereby the identification information or the authentication information of the device (an ONU, etc.) is associated with the customer or the customer's location in accordance with an operation by the customer. Alternatively, the identification information or the authentication information of the device (an ONU, etc.) are transmitted from the terminal 18 or line that is associated with the customer in advance, thereby the identification information or the authentication information of the device (an ONU, etc.) is associated with the customer or the customer's location in accordance with an operation by the customer.

The terminal 18 transmits the association information to the service order unit 11 (step S407A). The service order unit 11 transmits the authentication information to the authentication unit 14 on the basis of the association information (step S408A).

In the communication system 1 of the present example, determination of any of; whether or not the time when the information was transmitted is within a predetermined range and whether or not the position detected in the time before or after that time is within a predetermined range as in modified examples 1, 3, and 5, and whether or not the identification information or the authentication information of the device (an ONU, etc.) is information included within a predetermined range as in modified examples 2 and 4 may be made. It is desirable that the determination result should be reflected in; the reception of the association information by the service order unit, the input of the association information or the authentication information from the service order unit to the authentication unit, and the determination of whether or not authentication by the authentication unit has been permitted.

As in modified examples 1, 3 and 5, there is an advantageous effect that it is possible to reduce the possibility that problems such as incorrect placement of a device (an ONU, etc.) will occur. Further, as in modified examples 2 and 4, there is an advantageous effect that it can be determined whether or not the device (an ONU, etc.) has been dispatched from the dispatch unit, without the individual devices and the association information of the customer being held in a distributed manner.

In case "A-4", the ONU 19 in the customer premises 400 transmits a service start request (e.g., a registration request) to the OLT 15 (step S409A). The OLT 15 inquires of the authentication unit 14 whether or not authentication has been permitted (step S410A). The authentication unit 14 transmits information representing permission of the authentication to the OLT 15 on the basis of the authentication information (step S411A). The OLT 15 transmits the service start (e.g., registration information Z for registration) to the ONU 19 (step S412A).

In case "A-4", there are 12 exchanges (11 exchanges if identification is not performed). An advantageous effect is that, as in case "A-2", it is not necessary for an off-site worker to visit the customer premises 400. The work at the logistics center 300 is reduced. As in case "A-3", off-site work is reduced. Since the service order unit 11 does not transmit the written directive to the outside, the risk of leakage is reduced. An inappropriate ONU does not connect to the PON system. A problem is that as in case "A-2", it is difficult to identify whether or not it is a legitimate ONU (a dispatched ONU). There is a possibility that an ONU 19 that is not dispatched from the logistics center 300 may illegally access the PON system.

It should be noted that even if one-to-one identification of the ONU cannot be made, it is possible to identify the ONU 19 on the basis of whether or not the positional information or the like of the ONU 19 is within a predetermined range. Similarly to case "A-3", the branch fiber with which the ONU 19 communicates is unknown. When the identification information of the installation location (e.g., an optical outlet) of the customer premises 400 is used in combination, the authentication unit 14 can identify the identification information of the branch fiber with which the ONU 19 communicates.

FIG. 3 is a sequence showing an operation of the communication system 1 when identification information or authentication information different from the unique identification information or authentication information assigned to the ONU at the time of shipment from the factory (e.g., information such as a QR code) is assigned to the ONU. In FIG. 3, the vertical arrows from top to bottom indicate a flow of time. The horizontal arrows connecting the vertical arrows indicating the flow of time indicate the interaction between the places or functional units. The fact that the sequential order of interaction may be partially changed is the same as in the case of FIG. 2.

In case "B-1", the order reception unit 10 receives an order for service opening from the customer (step S101B). The order reception unit 10 passes order data to the service order unit (step S104B).

The service order unit 11 may instruct the shipment unit 12 to ship the ONU 19 in accordance with the order data from the customer. A plurality of orders may be combined. The service order unit 11 may give an instruction in accordance with a plan, a forecast, or an inventory quantity (e.g., an inventory quantity of devices in a factory). From the viewpoint of suppressing retention of customer information by making the correspondence between the customer and the ONU unknown at the time when one of the plurality of ONUs to which the identification information or the authentication information within a predetermined range is assigned is delivered to the customer, it is desirable that either the instruction or the shipment should not be executed for each order. When executed for each order, it is desirable to instruct or ship so that the identification information or the authentication information of the shipped ONU is not uniquely determined.

The shipment unit 12 ships the ONU 19 to the logistics center 300 (step S102B). The ONU 19 may be shipped by an operation by an on-site worker.

The order reception unit 10 transmits the identification information or the authentication information displayed as a QR code or the like to the service order unit 11 (step S103B).

The service order unit 11 transmits the customer information including the customer's location information shown in a format of a QR code or the like to the dispatch unit 13 (step S104B).

The dispatch unit 13 assigns identification information or authentication information (e.g., information in the format of a QR code, etc.) to the ONU. The dispatch unit 13 associates the customer information with the identification information or the authentication information. The dispatch unit 13 delivers the ONU to the customer premises 400, on the basis of the customer information associated with the ONU 19 having the assigned identification information or authentication information (e.g., a format of a QR code) (step S105B).

In case "B-1", the dispatch unit 13 transmits the association information representing the individual identification information assigned to the customer information and that customer information, to the service order unit 11 (step S106B). Hereinafter, the assignment of the identification information or the authentication information and the "customer-identification association" are referred to as "customer-identification assignment".

The service order unit 11 sends a written directive in which customer information or customer's location (e.g., represented by a QR code) is described to the customer premises (a customer's location). Specifically, the service order unit 11 transmits the written directive to the terminal operated by the off-site worker. The service order unit 11 passes the written directive in which the customer information or the customer's location is described to the off-site worker, who carries the written directive with him/her during the work. At the customer premises, the identification information or the authentication information of the device is associated with the customer information described in the written directive in accordance with an operation by the off-site worker using the terminal or the like (step S107B).

In case "B-1", the terminal transmits the association information associated, for example, by reading a QR code to the service order unit 11 in accordance with an operation by the off-site worker. The service order unit 11 confirms the consistency between the association information acquired from the dispatch unit 13 and the association information acquired from the terminal. That is, the service order unit 11 confirms that the ONU 19 associated with the customer is installed in the corresponding customer premises 400 (step S108B). The service order unit 11 transmits the authentication information to the authentication unit 14 on the basis of the association information (step S109B).

In the communication system 1 of the present example, determination of any of; whether or not the time when the information was transmitted is within a predetermined range and whether or not the position detected in the time before or after that time is within a predetermined range as in modified examples 1, 3, and 5, and whether or not the identification information or the authentication information of the device (an ONU, etc.) is information included within a predetermined range as in modified examples 2 and 4 may be made. It is desirable that the determination result should be reflected in; the reception of the association information by the service order unit, the input of the association information or the authentication information from the service order unit to the authentication unit, and the determination of whether or not authentication by the authentication unit has been permitted.

As in modified examples 1, 3, and 5, there is an advantageous effect that it is possible to reduce the possibility that problems such as incorrect placement of a device (an ONU, etc.) will occur. Further, as in modified examples 2 and 4, there is an advantageous effect that it can be determined whether or not the device (an ONU, etc.) has been dispatched from the dispatch unit, without the individual devices and the association information of the customer being held in a distributed manner.

In case "B-1", the ONU 19 in the customer premises 400 transmits a service start request (e.g., a registration request) to the OLT 15 (step S110B). The OLT 15 inquires of the authentication unit 14 whether or not authentication has been permitted (step S111B). The authentication unit 14 transmits information representing permission of the authentication to the OLT 15 on the basis of the authentication information (step S112B). The OLT 15 transmits the service start (e.g., registration information for registration) to the ONU 19 (step S113B).

In case "B-1", there are 13 exchanges (12 exchanges if the association information is not returned), and work in the dispatch unit (customer-identification association) and a visit of an off-site worker to the customer premises 400 are necessary.

When the on-site worker does not perform the assignment work (association work) at the central office (on-site) or the like, case "B-2" is substantially the same as case "B-1".

In case "B-3", the order reception unit 10 receives an order for service opening from the customer (step S301B). The order reception unit passes order data to the service order unit (step S304B).

The shipment unit 12 ships the ONU 19 to the logistics center 300 (step S302B). The order reception unit 10 transmits the identification information or the authentication information displayed as a QR code or the like to the service order unit 11 (step S103B).

The service order unit 11 transmits customer information including customer's location information to the dispatch unit 13 (step S304B). The dispatch unit 13 assigns the identification information or the authentication information (e.g., represented by a QR code, etc.) to the ONU. The dispatch unit 13 associates the customer information with the identification information or the authentication information. The dispatch unit 13 dispatches the ONU 19 having the identification information or the authentication information corresponding to the association to the customer premises 400 on the basis of the transmitted customer information (step S305B).

In case "B-3", the dispatch unit 13 transmits the association information to the service order unit 11 (step S306B). The service order unit 11 transmits the authentication information to the authentication unit 14 on the basis of the association information (step S307B).

In the communication system 1 of the present example, determination of any of; whether or not the time when the information was transmitted is within a predetermined range and whether or not the position detected in the time before or after that time is within a predetermined range as in modified examples 1, 3, and 5, and whether or not the identification information or the authentication information of the device (an ONU, etc.) is information included within a predetermined range as in modified examples 2 and 4 may be made. It is desirable that the determination result should be reflected in; the reception of the association information by the service order unit, the input of the association information or the authentication information from the service order unit to the authentication unit, and the determination of whether or not authentication by the authentication unit has been permitted.

As in modified examples 1, 3, and 5, there is an advantageous effect that it is possible to reduce the possibility that problems such as incorrect placement of a device (an ONU, etc.) will occur. Further, as in modified examples 2 and 4, there is an advantageous effect that it can be determined whether or not the device (an ONU, etc.) has been dispatched from the dispatch unit, without the individual devices and the association information of the customer being held in a distributed manner.

In case "B-3", the ONU 19 in the customer premises 400 transmits a service start request (e.g., a registration request) to the OLT 15 (step S308B). The OLT 15 inquires of the authentication unit 14 whether or not authentication has been permitted (step S309B). The authentication unit 14 transmits information representing permission of the authentication to the OLT 15 on the basis of the authentication information (step S310B). The OLT 15 transmits the service start (e.g., registration information for registration) to the ONU 19 (step S311B).

In case "B-3", there are 11 exchanges (10 exchanges if the association information is not returned). An advantageous effect is that it is not necessary for an off-site worker to visit the customer premises 400. Off-site work (at the customer premises, etc.) is reduced. Since the service order unit 11 does not transmit the written directive to the outside, the risk of leakage is reduced. A problem is that the branch fiber with which the ONU 19 communicates and the identification information of the installation location (e.g., an optical outlet) at the end of the branch fiber are unknown. Therefore, even an inappropriate ONU can connect to the PON system.

In case "B-4", the order reception unit 10 receives an order for service opening from the customer (step S401B). The order reception unit 10 passes order data to the service order unit 11 (step S404B).

The service order unit 11 may instruct the shipment unit 12 to ship the ONU 19 in accordance with the order data from the customer (not shown).

The shipment unit 12 ships the ONU 19 to the logistics center 300 (step S402B). The ONU 19 may be shipped by an operation by an on-site worker.

The dispatch unit 13 transmits the identification information or the authentication information displayed as a QR code or the like to the service order unit 11 (step S403B). Here, the dispatch unit may transmit the individual identification information or authentication information, or the shipment unit may transmit the individual identification information or authentication information. Further, the transmission process may also be executed by an operation performed by an on-site worker. When individual identification information or authentication information is transmitted to the service order unit through the association information, step S403B may be omitted.

The service order unit 11 transmits customer information including customer's location information represented by a QR code or the like to the dispatch unit 13 (step S404B). The dispatch unit 13 assigns identification information or authentication information represented by a QR code or the like to the device (an ONU, etc.). The dispatch unit 13 associates the customer information with the identification information or the authentication information. The dispatch unit 13 dispatches the ONU 19 having the assigned identification information or authentication information to the customer premises 400 (step S405B).

The dispatch unit 13 transmits the association information to the service order unit 11 (step S406B).

In case "B-4", in the customer premises 400, the identification information or the authentication information of the device (an ONU, etc.) and the information that is associated with the customer or the customer's location in advance are transmitted together, thereby the identification information or the authentication information of the device (an ONU, etc.) is associated with the customer or the customer's location in accordance with an operation by the customer. Alternatively, the identification information or the authentication information of the device (an ONU, etc.) is transmitted from the terminal 18 or line that is associated with the customer in advance, thereby the identification information or the authentication information of the device (an ONU, etc.) is associated with the customer or the customer's location in accordance with an operation by the customer.

The terminal 18 transmits the association information to the service order unit 11 (step S407B). The service order unit 11 transmits the authentication information to the authentication unit 14 on the basis of the association information (step S408B).

In the communication system 1 of the present example, determination of any of; whether or not the time when the information was transmitted is within a predetermined range and whether or not the position detected in the time before or after that time is within a predetermined range as in modified examples 1, 3, and 5, and whether or not the identification information or the authentication information of the device (an ONU, etc.) is information included within a predetermined range as in modified examples 2 and 4 may be made. It is desirable that the determination result should be reflected in; the reception of the association information by the service order unit, the input of the association information or the authentication information from the service order unit to the authentication unit, and the determination of whether or not authentication by the authentication unit has been permitted.

As in modified examples 1, 3 and 5, there is an advantageous effect that it is possible to reduce the possibility that problems such as incorrect placement of a device (an ONU, etc.) will occur. Further, as in modified examples 2 and 4, there is an advantageous effect that it can be determined whether or not the device (an ONU, etc.) has been dispatched from the dispatch unit, without the individual devices and the association information of the customer being held in a distributed manner.

In case "B-4", the ONU 19 in the customer premises 400 transmits a service start request (e.g., a registration request) to the OLT 15 (step S409B). The OLT 15 inquires of the authentication unit 14 whether or not authentication has been permitted (step S410B). The authentication unit 14 transmits information representing permission of the authentication to the OLT 15 on the basis of the authentication information (step S411B). The OLT 15 transmits the service start (e.g., registration information for registration) to the ONU 19 (step S412B).

In case "B-4", there are 12 exchanges (10 exchanges if the association information is not returned). An advantageous effect is that, as in case "B-3", off-site work is reduced. Since the service order unit 11 does not transmit the written directive to the outside, the risk of leakage is reduced. An inappropriate ONU does not connect to the PON system. A problem is that, as in case "B-3", the identification information of the branch fiber with which the ONU 19 communicates is unknown. It should be noted that if the identification information of the installation location (e.g., an optical outlet) of the customer premises 400 is used in combination, the authentication unit 14 can identify the identification information of the branch fiber with which the ONU 19 communicates.

Figure 5:
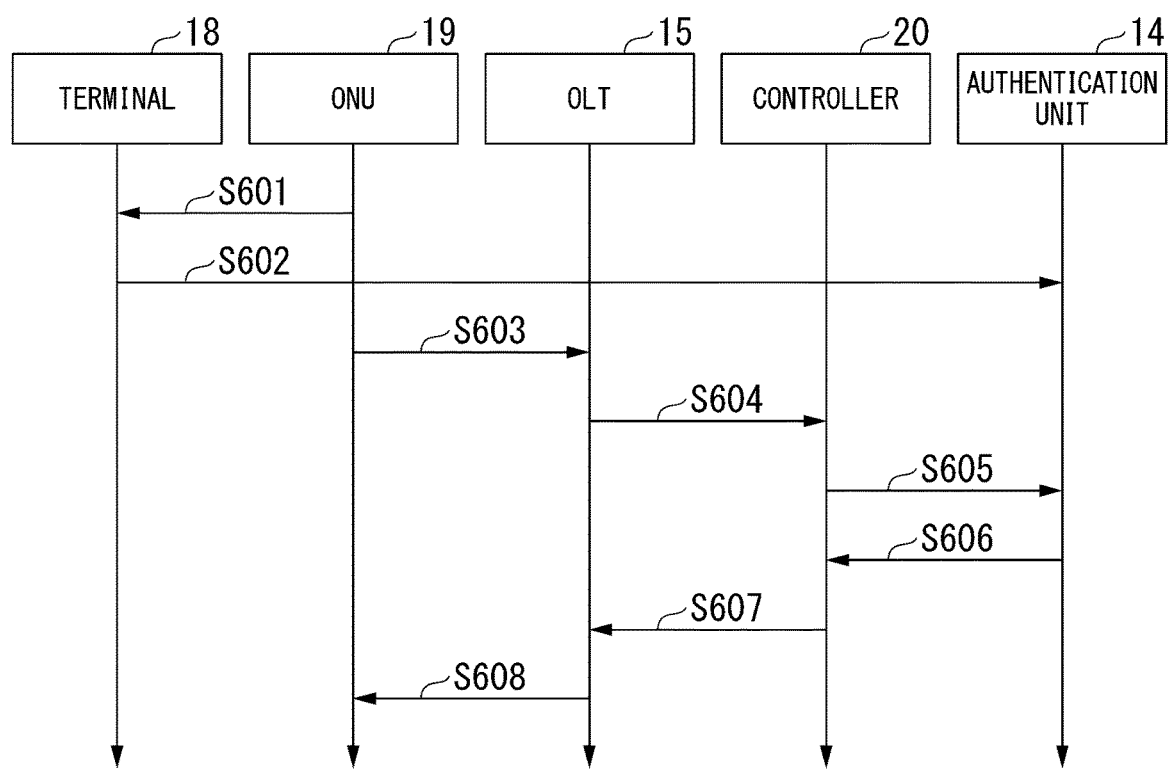
FIG. 5 is a sequence diagram showing an example of processing after an order and an opening service order in which the customer's work (A-4) is performed.
Figure 6:
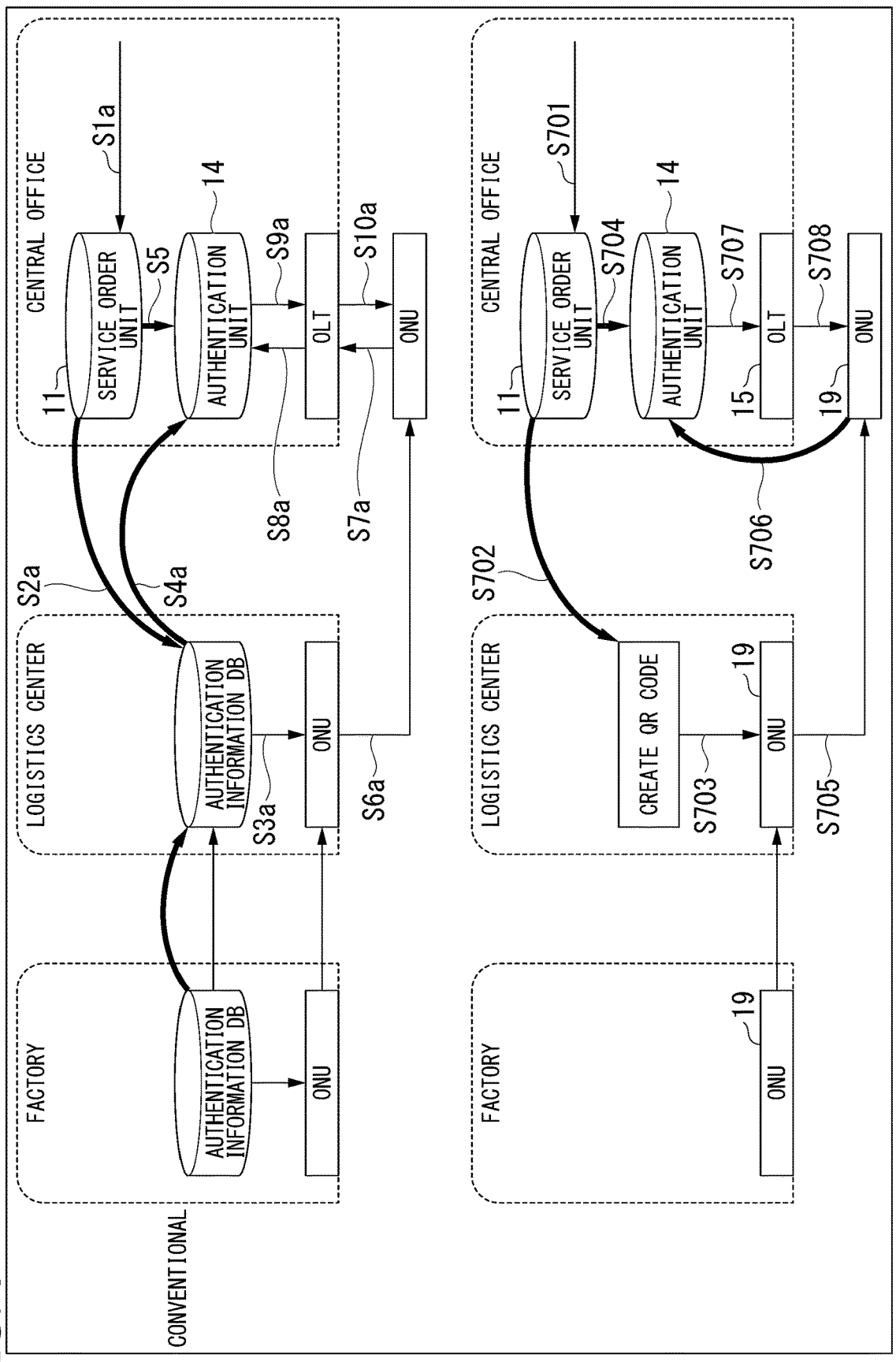
FIG. 6 is a diagram showing an example of a procedure of opening a line in which the operating man-hours are reduced.

It should be noted that when the ONU procured by the customer is allowed to access the PON system, if the customer uses the ONU procured by the customer, some of the exchanges (steps), the functional units, the places, and the work (assignment work, etc.) may be excluded from the operations (steps) illustrated in FIG. 5 and FIG. 6.

Figure 4:
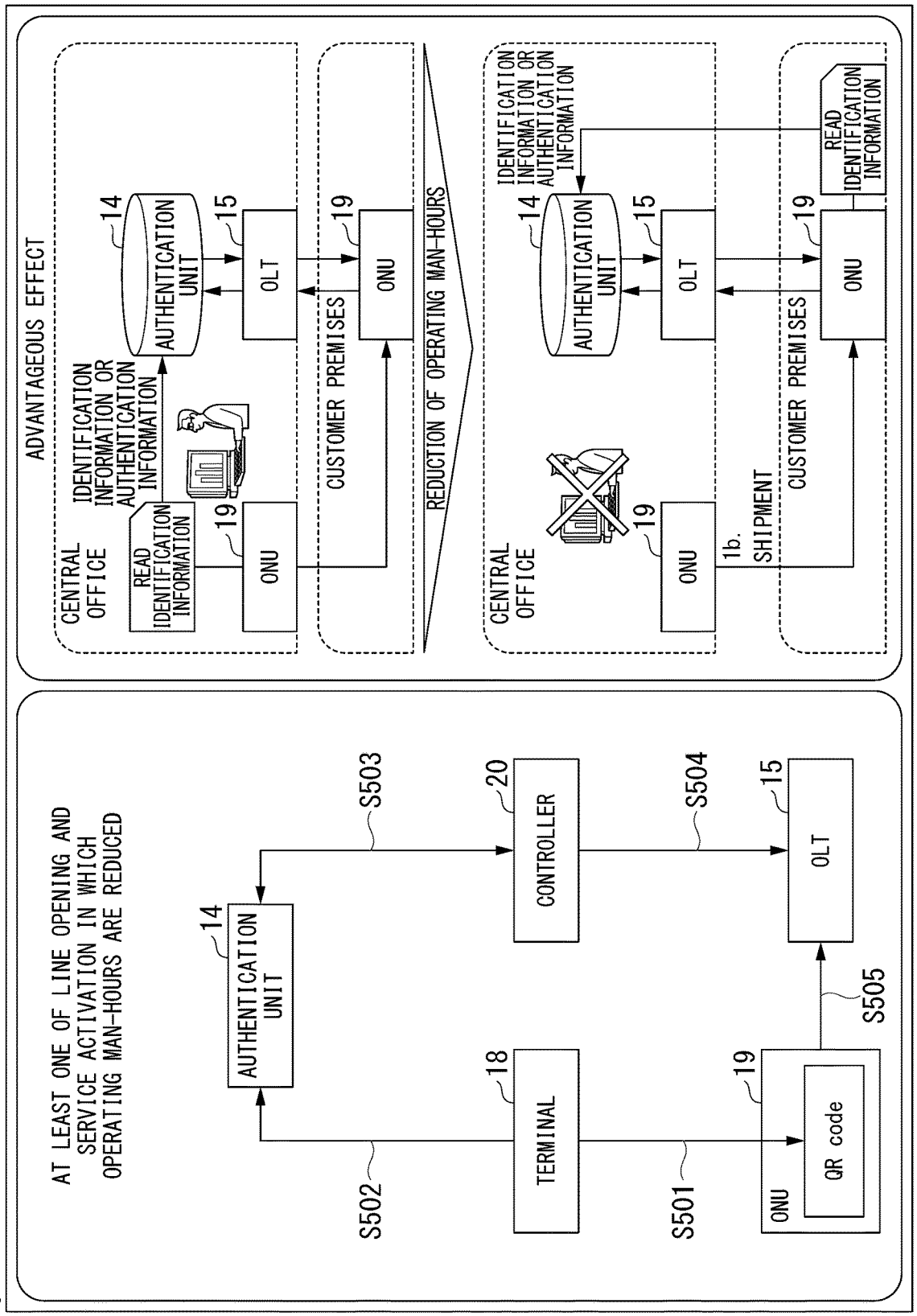
FIG. 4 is a diagram showing an example of an operation and an advantageous effect of at least one of opening of a line and activation of a service in which the operating man-hours are reduced.

FIG. 4 is a diagram showing an example of an operation and advantageous effect of at least one of line opening and service activation in which the operating man-hours are reduced. The left side in FIG. 4 shows the line opening and the service activation in which the operating man-hours are reduced in case "A-4" shown in FIG. 2.

The terminal 18 reads identification information represented by a QR code attached to the ONU 19 (step S501). The terminal 18 outputs the identification information represented by the QR code to the authentication unit 14 (step S502). Here, in FIG. 2 and FIG. 3, the identification information is transmitted to the authentication unit via the service order unit, but similarly in FIG. 4, the identification information may be transmitted to the authentication unit via the service order unit. The authentication unit 14 executes a preparation process for authentication (step S503). The controller 20 outputs control information for line opening to the OLT 15 (step S504). The ONU 19 outputs information (a registration request, etc.) for opening the line to the OLT 15. It should be noted that when the ONU 19 is capable of constantly or periodically outputting the information for line opening to the OLT 15, the ONU 19 may output before the steps of S501 to S504. (step S505).

The right side of FIG. 4 shows the result of comparison between the advantageous effect of case "A-3" (upper row) shown in FIG. 2 and the advantageous effect of case "A-4" (lower row) shown in FIG. 2. In case "A-4", the on-site work is reduced. In FIG. 4, the operation using the identification information and the QR code or the like is illustrated; however, the identification information may be the same as the authentication information. The QR code may be in other formats (e.g., a barcode, an RFID, an NFC tag, etc.). Moreover, FIG. 4 and FIG. 5 show an example in which a terminal or a line that is associated with the customer in advance is used; however, a similar operation is performed even if the information that is associated with the customer or the customer's location in advance and the identification information or the authentication information are transmitted together. It should be noted that although line opening has been illustrated, the same applies to the case of line closing, service activation, and service deactivation, except that the ONU 19 in step S505 does not output the information (a registration request, etc.) for line opening to the OLT 15. This also applies to the description of the following drawings.

FIG. 5 is a sequence diagram showing an example of processing in which the customer's work (case "A-4") is performed after placement of an order and opening service order. In FIG. 5, when a terminal or a line that is associated in advance is used, the association of customer information and line information has already been completed. In FIG. 5, only the processing after the order and the opening service order is shown. Although FIG. 5 is a diagram showing an example of line opening, a diagram showing the operation of service activation is the same as FIG. 5.

In FIG. 5, the authentication unit 14 may store the association information. The authentication unit 14 may inquire of, for example, the service order unit, for the association information. The authentication unit 14 may pass the information transmitted in step S602 or a part thereof to, for example, the service order unit. The authentication unit 14 may inquire of the service order unit whether or not the information is correct.

The authentication unit 14 may authenticate the device, the customer, or the service on the basis of; a value obtained by calculating the information transmitted in step S602 or a part of the information (e.g., authentication information or identification information, associated customer information, etc.) and a value obtained by calculating, for example, the information to be processed by the service order unit. The same applies in each case.

The terminal 18 reads identification information represented by a QR code attached to the ONU 19 (step S601). As in step S407A of case "A-4", the terminal 18 outputs the identification information represented by the QR code and the identification information of the SIM card or the like of the terminal 18 that has been associated with the customer to the authentication unit 14 (step S602). Here, in FIG. 2 and FIG. 3, the identification information is transmitted to the authentication unit via the service order unit, and the same may be applied to FIG. 5. As in step S409A of case "A-4", the ONU 19 outputs a registration request to the OLT 15 (step S603). The OLT 15 outputs an authentication request to the controller 20 (step S604). The controller 20 outputs the authentication request to the authentication unit 14 (step S605). The authentication unit 14 outputs information representing permission of authentication to the controller 20 (step S606). The controller 20 outputs the information representing permission of authentication to the OLT 15 (step S607). The OLT 15 outputs the registration information to the ONU 19 (step S608).

In FIG. 5, the operation using the identification information and the QR code is illustrated, but the identification information may be the same as the authentication information. The QR code may be in other formats (e.g., a barcode, an RFID, an NFC tag, etc.).

In step S602, the information does not have to be directly output from the terminal 18 to the authentication unit 14. As shown in FIG. 2 and FIG. 3, the terminal 18 may output the information to the authentication unit 14 via the service order unit. When the terminal 18 outputs the information to the authentication unit 14 via the service order unit, there is an advantageous effect that the service order unit can manage the information in an integrated fashion. When the terminal 18 outputs the information to the authentication unit 14 via the service order unit, it is desirable that only the identification information or the authentication information should be transmitted to the authentication unit 14.

In the configurations shown in FIG. 2 and FIG. 3, the terminal 18 may output the information directly to the authentication unit 14 without going through the service order unit 11. When the terminal 18 outputs the information directly to the authentication unit 14 without going through the service order unit 11, there is an advantageous effect that the customer information is localized. It should be noted that when the terminal 18 outputs the information directly to the authentication unit 14, the authentication unit 14 may inquire of the service order unit about only the association information between the information on the terminal or the line and the information on the customer or the customer's location. The authentication unit 14 may confirm with the service order unit whether or not there is customer information that is the target of service opening. The same applies in each case. It should be noted that although line opening is illustrated, the cases of line closing, service activation, and service deactivation are also the same as for line opening except that the ONU 19 does not output the registration request or the like to the OLT 15 in step S603.

FIG. 6 is a diagram showing an example of a line opening procedure in which the operating man-hours are reduced. The upper row shows the conventional procedure. The service order unit 11 acquires the service order for opening "ordering" (step S1a). The service order unit 11 outputs the customer information and the shipment instruction to the logistics center (step S2a). The dispatch unit of the logistics center confirms the authentication information of the ONU (step S3a). The dispatch unit of the logistics center outputs the authentication information of the ONU to the authentication unit 14. "Authentication information+customer information" indicates that the authentication information corresponds to the customer information (step S4a). The service order unit 11 outputs the customer information to the authentication unit 14 (step S5). The dispatch unit of the logistics center delivers the ONU to the customer premises (step S6a). The ONU outputs the authentication information to the OLT (step S7a). The OLT outputs the authentication information to the authentication unit 14 (step S8a). The OLT 15 acquires the information representing permission of authentication from the authentication unit 14 (step S9a). The OLT opens the line of the ONU in accordance with the permission of authentication (step S10a).

The lower row shows the procedure executed by the communication system 1. For example, the lower row (the present embodiment) shows the procedure for case "B-3" and case "B-4" shown in FIG. 3. In FIG. 6, when the terminal or the line that is associated with the customer information in advance is used, the association between the customer information and the terminal or the line information has already been completed. In FIG. 6 only the processing after placement of the order and the order for opening the service is shown. Here, the QR code is illustrated as the identification information or the authentication information; however, provided that the identification information or the authentication information for authentication is information such as a barcode, an RFID, or an NFC tag whereby the identification information can be read, the identification information or the authentication information may be any information.

The service order unit 11 acquires order data (step S701). The service order unit 11 outputs the identification information or the authentication information represented by the QR code to the dispatch unit 13 (step S702). The dispatch unit 13 associates the QR code with the ONU 19 (step S703). The service order unit 11 outputs the identification information or the authentication information (step S704). As in step S406A of case "A-4", the dispatch unit 13 delivers the ONU 19 to which the QR code is attached, to the customer premises 400 (step S705). As in step S407A of case "A-4", in the customer premises 400, the terminal 18 transmits information of the QR code of the ONU 19 to the authentication unit 14 (step S706). The OLT 15 acquires the information representing permission of authentication from the authentication unit 14 (step S707). The OLT opens the line of the ONU in accordance with the permission of authentication (step S708).

Here, the operation using the identification information and the QR code is illustrated, but the identification information may be the same as the authentication information. The QR code may be in other formats (e.g., a barcode, an RFID, an NFC tag, etc.).

In step S706, the information does not have to be directly output from the terminal 18 to the authentication unit 14. As shown in FIG. 2 and FIG. 3, the terminal 18 may output the information to the authentication unit 14 via the service order unit. When the terminal 18 outputs the information to the authentication unit 14 via the service order unit, there is an advantageous effect that the service order unit can manage the information in an integrated fashion. When the terminal 18 outputs the information to the authentication unit 14 via the service order unit, it is desirable that only the identification information or the authentication information should be transmitted to the authentication unit 14.

In the configurations shown in FIG. 2 and FIG. 3, the terminal 18 may output the information directly to the authentication unit 14 without going through the service order unit 11. When the terminal 18 outputs the information directly to the authentication unit 14 without going through the service order unit 11, there is an advantageous effect that the customer information is localized. It should be noted that when the terminal 18 outputs the information directly to the authentication unit 14, the authentication unit 14 may inquire of the service order unit about only the association information between the information on the terminal or the line and the information on the customer or the customer's location. The authentication unit 14 may confirm with the service order unit whether or not there is customer information that is the target of service opening. The same applies in each case.

Figure 7:
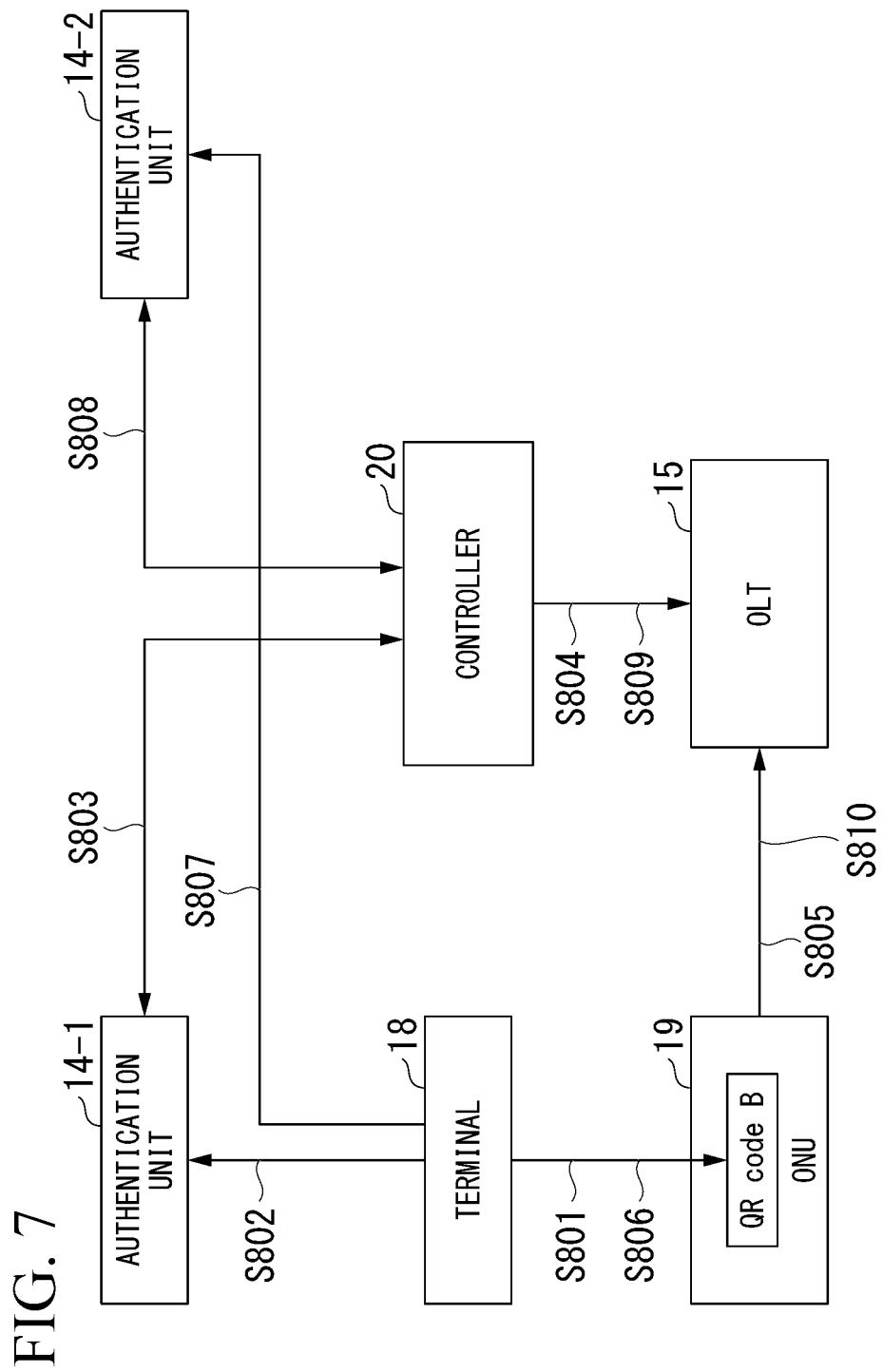
FIG. 7 is a diagram showing a first example of a procedure of opening of a line and service activation.

FIG. 7 is a diagram showing a first example of a procedure of line opening and service activation (case "A-4"). It should be noted that the same applies to the case of line closing and service deactivation. In FIG. 7, for line opening and service activation, different servers or functional units may execute authentication related to line opening or service opening.

Service activation is, for example, activation of a service for: bandwidth on demand (BoD) that changes the bandwidth setting or the like in accordance with the customer's request; assignment of a public or private address by a VPN connection between predetermined positions, an Internet connection, DHCP, or the like; security functions such as a subscriber gateway (SG), network address translation (NAT), a domain name system (DNS), a content delivery network (CDN); a firewall, virus scanning, or Web filtering; or the like.

Authenticity related to devices, customers, and services is held by a single authentication unit (e.g., an authentication unit 14-1 in FIG. 7). For example, when the request of step S807 has arrived at another authentication unit (e.g., an authentication unit 14-2 in FIG. 7), the authentication unit 14-2 makes an inquiry to the authentication unit 14-1. The authentication unit 14-2 may execute the authentication process on the basis of the result of the inquiry.

The authentication unit 14-1 and the authentication unit 14-2 may share the authentication result. When the authentication unit 14-2 determines that authentication is not permitted, the authentication unit 14-1 may determine that authentication is not permitted even for a result of the determination executed by the authentication unit 14-1 in the past.

The authentication unit 14-1 may re-execute the authentication process. The authentication unit 14-1 may request the terminal 18 for another registration request. This can reduce the number of places where the information related to authentication is held.

The authentication unit 14-1 may temporarily stop the key exchange involved in the authentication. The authentication unit 14-1 may request the terminal 18 for another registration request. This can reduce the possibility of incorrect authentication.

In FIG. 7, as an example, the authentication unit 14-1 is a server different from the authentication unit 14-2 provided in the central office. The authentication unit 14-1 may be a server located at a different site such as a different central office. The authentication unit 14-1 and the authentication unit 14-2 may execute the opening or the activation of the service for the same line. For example, when the communication system 1 provides a virtual network or a B2B2C service, from the viewpoint of the customer information held by the virtual network business operator and the middle B business operator of the business-to-business-to-consumer (B2B2C) service being hidden from the provider of the line, it is desirable that the provider of the line, the virtual network business operator, and the middle B business operator of the B2B2C service should be provided with authentication units different from each other.

From the viewpoint of isolating information between business operators, when a plurality of virtual network services and B2B2C services are accommodated in the OLT, it is desirable to provide different authentication units for respective virtual network business operators and respective middle B business operators.

As in each case, also in FIG. 7, the communication system executes line opening or service activation using the authenticated or associated terminal or line and the authentication information or the identification information of the device. For example, when a roaming service is activated and a virtual network service or a B2B2C service is provided, three business operators, namely a business operator that provides an authenticated or associated terminal or line, a business operator that provides another line, and a business operator that provides a virtual network service or a B2B2C service, may be involved with each other.

In FIG. 7, as the controller 20, for example, at least part of a Central Office Re-architected as a Datacenter (CORD) in a Box (CiaB) of the Open Networking Foundation (ONF) may be used. Another necessary authentication apparatus (a control apparatus) or the like may be provided. An authentication apparatus other than CiaB may be provided.

It should be noted that when a plurality of servers (the authentication unit 14-1 and the authentication unit 14-2) are arranged at different places, it is desirable that the respective servers that hold the functions should be connected via a secure line, for example, a VPN such as the security architecture for Internet protocol (IPSec), a leased line, or the like.

Here, the respective functions for the service provided by service activation are dispersedly located at different places. For example, in a communication system in which functions are divided into components (e.g., flexible access system architecture (FASA)), components of respective functions may be dispersedly located on a network. In this case, the components of the respective functions may execute the respective functions for the service provided by the service activation.

The components of the respective functions may execute the functions related to the construction or management of the communication system itself. The functions related to construction or management of the communication system itself include, for example, a function of a control signal, or a function related to processing of signals such as a signal related to dynamic bandwidth assignment (DBA) such as GATE and GRANT in a PON or a signal of an ONU management control interface (OMCI) or operation, administration and management (OAM), or the like.

In this way, when the components of the respective functions are dispersedly located, there is a possibility that miss connections occur between components of the respective functions and apparatuses that should not exchange signals with each other. There is a possibility that misconnections occur between components of the respective functions that should not exchange signals with each other. There is a possibility that components of respective functions and apparatuses that should exchange signals with each other are spoofed. For this reason, it is desirable that the exchange of the signals between the components of the respective functions should be secured for example as follows.

The calculation units (platforms) of the functional component, the functional component group, the server that accommodates the functional component, and the like each have a function of connecting using secure communication, such as a secure sockets layer (SSL) or a VPN. In this way, the calculation units exchange signals with each other by using such a function of connecting using secure communication.

The calculation units exchange signals with each other using; encryption, scrambling, processing similar to churn executed for upstream signals of the ONU, or the like using the transmitted information.

Each calculation unit executes encryption or scrambling on, for example, a value (a signal) to which at least a part of past information is attached, or a value in a predetermined range. Each calculation unit may assign the authentication information to the signal. Each calculation unit may exchange signals using a block chain.

The calculation units confirm the normality of the routes between the components of respective functions and exchange signals. For example, the authentication information is attached to the signal at each intersection of the routes of signals. The confirmation of normality is executed periodically. It should be noted that confirmation of normality is performed at the start or at the time of reconnection of an SSL or a VPN. The same applies below.

Each calculation unit acquires proof from a reliable apparatus or functional component. Each calculation unit confirms the normality of the routes on the basis of the acquired proof.

In the case in which a plurality of functional components (e.g., authentication units) are dispersedly located in a plurality of sites, it is desirable that the plurality of functional components should exchange signals with each other so as to reduce detours. The calculation units may be VLANs that differ for respective sites. The calculation units may execute VPN connections or SSL connections that are different from each other.

When looping back signals between sites and/or between apparatuses, different routers, different VPN endpoints, different VLAN connections, or different SSL connections may be used for respective loop backs. In particular, by setting different routers or endpoints of different VPNs for respective loop backs, it is easy to prevent a short circuit within the same site or within the same apparatus without passing through another site and/or another apparatus.

The same identifier is used for line opening and service activation (a service order). The information of the identifier to which is assigned the selection information indicating which one is to be selected, may be sent. The identifier may be associated with the number of times, for example, opening the line for the first time, service activation for the second time, service deactivation for the third time, and line closing for the fourth time. Different identifiers may be installed.

In FIG. 7, the terminal 18 sends the identification information directly to the authentication unit 14-1 for line opening and the authentication unit 14-2 for service. When a reception server or the like is arranged, the reception server or the like may distribute the identification information to each server.

The terminal 18 reads a QR code "B" of the ONU 19 (step S801). The terminal 18 transmits the information of the QR code "B" to the authentication unit 14-1 (step S802). Here, the terminal 18 may convert the information of the QR code "B" into information corresponding to a QR code "A". The information of the QR code "B" may be converted into information corresponding to the QR code "A" on the route from the terminal 18 to the authentication unit 14-1 or the authentication unit 14-2. The authentication unit 14-1 transmits the authentication information based on the QR code "B" to the controller (step S803). The controller 20 transmits a control signal for line opening (authentication permission) to the OLT 15 on the basis of the authentication information (step S804). The OLT 15 executes a line opening process (service activation) (step S805).

The terminal 18 reads the QR code "B" of the ONU 19 (step S806). The terminal 18 transmits the information of the QR code "B" to the authentication unit 14-2 (step S807). Here, the terminal 18 may convert the information of the QR code "B" into information corresponding to a QR code "C". The information of the QR code "B" may be converted into information corresponding to the QR code "C" on the route from the terminal 18 to the authentication unit 14-1 or the authentication unit 14-2. The authentication unit 14-2 transmits service information based on the QR code "B" (e.g., "Bandwidth on Demand"), to the controller 20 (step S808). The controller 20 transmits a control signal of a communication bandwidth to the OLT 15 on the basis of the service information (step S809). The OLT 15 executes allocation processing of the communication bandwidth (step S810).

In this way, in FIG. 7, there are a plurality of functional units that govern services. The authentication units 14 may share the same functional unit for their services. Authentication is executed in some of the functional units that govern the services, and the authentication information is distributed to other service functional units, thereby the number of places where the authentication information is secured is reduced.

Different business operators for different services have different service functions using the same hardware. Different business operators for different services make it appear as if different apparatuses for different carriers virtually exist. When the respective functional units are arranged on the same apparatus or server, the authentication information and the like are not managed; instead, it is possible to prevent a third party from physically accessing the authentication information. VLAN connections or SSL connections which are different for business operators may be used.

It should be noted that each authentication unit may include an order reception unit that receives an order from a service order unit or a customer. The authentication unit 14-1 and the authentication unit 14-2 may each include the controller 20. A plurality of controllers may control a single OLT. When there are a plurality of sets of service orders and order reception units, the authentication unit and the controller may have a single configuration. At the time of authentication, each authentication unit may inquire about the customer information held by the order reception unit or the service order unit and execute the authentication process. When there are a plurality of sets of order reception units, and the service order unit, the authentication unit, and the controller have a single configuration, at the time of authentication, the authentication unit may inquire about customer information held by the order reception units and execute the authentication process.

In the opening of the line and the opening of the first service, the terminal may associate the ONU with the customer. In the opening the line and the opening of the first service, the terminal may associate the line through the ONU with the customer. The service may be opened by passing the signal of the terminal through the ONU and the terminal requesting the authentication unit to perform authentication.

A plurality of authentication units or order reception units may be divided into layers and authentication may be performed for each layer. For example, the authentication unit 14-1 serving as the MAC layer opens the ONU. The authentication unit 14-2 serving as the IP layer permits conduction using a predetermined IP address. The authentication unit 14-2 dynamically allocates an IP address by DHCP or the like. The authentication unit 14-2 may permit conduction using this address. Layers may be separated into network-related layers and application-related layers. By executing separate authentication for each layer, authentication is performed in multiple stages. As a result, even if cracking is executed on any of the layers, its influence can be suppressed.

A plurality authentication units or order reception units or the like may execute the authentication processes for respective B2B2C middle B business operators. The plurality of authentication units or order reception units or the like may execute the authentication processes for respective carriers. The plurality of authentication units or order receiving units or the like respectively hold the customer information, thereby the customer information is held at places different from each other for respective carriers and respective middle B business operators. For respective carriers and respective middle B business operators, respective pieces of customer information are separated. In particular, it becomes easy to prevent information leakage by sending the association information through another line and providing only notification of permission/non-permission of the authentication in response to the authentication request from the OLT with respect to the portion common to other business operators.

In this way, services can be provided remotely, without passing authentication information or the like to other companies. Authentication information is exchanged not only by encrypting between authentication and devices but also by making it indecipherable by the OLT. In this configuration, the OLT is not a certificate authority. When a specific customer exists, the information on the customer of the ONU is registered, and when the information on that customer becomes unnecessary, the information on the customer of that ONU is deleted.

The division based on the layers may be combined with the division based on the middle B business operators. For example, the MAC layer may be authenticated by the carrier, and the IP layer and/or the application layer thereabove may be respectively authenticated by the middle B business operators.

Figure 8:
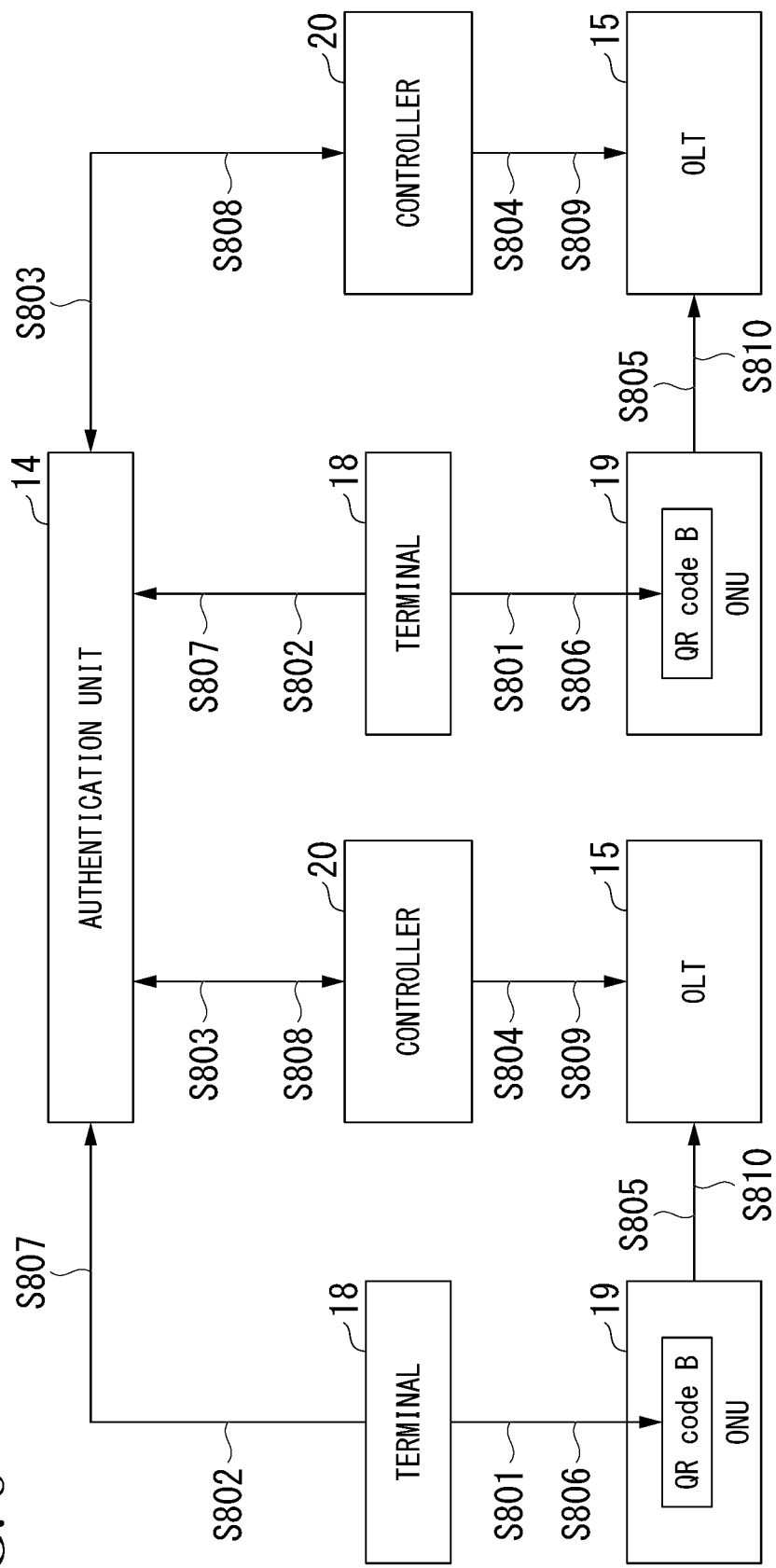
FIG. 8 is a diagram showing a second example of a procedure of opening of a line and service activation.

FIG. 8 is a diagram showing a second example of a procedure of line opening and service activation (case "A-4"). It should be noted that the same applies to the case of line closing and service deactivation. The authentication unit 14, which is divided into the authentication unit 14-1 and the authentication unit 14-2 in FIG. 7, is not divided in FIG. 8. Also, there are a plurality of terminals 18, a plurality of ONUs 19, a plurality of OLTs 15, and a plurality of controllers 20. For example, the plurality of OLTs 15 are installed at different places. Of the steps shown in FIG. 8 and the steps shown in FIG. 7, the operations of the steps having the same numbers are similar to each other.

It should be noted that the authentication unit may include a service order unit and an order reception unit that receives an order from a customer; the authentication unit may include components up to the controller, and a single controller may control different OLTs, for example, OLTs installed in different countries; conversely, only the service order and the order reception unit may be single, and the authentication unit may inquire about the customer information held by the order reception unit or the service order unit at the time of authentication and perform authentication; or there may be a plurality of sets of order reception units, there may be a service order unit, an authentication unit, and a controller, and the authentication unit may inquire about the customer information held by the order reception units at the time of authentication and perform authentication. Moreover only the opening of the line and/or the opening of the first service may be performed via the terminal, and after the ONU or the line via the ONU is associated with the customer, the opening may be performed by requesting authentication via the ONU.

For example, a single functional unit is installed in the home country of the business operator, and a plurality of functional units are installed in respective countries that provide the service. In this case, by holding customer information in a single functional unit and returning only permission/non-permission in response to authentication requests from a plurality of functional units, there is an advantageous effect that the customer information can be managed in its own country. In particular, it becomes easy to prevent information leakage by sending the association information through another line and providing only notification of permission/non-permission of the authentication in response to the authentication request from the OLT with respect to the portion installed in the other countries.

In this way, services can be provided safely and remotely. For example, when a virtual access service is provided at a remote place, even if the devices are dispersedly located, it is possible to provide the service remotely to the site where the service is to be provided, by aggregating the functions of the devices. For example, the service can be provided remotely without arranging customer information or the like in foreign countries. Authentication information is exchanged not only by encrypting between authentication and devices but also by making it indecipherable by the OLT. In this configuration, the OLT is not a certificate authority. When a specific customer exists, the information on the customer of the ONU is registered, and when the information on that customer becomes unnecessary, the information on the customer of that ONU is deleted.

The configurations of FIG. 7 and FIG. 8 may be combined. Specifically, it is a configuration where a plurality of authentication units and a plurality of OLTs are connected to each other.

Figure 9:
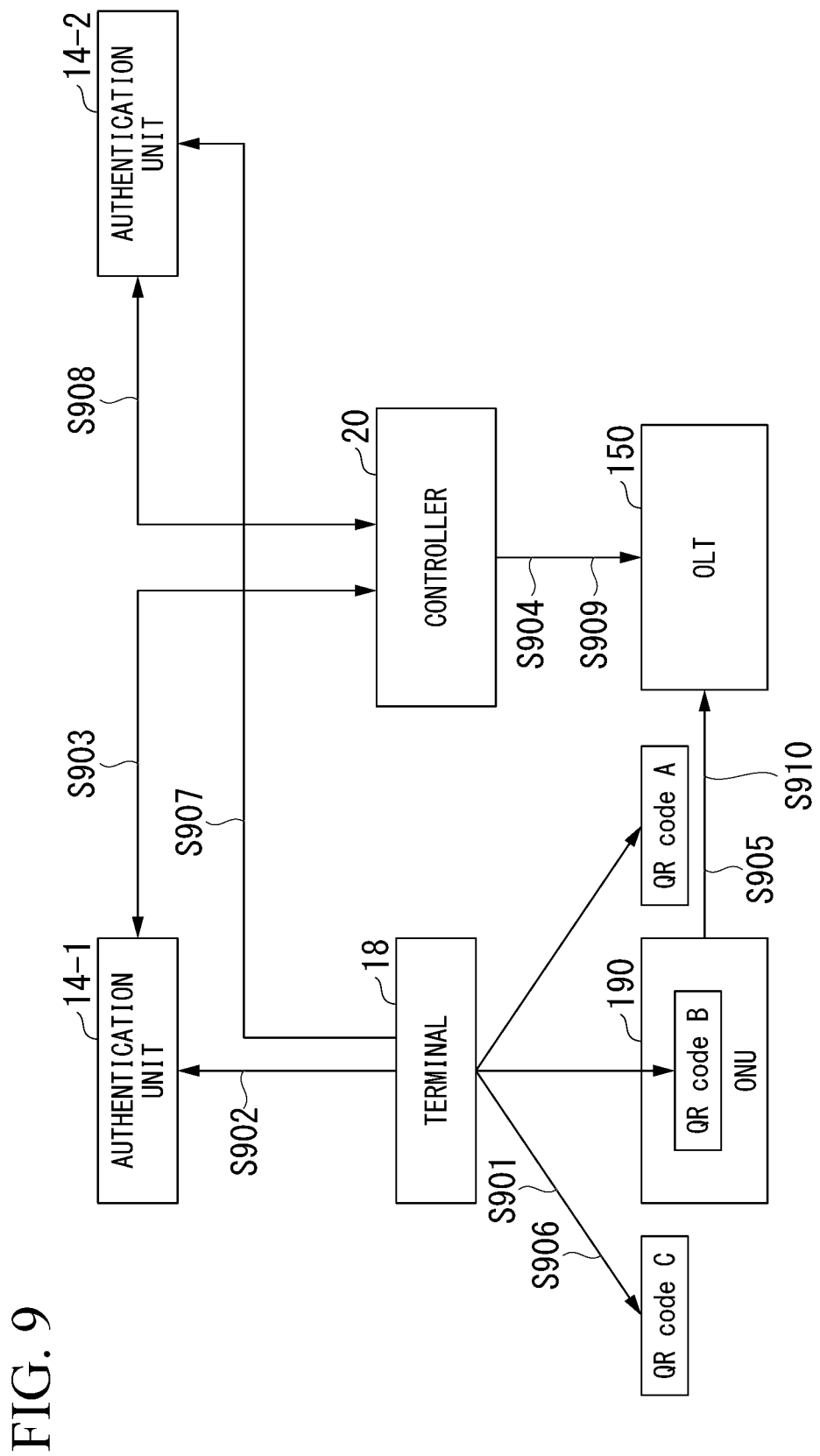
FIG. 9 is a diagram showing an example of a procedure of opening of a line and service activation in which information of an installation location (e.g., an optical outlet) is used for authentication.

FIG. 9 is a diagram showing an example of a procedure (case "A-4") of line opening and service activation, in which information on an installation location (e.g., an optical outlet) is used for authentication. FIG. 9 shows an example in which the identification information of the installation location of the customer premises 400 is used for authentication. Different QR codes may be used for line opening and service activation, or the same QR code may be used for line opening and service activation. In service activation, the terminal 18 of the customer reads the QR code of the installation location and the QR code for service activation. The terminal 18 of the customer may read the QR code of the ONU 19 and the QR code of the service activation.

The terminal 18 reads the QR code "A" of the installation location (e.g., an optical outlet) and the QR code "B" of an ONU 190 (an ONU) (step S901). The terminal 18 transmits the information of the QR code "A" of the installation location and the QR code "B" of the ONU 190 to the authentication unit 14-1 (step S902). The authentication unit 14-1 transmits authentication information based on the QR code "A" of the installation location and the QR code "B" of the ONU 190 to the controller 20 (step S903). The controller 20 transmits a control signal for line opening (authentication permission) to the OLT 150 (an OLT) on the basis of the authentication information (step S904). The OLT 150 executes a line opening process (service activation) (step S905).

The terminal 18 reads the QR code "A" at the installation location and the QR code "C" for service activation (step S906). The terminal 18 transmits the QR code "A" of the installation location and the QR code "C" for service activation to the authentication unit 14-2 (step S907). The authentication unit 14-2 transmits service information (e.g., related to BoD) based on the QR code "A" of the installation location and the QR code "C" for service activation to the controller 20 (step S908). The controller 20 transmits a control signal for changing the setting of the communication bandwidth corresponding to BoD to the OLT 150 on the basis of the service information (step S909). The OLT 150 executes allocation processing of the communication bandwidth (step S910).

In the configuration shown in FIG. 7, line opening and service activation may be performed in accordance with the procedure shown in FIG. 9. In that case, of the steps shown in FIG. 8 and the steps shown in FIG. 7, the operations of the steps having the same numbers are similar to each other.

The configuration of FIG. 7 and the configuration of FIG. 9 in this case may be combined. Specifically, it is a configuration in which a plurality of authentication units and a plurality of OLTs are connected to each other.

The following modified examples may be combined with each other.

Modified Example 1

The authentication unit 14 receives the position information of the terminal 18 at the time when the identification information or the authentication information of the ONU 19 is issued or at the time before or after that time. The authentication unit 14 determines whether or not the received position information is information indicating a position within a predetermined range. When the received position information is information indicating a position within the predetermined range, the authentication unit 14 permits the authentication. Here, the position information may be information based on a global positioning system (GPS) or the like, may be positioning information using radio waves from an antenna, or may be identification information of a router that has been passed through.

Here, as the position information, the position information of the terminal 18 which is easily acquired via a GPS or the like or radio is exemplified, but the position information of the ONU 19 and/or the installation location (e.g., an optical outlet) may be used. In particular, when the position information of the ONU 19 is used, the position information may be transmitted from the ONU to the OLT, and when the installation location is used, the position information may be acquired by associating the information on the installation location with the information such as a tag of a branch fiber and reading the tag of the branch fiber.

If a mobile phone network is used, the function of a circuit switched (CS) domain may be used. A function of coordinated position registration of a packet switched (PS) domain that provides a CS domain and a packet switching function in a 3G line may be used.

The Evolved Packet Core (EPC) is a next-generation mobile communication core network that integrally accommodates a plurality of wireless access such as 3G, Long Term Evolution (LTE), and wireless LAN. Position information provided by the IP Multimedia Subsystem (IMS), which is a communication scheme that realizes multimedia services by integrating services provided by CS, which is a control infrastructure of the EPC, with the Internet technology, such as the Session Initiation Protocol (SIP), may be used.

The cooperative function of position registration of the EPC and a CS system of a "CS Fallback function" that uses the function of a CS domain defined by 3GPP TS23.272 V8.4.0 "Circuit Switched fallback in Evolved Packet System; Stage 2, 2009" or the like, may be diverted. In this case, for example, a Gs reference point may be used, which is an interface for exchanging information between a Mobile Switching Center (MSC; a logical node having a CS function specified by 3GPP)/Visited Location Register (VLR; a logical node that provides a function such as mobility management of a terminal in a database that is positioned between a mobile terminal and a Home Location Register (HLR)/a Home Subscriber Server (HSS) and records and manages subscriber information) and a Serving General Packet Radio Service Support Node (SGSN; a logical node that provides a function such as packet switching and mobility management of a mobile terminal that performs packet communication). Since the position of the ONU 19 can be accurately recognized in accordance with the accuracy of the position information that is used, it is desirable that the accuracy of position information should be accurate enough to be able to identify the position of the terminal 18.

Modified Example 2

The authentication unit 14 determines whether or not the range of the identification information and the authentication information of the ONU 19 is within a predetermined range and permits authentication of the ONU on the basis of the determination result. The predetermined range is, for example, a range including the numbers of a plurality of ONUs. The authentication unit 14 collectively holds information within a predetermined range that includes a plurality of elements. When the on-site worker of the logistics center 300 dispatches the ONU among the ONUs of which identification information (numbers) is held in the authentication unit 14, to the customer premises 400 without confirming the identification information, the identification information (device information) of the ONU does not correspond to the customer information at the time of dispatch. For this reason, the dispatch unit 13 does not have to perform the association between the identification information of the ONU and the customer information. Consequently, the risk of information leakage is reduced. Here, when the information such as the serial number and/or MAC address of the ONU (information that can be acquired by the shipment unit 12) is used as the identification information or the authentication information of the ONU, it suffices that the dispatch unit 13 obtains, from the shipment unit 12, these pieces of information of the ONU 19 that the logistics center 300 procured from the factory 200 (a manufacturer) and the authentication unit 14 holds these pieces of information. For this reason, the man-hours for acquiring the identification information and/or the authentication information for each ONU are also reduced.

Modified Example 3

The authentication unit 14 authenticates the ONU 19 on the basis of the information on the ONU 19 from the terminal 18 or line that is associated with the customer information in advance, and the position information of the terminal 18 at the time when the identification information or the authentication information of the ONU 19 was issued or at a time before or after that time. The position information may be a bar code or a QR code at the installation location (e.g., an optical outlet) of the customer premises 400.

Modified Example 4

The authentication unit 14 authenticates the ONU depending on whether or not the identification information of the ONU 19 acquired from the terminal 18 or line that is associated with the customer information in advance is present in information (numbers) of a predetermined range that includes a plurality of elements, and whether or not the authentication information of the ONU 19 is present in information of a predetermined range.

Modified Example 5

Position information may be issued from the terminal of an off-site worker. In cases "A-1" and "B-1", the authentication unit 14 may authenticate the ONU depending on whether or not the identification information and the authentication information of the ONU are within a predetermined range. The association between the customer information and the identification information may be association between the customer information and the identification information or the authentication information. The output of the customer information (a customer's location, QR) may be dispatch of the customer information described in the written directive and a QR code or a bar code. The dispatch unit 13 and the shipment unit 12 may be the same. At least some of the order reception unit 10, the service order unit 11, the authentication unit 14, and the OLT 15 may be integrated.

A bar code or a QR code may be written in the written directive to the customer or the off-site worker. The terminal 18 may read, at the customer premises 400, the bar code or the QR code described in the written directive and the bar code or the QR code described in the ONU in accordance with an operation by the off-site worker, thereby the line of the ONU 19 may be opened.

The bar code or the QR code may be described in a "written directive (QR) of customer information" dispatched from the service order unit 11 to the customer premises 400. The off-site worker may open the ONU 19 using the bar code or the QR code, if the customer information and the identification information match at the customer premises 400.

Modified Example 6

The authentication unit 14 may generate information using a one-way function on the basis of the identification information or the authentication information of the ONU 19 and the information on the terminal 18 or line that is associated with the customer information in advance. The terminal 18 that is associated with the identification information of the ONU 19 or the customer information in advance may use a one-way function to generate information on the basis of the identification information or the authentication information of the ONU 19 and the information on the terminal 18 or line that is associated with the customer information in advance. The authentication unit 14 may execute authentication on the basis of the generated information. As a result, the authentication unit 14 can reduce the possibility that the identification information or the authentication information of the ONU 19 is read. It should be noted that the authentication unit 14 may add information related to the communication service to the generated information.

An example of the opening is shown above, but the description is also the same for the example of addition, deletion, or change of the communication service, service activation, or service deactivation.

The dispatch unit 13 or the like may generate a different barcode or QR code for each addition, deletion, or change of the communication service and/or for each service activation or service deactivation, and transmit each barcode or QR code. The dispatch unit 13 or the like may generate a different barcode or QR code for each service and transmit the same barcode or QR code to thereby change the bar code or the QR code such as "for addition→for deletion→for addition→ . . . ", "for setting 1→for setting 2→ . . . ", or "for activation→for deactivation→ . . . ".

The terminal 18 may select addition, deletion, change, activation, deactivation, or the like in accordance with the operation on the application and transmit the same barcode or QR code in accordance with the selection result.

As described above, the communication system 1 of the embodiment includes the service order unit 11 or the authentication unit 14 (an acquisition unit), the authentication unit 14, and the controller 20 (a control unit). The service order unit 11 or the authentication unit 14 acquires identification information or authentication information of a device such as the ONU 19, a customer, or a service. When the authentication unit 14 acquires the identification information or the authentication information together with the information that is associated with the customer or the customer's location in advance, or when the authentication unit 14 acquires the identification information or the authentication information from the terminal or the line that is associated with the customer in advance, the authentication unit 14 makes authentication of the device, the customer, or the service to succeed. The controller 20 starts the service for the device that has been successfully authenticated.

Thereby, the communication system (an authentication system) of the embodiment can reduce the operating man-hours of workers of the telecommunications carrier in regard to the service start and the failure repair of the communication system, especially an access system.

In other words, when the communication system has received the unique information of the ONU (e.g., the terminal number of IMEI or MEID etc., the MAC address) from a terminal, a line (a line for which spoofing is difficult, for example, a line of a mobile phone, a line of SMS), or a position that is associated with a customer in advance, the communication system permits the authentication of the ONU.

The service order unit 11 or the authentication unit 14 may acquire the position information of the terminal 18 within a predetermined time range relative to the time when the terminal 18 transmitted the identification information or the authentication information. The authentication unit 14 makes the authentication to succeed when the position information indicates a position within a predetermined range. The authentication unit 14 may make the authentication to succeed when the identification information or the authentication information is included in the information of a predetermined range that includes a plurality of elements.

The communication system 1 includes; the dispatch unit 13 (a preceding stage associating unit), the terminal 18 (a later stage associating unit), the authentication unit 14, and the controller 20 (a control unit). The associating units execute association of a device, a customer, or a service with identification information or authentication information. The authentication unit 14 successfully authenticates the device, the customer, or the service in accordance with the identification information or the authentication information for which association has been executed and the position information of the device. The controller 20 starts the service for the device that has been successfully authenticated.

The communication system 1 may be further provided with a service order unit 11 (a consistency unit) that, when the association is executed both before and after dispatching the device, confirms the consistency between the identification information or the authentication information for which association is executed before dispatch and the identification information or the authentication information for which association is executed after dispatch. The service order unit 11 may associate the device, the customer, or the service with the identification information or the authentication information after dispatching the device. When the association is executed after dispatching the device, the authentication unit 14 may successfully authenticate the device, the customer, or the service in accordance with the identification information or the authentication information for which association has been executed and the position information of the device. When the association is executed both before and after dispatching the device, the authentication unit 14 may successfully authenticate the device, the customer, or the service in accordance with the confirmation result of the consistency, the identification information or the authentication information for which the association has been executed, and the position information of the device.

Thereby, the communication system 1 can permit the authentication of the ONU without registering the unique information of the ONU 19 in the OLT 15 in advance. The communication system 1 can reduce the operating man-hours of the opening work such as associating the unique information of the ONU 19 with the customer information. The communication system 1 can shorten the time required for the opening work. The communication system 1 can reduce the risk of leakage of customer information.

At least one of the dispatch unit 13 and the terminal 18 may execute association of a plurality of devices, customers, or services with the identification information or the authentication information within a predetermined range. The authentication unit 14 may successfully authenticate the device, the customer, or the service when the identification information or the authentication information of the device is identification information or authentication information within a predetermined range.

The communication system includes an acquisition unit that acquires identification information or authentication information, an authentication unit that successfully authenticates a device, a customer, or a service in accordance with the identification information or the authentication information, and position information of the acquisition unit or the device, and a control unit that starts provision of the service for the device or the customer for which authentication has been successfully performed. If appropriate, customer information within a range in which association with authentication information may have been performed, customer information that may have be associated with an authentication information group, or an authentication information group and a customer information group may be used.

Figure 10:
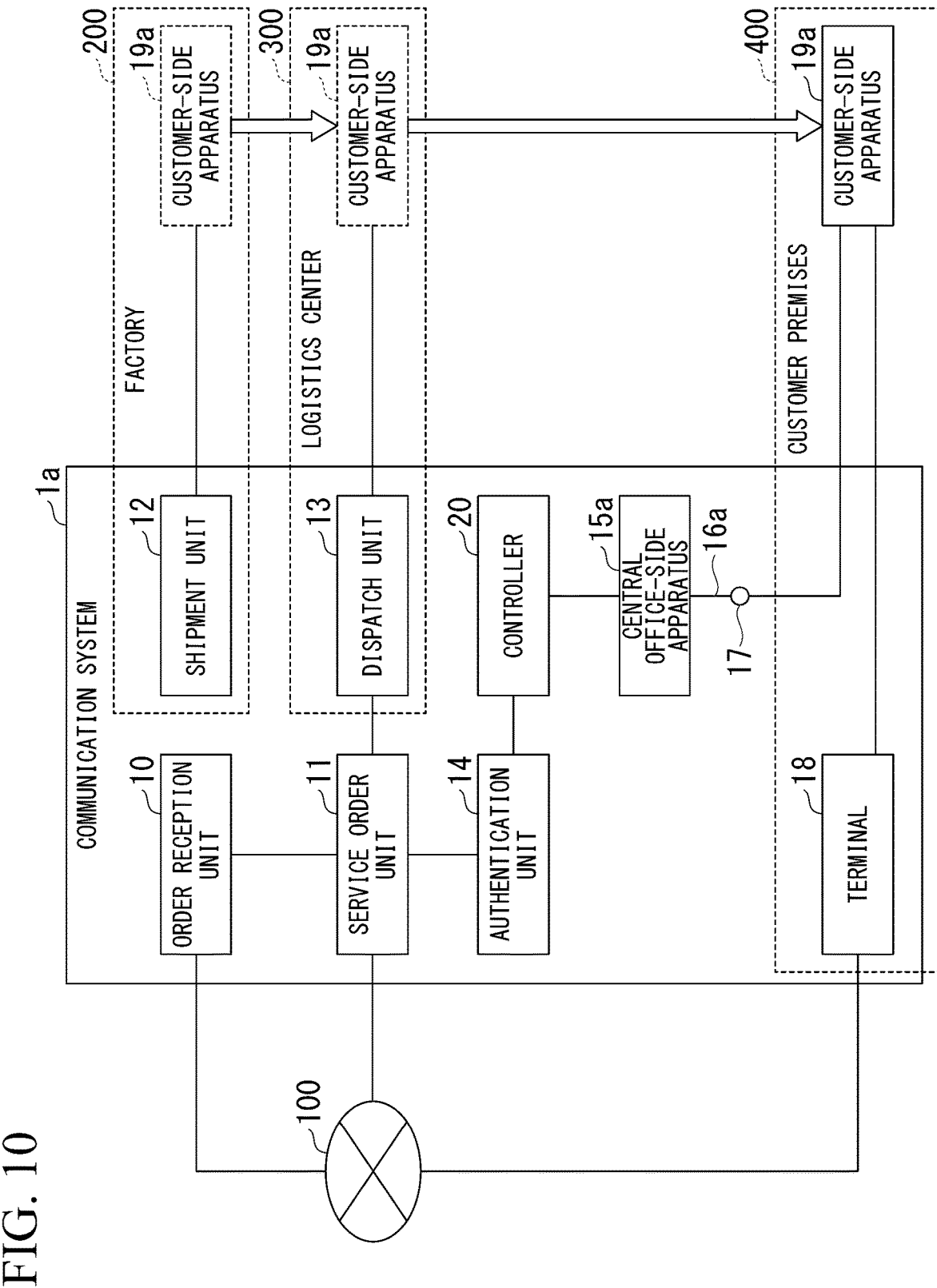
FIG. 10 is a diagram showing a second example of the configuration of a communication system.

FIG. 10 is a diagram showing an example of the configuration of a communication system 1a. The communication system 1a includes; an order reception unit 10, a service order unit 11, a shipment unit 12, a dispatch unit 13, an authentication unit 14, a central office-side apparatus 15a, a line 16a, a terminal 18, and a controller 20. The communication system 1a is a system that authenticates a customer-side apparatus 19a.

The order reception unit 10, the service order unit 11, the shipment unit 12, the dispatch unit 13, the authentication unit 14, the central office-side apparatus 15a, and the controller 20 are information processing apparatuses, such as a server or a control apparatus. The order reception unit 10, the service order unit 11, the shipment unit 12, the dispatch unit 13, the authentication unit 14, and the central office-side apparatus 15a are operated by, for example, a predetermined on-site worker.

The shipment unit 12 is provided in, for example, a factory 200, which manufactures the customer-side apparatus 19a. The dispatch unit 13 is provided in a logistics center 300, which dispatches the customer-side apparatus 19a. The customer-side apparatus 19a dispatched from the logistics center 300 is provided in a customer premises 400. A plurality of customer-side apparatuses 19a may be provided.

Figure 14:
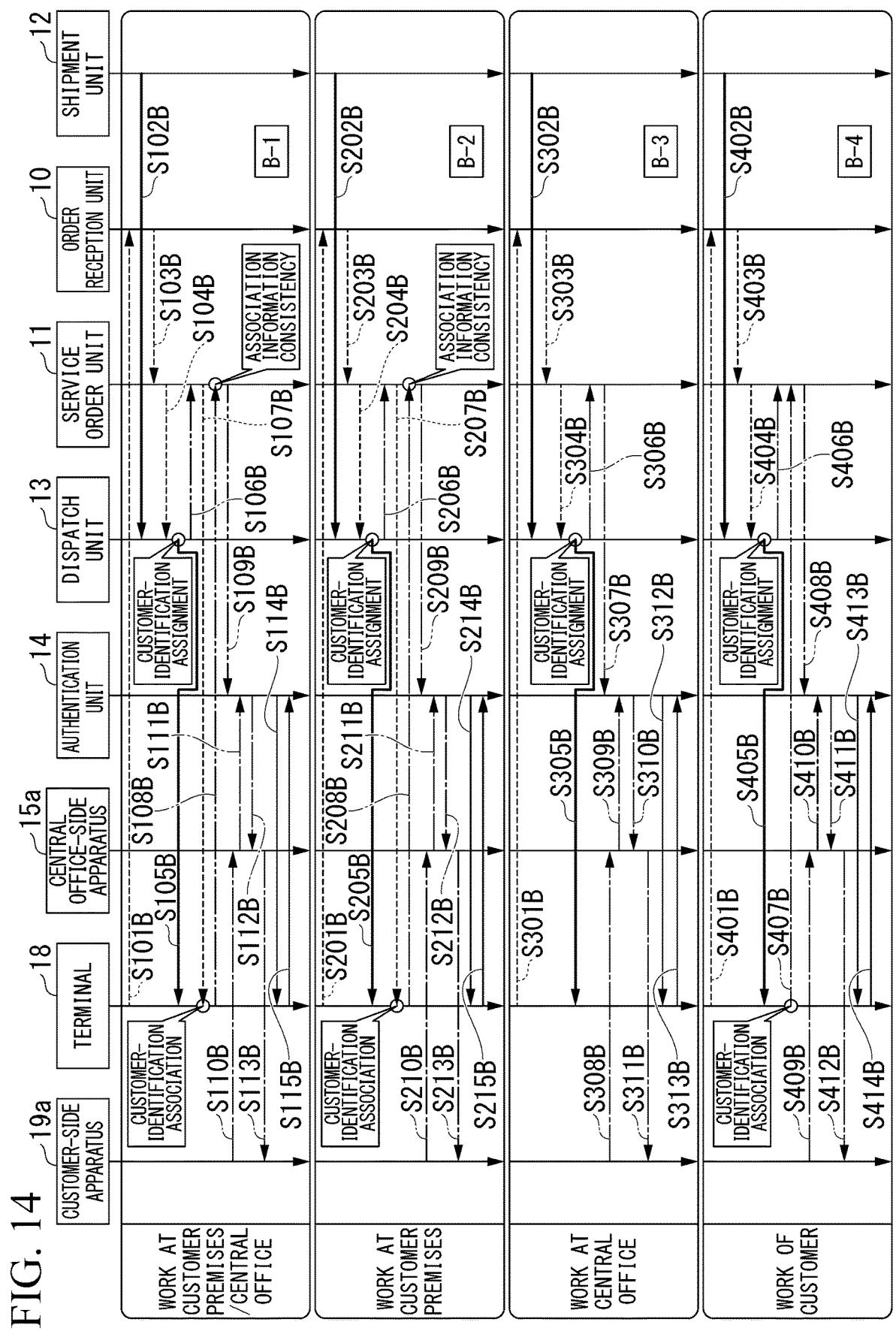
FIG. 14 is a sequence showing an operation of the communication system when identification information or authentication information that is different from the unique identification information assigned to the customer-side apparatus at the time of shipment from the factory is assigned to the customer-side apparatus.
Figure 15:
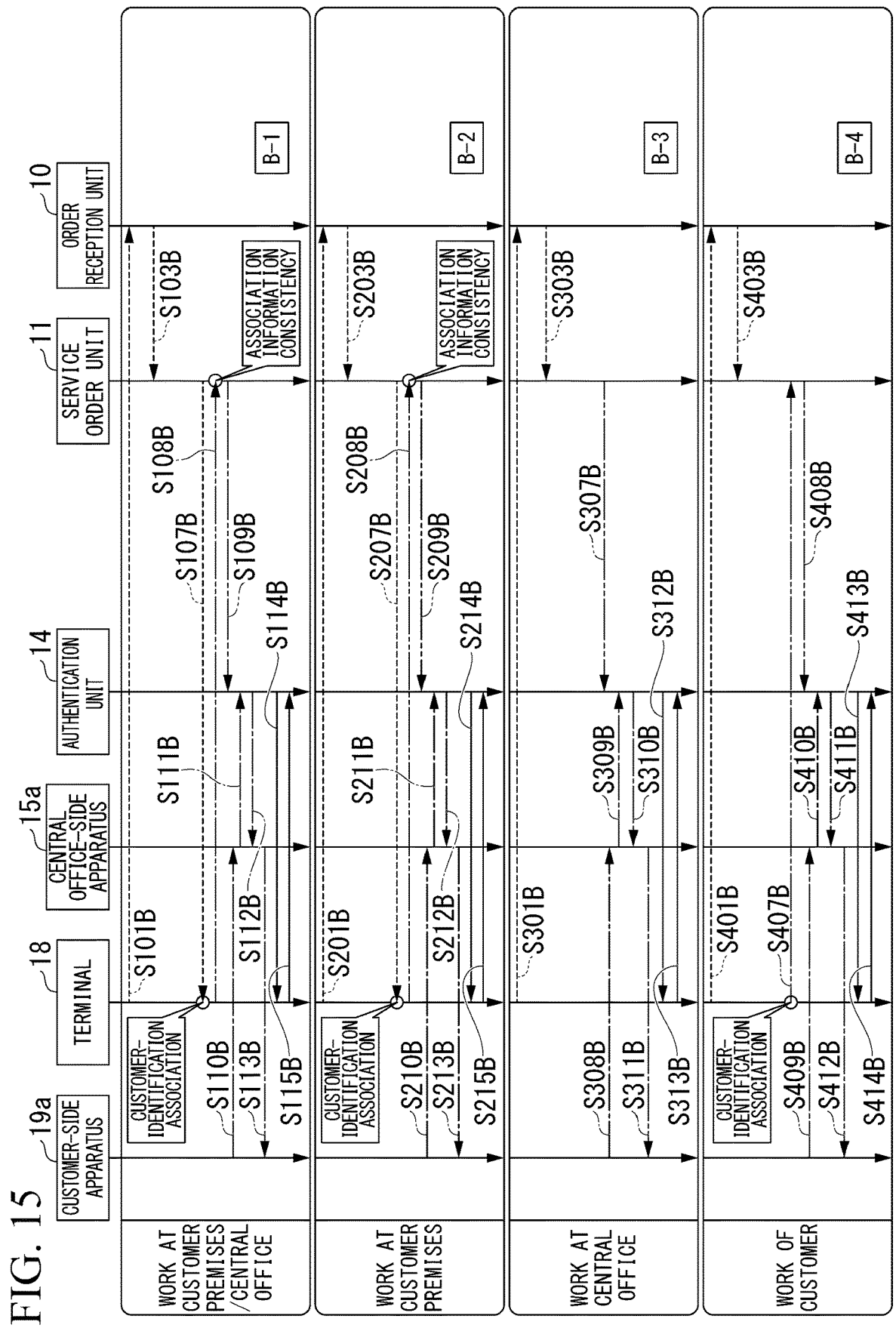
FIG. 15 is a sequence showing an operation of the communication system when identification information or authentication information that is different from the unique identification information assigned to the customer-side apparatus at the time of shipment from the factory is assigned to the customer-side apparatus.
Figure 16:
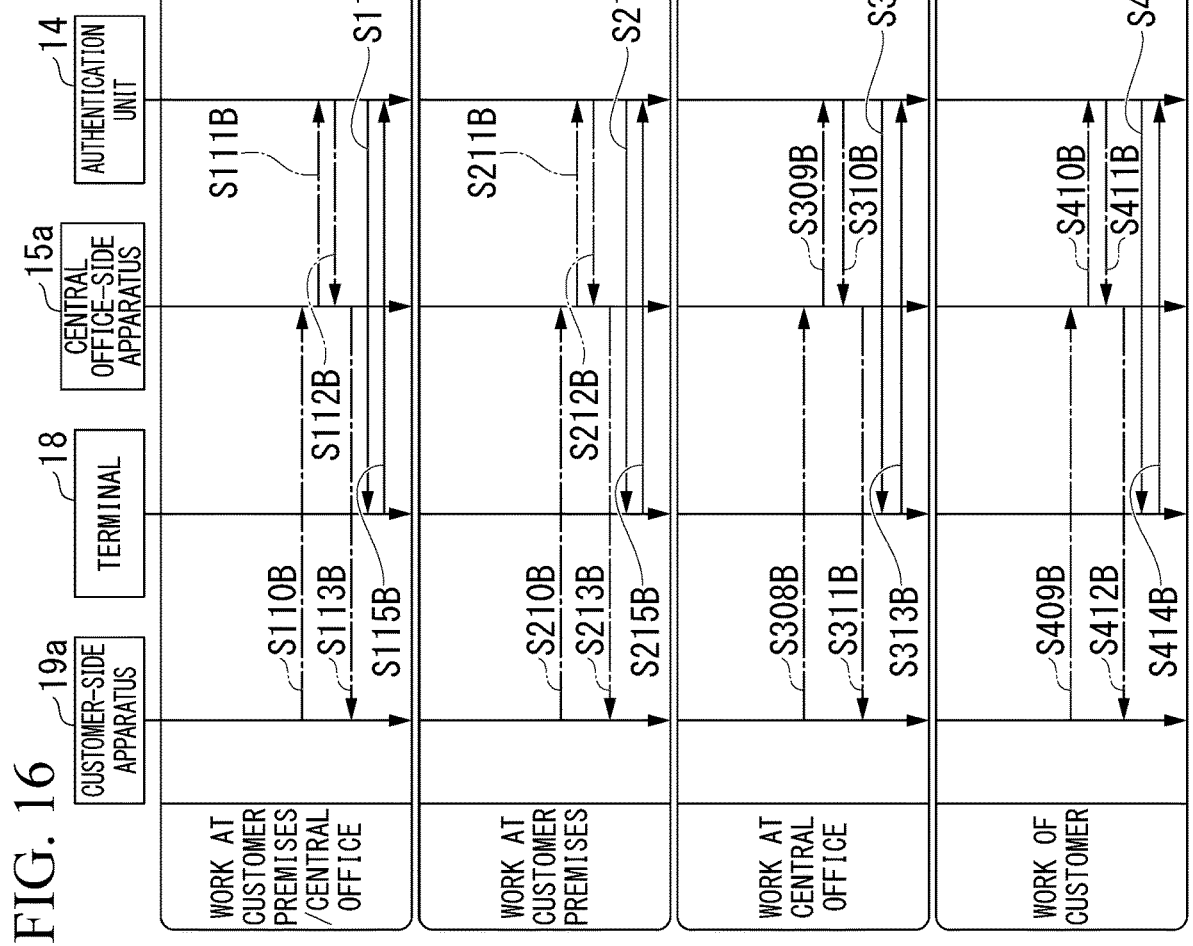
FIG. 16 is a sequence showing an operation of the communication system when identification information or authentication information that is different from the unique identification information assigned to the customer-side apparatus at the time of shipment from the factory is assigned to the customer-side apparatus.

First, the configuration of the communication system 1a will be described for when the communication system Ta executes the operation shown in case "A-4" of FIG. 11, FIG. 12, and FIG. 13 or the operation shown in case "B-4" of FIG. 14, FIG. 15, and FIG. 16.

Figure 11:
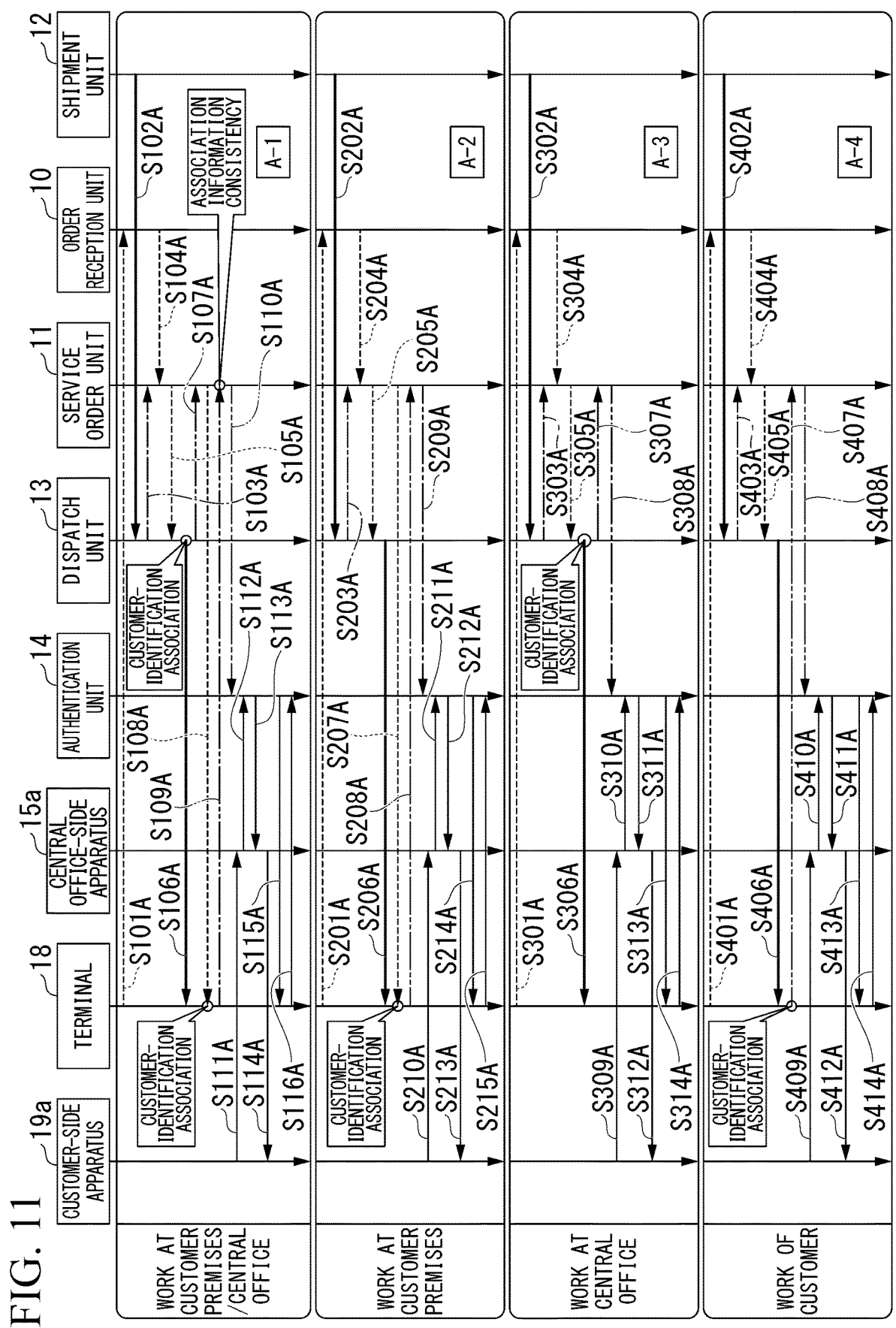
FIG. 11 is a sequence diagram showing an operation of the communication system when the unique identification information or authentication information assigned to the customer-side apparatus at the time of shipment from the factory is used for authentication.
Figure 12:
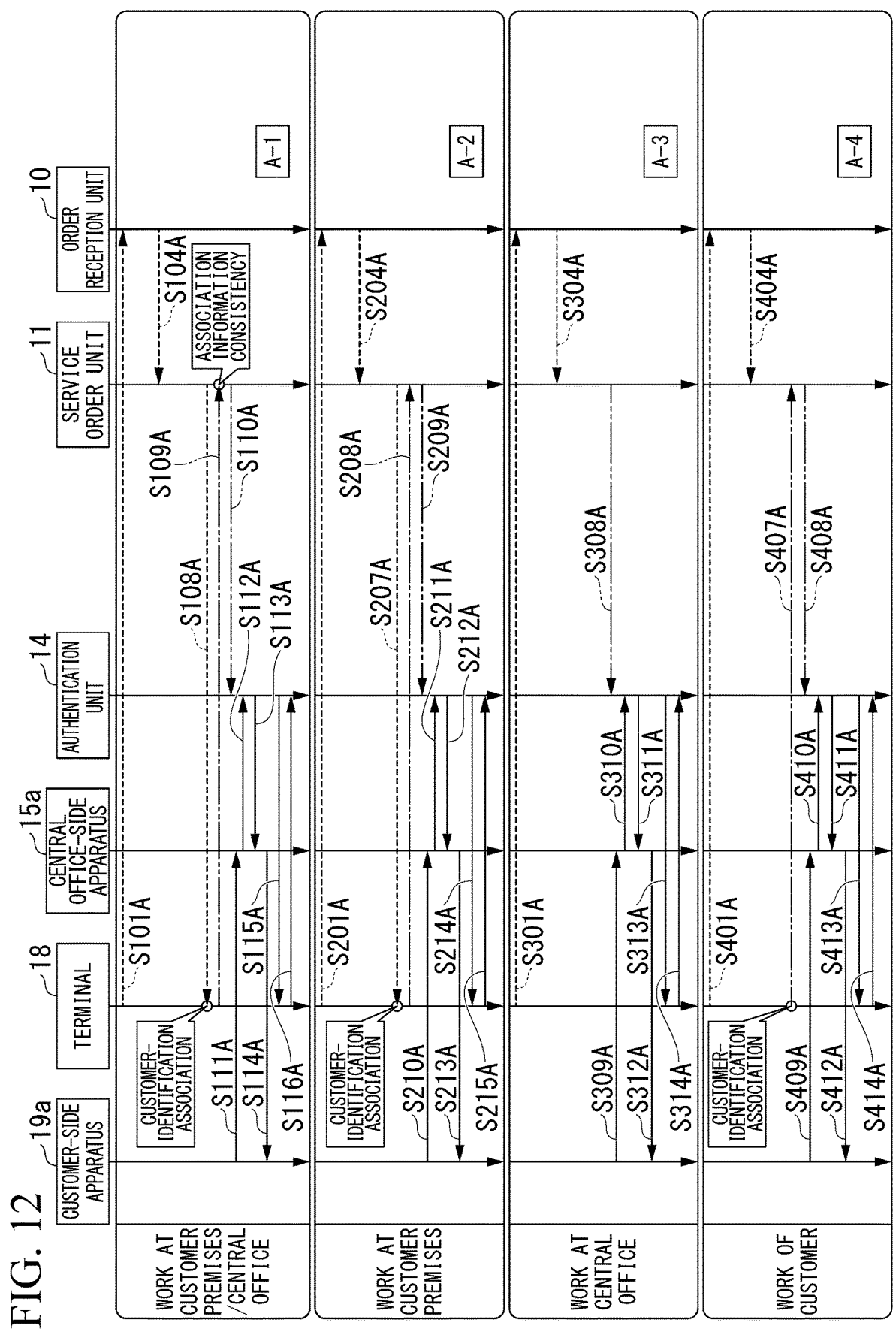
FIG. 12 is a sequence diagram showing an operation of the communication system when the unique identification information or authentication information assigned to the customer-side apparatus at the time of shipment from the factory is used for authentication.
Figure 13:
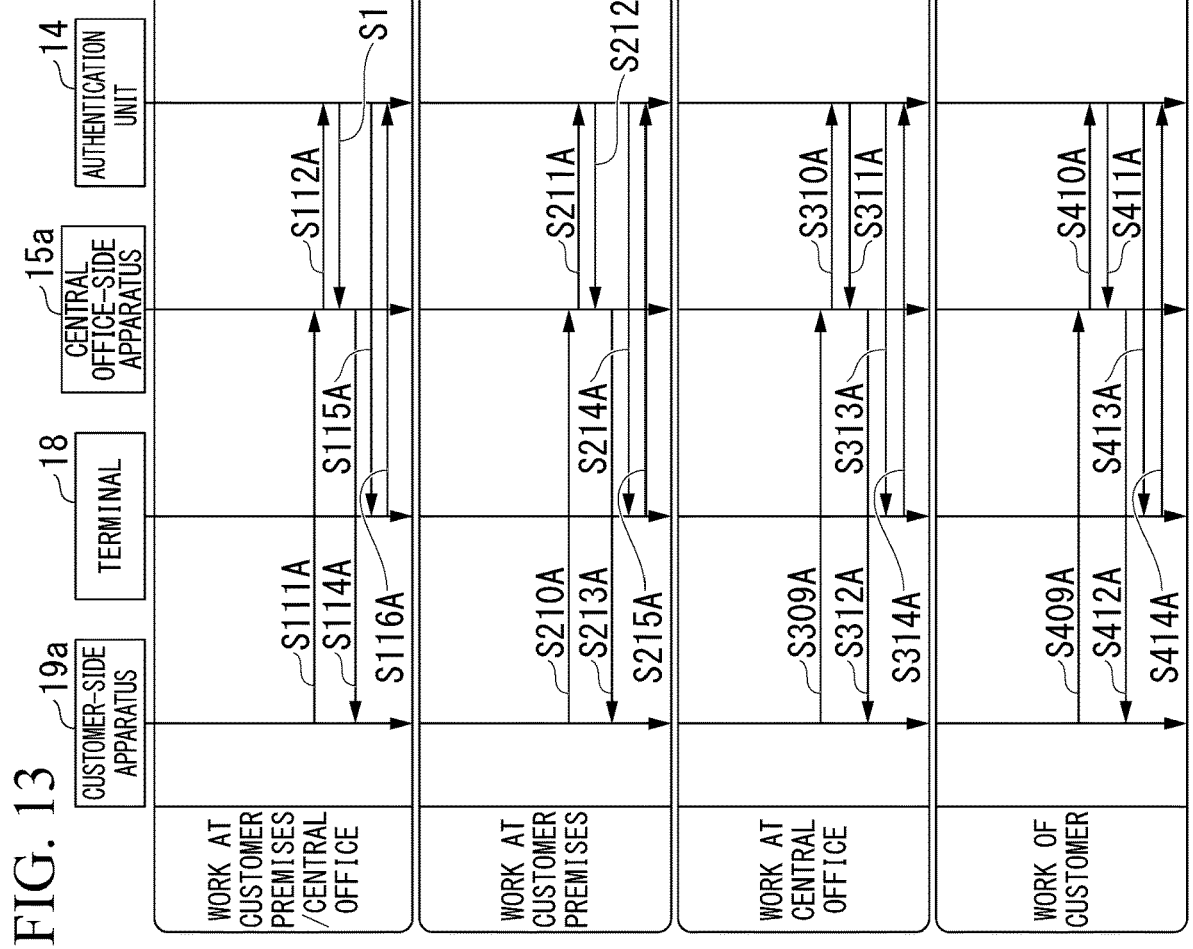
FIG. 13 is a sequence diagram showing an operation of the communication system when the unique identification information or authentication information assigned to the customer-side apparatus at the time of shipment from the factory is used for authentication.

FIG. 11, FIG. 12, and FIG. 13 are sequence diagrams showing an operation of the communication system 1a when identification information or authentication information that is specific to the customer-side apparatus and is assigned at the time of shipment from the factory is used for authentication. In FIG. 11, FIG. 12, and FIG. 13, the vertical arrows from top to bottom indicate the flow of time. The horizontal arrows connecting the vertical arrows indicating the flow of time, indicate the interaction between places or functional units.

In FIG. 11, FIG. 12, and FIG. 13, after the identification information or the authentication information of the device and the information that is associated with the customer or the customer's location in advance are transmitted together, association of the information on the customer or the customer's location with the identification information or the authentication information is executed (hereinafter referred to as "customer-identification association"). The "customer-identification association" is executed after the identification information or the authentication information of the device is transmitted from the terminal or the line that is associated with the customer in advance. For example, in case "A-4", the "customer-identification association" is executed, for example, as the work of the customer. After the "customer-identification association" is executed, the customer-side apparatus requests registration to the central office-side apparatus.

It should be noted that when the customer-side apparatus is registered after authentication based on the "customer-identification association", the timing for the customer-side apparatus to request registration to the central office-side apparatus may be before execution of the "customer-identification association".

It should be noted that the communication system 1a may perform association using at least one of (01) to (24) described above.

The communication system can discriminate the customer and authenticate the device or the like on the basis of the fact that the communication system has received the identification information or the authentication information of the device and the information that is associated with the customer or the customer's location in advance together, or the fact that the communication system has received the identification information or the authentication information of the device from the terminal or the line that is associated with the customer in advance, without registering the identification information or the authentication information of the device in the authentication unit or the central office-side apparatus in association with the customer in advance. For example, when a customer has placed an order for a service, the communication system associates the customer with an identifier such as a telephone number or a serial number of a terminal (a mobile phone, etc.). The communication system receives the identification information or the authentication information of the device from the associated terminal or line. Thereby, the communication system can indirectly associate the identification information or the authentication information of the device with the customer via the associated terminal or line. The communication system associates the identification information or the authentication information of the installation location (e.g., a terminal insertion port) in the form of a QR code or the like with the customer's location in advance. Thereby, the communication system can indirectly associate the identification information or the authentication information of the device with the customer via the associated identification information or authentication information of the installation location.

Here, "received together", "acquires together", and "transmitted together" mean to receive, acquire, or transmit in the same frame or the like, to receive, acquire, or transmit adjacently in time, to receive, acquire, or transmit by processing with the same encryption key, authentication key, or the like. When respective pieces of information are transmitted in different frames or the like, adjacently in time is, for example, the average time of the times required to transmit the respective pieces of information after being acquired, the result obtained by adding the average time to the result obtained by multiplying the variance of the average time by a coefficient, or is a predetermined time (an upper limit time of a predetermined work time, etc.). With respect to the predetermined time, delay variation of frame transmission and the like may be taken into consideration.

It should be noted that the association between the identification information or the authentication information of the device and the customer may be validated if the temporal deviation is small. When a third party visits or sneaks into the customer premises, there is a possibility that the third party will capture information such as a QR code of the device with a camera. When the same device is reconfigured, there is a risk that the communication sent in the past will be intercepted and saved. From the viewpoint of preventing both the information such as a QR code and the information acquired by the off-site worker in the past from being used, it is desirable that information such as a QR code should be encrypted in a format in which the time is specified using TOTP, which is a time-based one-time password, or the like.

The problem that the occurrence of misconnection (misconnection to the terminal insertion port) is difficult to identify can be suppressed by the use of information on the customer's location (information on a terminal insertion port, etc.). This advantageous effect can also be obtained in the same manner even in the embodiments in which position information is used.

The order reception unit 10 receives an order for service opening from a customer. The order reception unit 10 passes order data of the service to the service order unit 11.

The service order unit 11 may instruct the shipment unit 12 to ship the customer-side apparatus 19a in accordance with the order data from the customer (not shown). From the viewpoint of suppressing retention of customer information by making the correspondence between the customer and the customer-side apparatus unknown at the time when one of the plurality of customer-side apparatuses to which the identification information or the authentication information within a predetermined range is assigned is delivered to the customer, it is desirable that either the instruction or the delivery should not be executed for each order. When executed for each order, it is desirable to instruct or ship so that the identification information or the authentication information of the shipped customer-side apparatus is not uniquely determined.

The shipment unit 12 ships the customer-side apparatus 19a to the logistics center 300. The dispatch unit 13 executes a process of dispatching the customer-side apparatus 19a. As a result, the customer-side apparatus 19a is dispatched to the customer premises 400. It should be noted that in order for the service order unit 11 to confirm the consistency between the information from the terminal associated with the customer information and the shipment information, the dispatch unit 13 may acquire the unique identification information of the customer-side apparatus 19a assigned to the customer. The dispatch unit 13 acquires the unique identification information and performs a process to be performed by a consistency unit described later or a process equivalent thereto, thereby the unique identification information is used as material for confirming the consistency of the authentication related to the service start. On the other hand, from the viewpoint of suppressing retention of customer information by making the correspondence between the customer and the customer-side apparatuses unknown when one of the plurality of customer-side apparatuses to which the identification information or the authentication information within a predetermined range is assigned is delivered to the customer, the dispatch unit 13 does not need to acquire the unique identification information.

Here, in case "A-4", the identification information or the authentication information is assigned to the customer-side apparatus at the time of shipment, and thus the shipment unit 12 may pass the assigned identification information or authentication information to the service order unit 11. The dispatch unit 13 may acquire the identification information or the authentication information and pass the acquired identification information or authentication information to the service order unit 11. The dispatch unit 13 passes the identification information or the authentication information and performs the process to be performed by the consistency unit or a process equivalent thereto, thereby the dispatch unit 13 can use the identification information or the authentication information as material for confirming the consistency of the authentication related to the service start. On the other hand, from the viewpoint of suppressing retention of information related to the customer by making the correspondence between the customer and the customer-side apparatus unknown when one of the plurality of customer-side apparatuses to which the identification information or the authentication information within a predetermined range is assigned is delivered to the customer, the identification information or the authentication information does not need to be acquired.

In case "B-4", the identification information or the authentication information used for starting the service is not assigned at the time of shipment, and thus the identification information or the authentication information may be assigned and associated in accordance with the instruction of the service order unit 11. When the identification information, the authentication information itself, or the identification information and the authentication information can be uniquely calculated on the basis of the instruction, the service order unit 11 performs the process to be performed by the consistency unit or a process equivalent thereto, thereby the unique identification information is used as material for confirming the consistency of the authentication related to the service start. On the other hand, from the viewpoint of suppressing retention of customer information by making the correspondence between the customer and the customer-side apparatus unknown when one of the plurality of customer-side apparatuses to which the identification information or the authentication information within a predetermined range is assigned is delivered to the customer, it is desirable that the identification information or the authentication information to be assigned should be information that cannot be uniquely identified within an allowable range. Further, when one of the plurality of customer-side apparatuses to which the identification information or the authentication information within a predetermined range is assigned is delivered to the customer, it is desirable that the identification information or the authentication information within a predetermined range should be information that cannot be uniquely identified within an allowable range. When the identification information or the authentication information is, for example, a MAC address, the allowable range is a range of numbers defined by the manufacturer and/or the model, and is a range excluding already assigned and unusable addresses g. It should be noted that in cases of "B-1" to "B-4", even if some identification information or authentication information is assigned to the customer-side apparatus at the time of shipment, separate identification information or authentication information may be assigned to the customer-side apparatus without using the assigned identification information or authentication information. The associating unit associates the assigned identification information or authentication information with the customer.

The shipment unit 12 may generate identification information or authentication information and pass the generated identification information or authentication information to the service order unit 11. By passing the identification information or authentication information and performing processing to be performed by the consistency unit or a process equivalent thereto, the identification information or the authentication information can be used as material for confirming the consistency of the authentication related to the service start. On the other hand, from the viewpoint of suppressing retention of information related to the customer by making the correspondence between the customer and the customer-side apparatus unknown when one of the customer-side apparatuses provided with the identification information or the authentication information within a predetermined range is delivered to the customer, the identification information or the authentication information does not need to be passed.

At the customer premises 400 (a customer's location), the identification information or the authentication information of the device (a customer-side apparatus, etc.) and the information that is associated with the customer or the customer's location in advance are transmitted together, thereby the identification information or the authentication information of the device is associated with the customer or the customer's location. The identification information or the authentication information of the device (a customer-side apparatus, etc.) is transmitted from the terminal or the line that is associated with the customer in advance, thereby the identification information or the authentication information of the device is associated with the customer or the customer's location. The identification information of the customer-side apparatus may be transmitted from the line that is associated with the customer in advance, thereby the identification information or the authentication information may be associated with the customer or the customer's location. The terminal that is associated with the customer in advance may transmit the information that is associated with the customer or the customer's location in advance.

The device (a customer-side apparatus, etc.) to be associated with the customer may transmit information that is associated with the customer or the customer's location in advance. For example, the information that is associated with the customer or the customer's location in advance is transmitted via the opened line and the device itself (i.e., the line connected to the customer-side apparatus, and the customer-side apparatus), thereby the line or the customer-side apparatus is associated with the customer. The configuration for executing this association corresponds to a configuration for sending the identification information or the authentication information of the customer-side apparatus (a registration request includes normal information related to the customer-side apparatus), and the information that is associated with the customer or the customer's location in advance. For example, when the identification information or the authentication information of the customer-side apparatus or the like is sent at the time of a registration request, information that is associated with the customer or the customer's location in advance may be sent in the same frame as the registration request, in the frame before or after the frame of the registration request, or in the frame after the registration request (the service may be started for trial, generally before service starts, before legitimate service starts).

An already associated line may be used instead of an already associated terminal. The line may be associated at the time of ordering the service or after the order is placed. The line may be associated by using association when placing an order.

The service order unit 11 acquires the identification information or the authentication information of the customer-side apparatus 19a (a device) from the terminal 18 or line that is associated with the customer in advance, to thereby acquire the association information. The service order unit 11 acquires the identification information or the authentication information of the customer-side apparatus 19a (a device) together with the information that is associated with the customer or the customer's location in advance, to thereby acquire the association information. That is, the service order unit 11 may receive the information that is associated with the customer or the customer's location in advance and the identification information of the customer-side apparatus 19a. The service order unit 11 may receive the identification information or the authentication information of the customer-side apparatus 19a from the terminal 18 or line that is associated with the customer in advance. The service order unit 11 may execute both of these reception processes.

It is desirable that information should be transmitted via a relatively secure route (a telephone line, a leased line, a VPN, etc.) so as not to be able to be tampered with and/or eavesdropped, or so as to be able to detect any tampering and/or eavesdropping of information. It is desirable that information cannot be tampered with and/or eavesdropped by using encryption, key information, or the like, or that any tampering and/or eavesdropping can be detected. When a set of information is sent, it is desirable that the set of information should be encrypted. The set of information may be encrypted in a format in which the time is specified, such as in time-based TOTP. From the viewpoint of suppressing replay attacks, it is desirable that the password can be used only once. It is desirable to save the used TOTP for each device or customer ID. When a customer contracts for a plurality of devices and/or services, it is desirable to save as many TOTPs as the number of contracts. The counter-based HOTP may be used.

From the viewpoint of preventing resynchronization from being executed frequently, it is desirable that only a temporal deviation corresponding to the delay variation should be allowed and the device should be synchronized.

The problem that an occurrence of misconnection (misconnection to the terminal insertion port etc.) is difficult to identify can be suppressed by the use of information on the customer's location (information on a terminal insertion port etc.). This advantageous effect can also be obtained in the same manner even in the embodiments in which position information is used. The terminal 18 of the customer transmits information that is associated with the customer or the customer's location in advance, for example, via an opened line and/or the device, to thereby associate the line or the customer-side apparatus with the customer. The configuration for executing this association corresponds to a configuration for sending the identification information or the authentication information of the customer-side apparatus or the like (a registration request includes normal information related to the customer-side apparatus) and the information that is associated with the customer or the customer's location in advance.

When the terminal 18 has been changed after association, the authentication unit 14 needs to acquire the change information of the terminal 18 in order for the authentication unit 14 to correctly authenticate the customer-side apparatus 19a using the identification information of the changed terminal 18. When the terminal 18 has been resold, information on the resale destination of the terminal 18 (resale information) is required. It should be noted that when the position information of the terminal 18 and the identification information of the terminal 18 are combined, the authentication unit 14 can correctly authenticate the customer-side apparatus by using the resale information of the terminal 18.

If the customer frequently changes the contracted telecommunications carrier and the customer has few opportunities to change the terminal 18, it is better to use the identification information of the terminal 18 for authentication. When the customer does not frequently change the contracted telecommunications carrier and the customer has many opportunities to change the terminal 18, it is better to use the identification information of the SIM card for authentication. In particular, when the business operator of the terminal 18 buys and sells the network service and the terminal 18 all together, the SIM card of the terminal 18 is changed less frequently, and thus it is better to use the identification information of the SIM card of the terminal 18 for authentication of the customer-side apparatus 19a. The identification information of the terminal 18 or the line is, for example, identification information stored in the SIM card.

The telecommunications carrier can acquire the identification information by execution of a command such as READ_PHONE_STATE and a permit operation with permission in the terminal 18 in which, for example, Android, which is one of the operating systems, is operating. The identification information of the terminal 18 is, for example, an IMSI representing a maximum 15-digit identification number conforming to the ITU-T E.212 standard.

The identification number stored in the SIM card of the terminal 18 may be a fixed number. The identification number stored in the SIM card may be the SM, the TSM, or the like recorded in "Embedded SIM", "soft SIM", "eUICC", or the like. The identification number stored in the SIM card may be a code (S-TMSI) assigned to identify the terminal in the MME, or an IP address assigned by the MME. The MME is a logical node that accommodates a base station (eNodeB) in a mobile phone network and provides mobility control and the like.

The authentication unit 14 is an apparatus that authenticates a device (the customer-side apparatus 19a, etc.) and authenticates the opening of a service via the authenticated device. The authentication unit 14 receives the identification information or the authentication information of the customer-side apparatus 19a or the like from the service order unit 11. The identification information or the authentication information is information used for authentication. The authentication unit 14 authenticates the customer-side apparatus 19a on the basis of the acquired authentication information. When the service order unit has received together the identification information or the authentication information of the device and the information that is associated with the customer or the customer's location in advance, the authentication unit 14 determines whether or not the device is a legitimate customer-side apparatus and whether or not the service to be opened via the device is a legitimate service on the basis of the information received together by the service order unit. The authentication unit 14 determines whether or not the device is a legitimate customer-side apparatus and whether or not the service to be opened via the device is a legitimate service on the basis of the identification information or the authentication information of the device received by the service order unit from the terminal or the line that is associated with the customer in advance. The authentication unit 14 authenticates the customer-side apparatus 19a (a device), which is an apparatus to be authenticated, and the service to be opened on the basis of the determination result.

The authentication unit 14 has an advantageous effect that authentication can be performed without registering the identification information and the authentication information of the customer-side apparatus 19a in the central office-side apparatus 15a via the controller 20 or the like when the service is ordered.

Upon the authentication by the authentication unit 14, configuration information and software, such as application software or firmware, in accordance with a contract may be downloaded from another apparatus (e.g., the controller of the central office-side apparatus (not shown)) to the central office-side apparatus, the customer-side apparatus directly connected to the line 16*a*, or the customer-side apparatus indirectly connected to the line 16*a* (e.g., a set top box, a gateway, or a customer device). The software may be configured. A startup process or the like may be executed. Management in accordance with the status of the device or a device of the central office-side apparatus connected to that device and the status of the business operator who provides the service, such as OAM, may be performed. Software related to other functions may be downloaded. The authentication unit and/or the DHCP server on the controller-side may dynamically allocate the network address using DHCP or the like. The configuration information may be transmitted to a customer-side apparatus (host) directly connected to the line 16*a* or to a customer-side apparatus indirectly connected to the line 16*a*.

The above system is provided with the order reception unit 10, the service order unit 11, the shipment unit 12, the dispatch unit 13, the authentication unit 14, the controller (not shown) of the central office-side apparatus 15*a*, the central office-side apparatus 15*a*, the line 16*a*, and the terminal 18. Each unit may have a single configuration or a plurality of configurations. For example, the order reception unit 10, the service order unit 11, the authentication unit 14, and the controller of the central office-side apparatus 15*a* may be integrated, and the shipment unit 12 and the dispatch unit 13 may be integrated. The same also applies to "A-1", "A-2", "A-3", "B-1", "B-2", and "B-3".

<ACK is Notified to the Terminal>

FIG. 10 is a diagram showing an example of the configuration of the communication system 1*a*. The communication system 1*a* includes an order reception unit 10, a service order unit 11, a shipment unit 12, a dispatch unit 13, an authentication unit 14, a central office-side apparatus 15*a*, a line 16*a*, a terminal 18, and a controller 20. The communication system 1*a* is a system that authenticates a customer-side apparatus 19*a*.

The shipment unit 12 is provided in, for example, a factory 200, which manufactures the customer-side apparatus 19*a*. The dispatch unit 13 is provided in a logistics center 300, which dispatches the customer-side apparatus 19*a*. The customer-side apparatus 19*a* dispatched from the logistics center 300 is provided in a customer premises 400. A plurality of customer-side apparatuses 19*a* may be provided.

First, the configuration of the communication system 1*a* will be described for when the communication system 1*a* executes the operation shown in case "A-4" of FIG. 11, FIG. 12, and FIG. 13 or the operation shown in case "B-4" of FIG. 14, FIG. 15, and FIG. 16.

FIG. 11, FIG. 12, and FIG. 13 are sequence diagrams showing an operation of the communication system 1*a* when identification information or authentication information that is specific to the customer-side apparatus and is assigned at the time of shipment from the factory is used for authentication.

In each of FIG. 11 to FIG. 16, unlike FIG. 2 or FIG. 3, the terminal 18 or the line used for ordering is notified of the opening. In each of FIG. 11 to FIG. 16, the case in which the terminal 18 is notified is shown as a representative. The authentication unit 14 transmits ACK (notification of opening) to the terminal 18. That is, the authentication unit 14 notifies the terminal 18 that the device, the customer, or the service has been successfully authenticated (step S115A, step S214A, step S313A, step S413A, step S114B, step S214B, step S312B, and step S413B). In FIG. 11 to FIG. 16, the authentication unit 14 notifies of the opening. The service order unit, the order reception unit, or other functional units may notify the terminal or the line of the opening.

Although the terminal is notified of the opening after the opening, the terminal may be notified of the opening either before the opening after association or before the association. Furthermore, it is desirable that the terminal should be able to acknowledge the notification. The terminal 18 transmits an acknowledgement to the authentication unit 14 (step S116A, step S215A, step S314A, step S414A, step S115B, step S215B, step S313B, and step S414B).

The service may be opened if the opening has been approved using the acknowledgement, if there is no acknowledgement of denial, or if there is no acknowledgement within a predetermined period. The opened state may continue if the opening has been approved using the acknowledgement, if there is no acknowledgement of denial, or if there is no acknowledgement within a predetermined period.

The process may be stopped until the opening is approved using the acknowledgement. The process may be stopped until a state in which there is no acknowledgement continues for a predetermined time. The former is particularly suitable for notification after opening. The latter is suitable for notification before association or before opening. The same applies to "A-1", "A-2", "A-3", "B-1", "B-2", and "B-3".

Relocation of a customer-side apparatus or the like that has already been installed is assumed. With respect to the case in which the order is accepted at the time of relocation, first, the configuration of the communication system 1*a* when the communication system 1*a* executes the operation shown in case "A-4" of FIG. 2, FIG. 11, FIG. 12, and FIG. 13 or the operation shown in case "B-4" of FIG. 3, FIG. 14, FIG. 15, and FIG. 16 will be described.

When relocating the customer-side apparatus, there is a case in which an order for relocation is received, a case in which an order for a combination of line closing or line opening and service deactivation is received, and a case in which an order for relocation is not received. From the viewpoint of preventing erroneous relocation, it is desirable to allow relocation only when there is an order for relocation. When a customer easily relocates a customer-side apparatus to a new customer's location with "Do It Yourself", it is desirable that the customer-side apparatus should be relocated by the customer without the communication system receiving an order for relocation.

In either case, if the customer-side apparatus is not replaced, the dispatch unit and the shipment unit do not have to perform the exchange regarding the relocation of the customer-side apparatus. If the order is not accepted at the time of relocation, the order reception unit and the service order unit do not have to perform the exchange regarding the relocation of the customer-side apparatus. In this case, there are almost no differences from A-1 to A-4 (FIG. 13). Further, there are almost no differences from B-1 to B-4 (FIG. 16).

The communication system can discriminate the customer and authenticate the device or the like on the basis of the fact that the identification information or the authentication information of the device and the information that is associated with the customer or the customer's location in advance have been received together, or on the basis of the fact that the identification information or the authentication information of the device has been received from the terminal or the line that is associated with the customer in advance, without registering the identification information or the authentication information of the device in the authentication unit or the central office-side apparatus in association with the customer in advance.

At the time of transfer, closing of the line in use or service deactivation may be executed on the basis of the fact that the identification information or the authentication information of the device and the information that is associated with the customer or the customer's location in advance have been received together. Closing of the line in use or service deactivation may be executed on the basis of the fact that the identification information or the authentication information of the device has been received from the terminal or the line that is associated with the customer in advance.

At the time of transfer, closing of the line in use or service deactivation may be executed and opening of a new line or service activation may be executed on the basis of the fact that identification information or authentication information of the device and the information that is associated with the customer or the customer's location in advance have been received together. Closing of the line in use or service deactivation may be executed and opening of a new line or service activation may be executed on the basis of the fact that the identification information or the authentication information of the device has been received from the terminal or the line that is associated with the customer in advance. Here, when the information that is associated with the customer's location in advance is used, the transfer may be processed only if information on the transfer source is different from information on the transfer destination.

For example, when a customer places an order for a service, the communication system associates the customer with an identifier such as a telephone number or a serial number of a terminal (a mobile phone, etc.). The communication system receives the identification information or the authentication information of the device from the associated terminal or line. Thereby, the communication system can indirectly associate the identification information or the authentication information of the device with the customer via the associated terminal or line. When the device is transferred, the device may be identified on the basis of either the associated information, the line opened in correspondence with the associated information, or the identification information or the authentication information of the device corresponding to the service activated in correspondence with the associated information.

The communication system associates the identification information or the authentication information of the installation location (e.g., a terminal insertion port) in the form of, for example, a QR code, a bar code, or an NFC tag, with the customer's location in advance. The communication system transmits the identification information or the authentication information of the device and the identification information or the authentication information of the installation location (a terminal insertion port, etc.) within a predetermined time. Thereby, the communication system can indirectly associate the identification information or the authentication information of the device with the customer via the identification information or the authentication information of the associated installation location (a terminal insertion port, etc.).

The problem that the occurrence of misconnection (misconnection to the terminal insertion port, etc.) is difficult to identify can be suppressed by the use of information on the customer's location (information on a terminal insertion port, etc.). This advantageous effect can also be obtained in the same manner in the embodiments in which position information is used.

When the order is accepted at the time of relocation, the order reception unit 10 accepts the order for opening the service from the customer. When the identification information or the authentication information transmitted from the terminal or the line that is associated with the customer in advance is associated with the customer, it is desirable that the order reception unit 10 should acquire the order data from the terminal 18, which is a smartphone or the like, via a communication line 100, such as a telephone line or the Internet. In this case, the terminal or the line used for ordering can be associated with the customer.

The result of associating the customer with the terminal or the line may be notified at any time before the service start (e.g., when placing an order). In this case, the service does not need to be ordered using the terminal or the line that is associated with the customer in advance. The order reception unit 10 passes order data of the service to the service order unit 11.

At the customer premises 400 (a customer's location), the identification information or the authentication information of the device (a customer-side apparatus, etc.) and the information that is associated with the customer or the customer's location in advance are transmitted together, thereby the identification information or the authentication information of the device is associated with the customer or the customer's location. The identification information or the authentication information of the device (a customer-side apparatus, etc.) is transmitted from the terminal or the line that is associated with the customer in advance, thereby the identification information or the authentication information of the device is associated with the customer or the customer's location. The identification information of the customer-side apparatus may be transmitted from the line that is associated with the customer in advance, thereby the identification information or the authentication information may be associated with the customer or the customer's location. The terminal that is associated with the customer in advance may transmit the information that is associated with the customer or the customer's location in advance.

The device (a customer-side apparatus, etc.) to be associated with the customer may transmit information that is associated with the customer or the customer's location in advance. For example, the information that is associated with the customer or the customer's location in advance is transmitted via the opened line and the device itself (i.e., a line of a PON and the customer-side apparatus), thereby the line or the customer-side apparatus is associated with the customer. The configuration for executing this association corresponds to a configuration for sending the identification information or the authentication information of the customer-side apparatus or the like (a registration request includes normal information related to the customer-side apparatus) and the information that is associated with the customer or the customer's location in advance. For example, when the identification information or the authentication information of the customer-side apparatus or the like is sent at the time of a registration request, information that is associated with the customer or the customer's location in advance may be sent in the same frame as the registration request, in the frame before or after the frame of the registration request, or in the frame after the registration request (the service may be started for trial, generally before service starts, before legitimate service starts).

An apparatus of an already associated line may be used instead of an already associated terminal. When an order is accepted at the time of relocation, the line may be associated with the customer at the time of ordering the service or after the order is placed. If association is used when placing an order, the line may be associated with the customer.

When the order is accepted at the time of relocation, the service order unit 11 acquires the identification information or the authentication information of the customer-side apparatus 19*a* (a device) from the terminal 18 or line that is associated with the customer in advance, to thereby acquire the information (association information) representing the association of the customer with the identification information or the authentication information. The service order unit 11 acquires the identification information or the authentication information of the customer-side apparatus 19*a* (a device) together with the information that is associated with the customer or the customer's location in advance, to thereby acquire the association information. That is, the service order unit 11 may receive the information that is associated with the customer or the customer's location in advance and the identification information of the customer-side apparatus 19*a*. The service order unit 11 may receive the identification information or the authentication information of the customer-side apparatus 19*a* from the terminal 18 or line that is associated with the customer in advance. The service order unit 11 may execute both of these reception processes. Here, although the identification information or the authentication information is illustrated as the identification information or the authentication information of the customer-side apparatus 19*a*, information related to the service to be started (e.g., identification information or authentication information of a set top box, a gateway, or a customer device) can be used similarly.

It is desirable that information should be transmitted via a relatively secure route (a telephone line, a leased line, a VPN, etc.) so as not to be able to be tampered with and/or eavesdropped, or so as to be able to detect any tampering and/or eavesdropping of information. It is desirable that information cannot be tampered with and/or eavesdropped by using encryption, key information, or the like, or that any tampering and/or eavesdropping of information can be detected. When a set of information is sent, it is desirable that the set of information should be encrypted. The set of information may be encrypted in a format in which the time is specified, such as in time-based TOTP. From the viewpoint of suppressing replay attacks, it is desirable that the password can be used only once. It is desirable to save the used TOTP for each device or customer ID. When a customer contracts for a plurality of devices and/or services, it is desirable to save as many TOTPs as the number of contracts. The counter-based HOTP may be used. From the viewpoint of preventing resynchronization from being executed frequently, it is desirable that only a temporal deviation corresponding to the delay variation should be allowed and the device should be synchronized.

The problem that an occurrence of misconnection (misconnection to a terminal insertion port etc.) is difficult to identify can be suppressed by the use of information on the customer's location (information on a terminal insertion port etc.). This advantageous effect can also be obtained in the same manner even in the embodiments in which position information is used.

The information that is associated with the customer or the customer's location in advance is, for example, identification information of a terminal insertion port installed in the customer premises 400. The identification information of the terminal insertion port is represented by, for example, a one-dimensional code such as a bar code, a two-dimensional code such as a QR code, or an NFC tag. For example, when the communication system 1*a* includes a database in which the identification information of the terminal insertion point is associated with the address, the room number, or the like, the customer and the terminal insertion point are associated with each other on the basis of the information stored in the database. The customer may order the service by operating the already associated terminal 18 (a registered terminal) to input the identification information (customer information) of the terminal insertion port into the order data. The terminal 18 of the customer may read a barcode or a QR code to thereby read the identification information or the authentication information, which is represented in the format of a barcode or a QR code, and transmit the identification information or the authentication information to the service order unit 11. The terminal 18 of the customer may use a device (a customer-side apparatus, etc.) to be associated with the customer to transmit the information that is associated with the customer or the customer's location in advance. The terminal 18 of the customer transmits the information that is associated with the customer or the customer's location in advance, for example, via the opened line and/or the device itself (i.e., a line of a PON and/or a customer-side apparatus), to thereby associate the line or the customer-side apparatus with the customer. The configuration for executing this association corresponds to a configuration for sending the identification information or the authentication information of the customer-side apparatus or the like (a registration request includes normal information related to the customer-side apparatus) and the information that is associated with the customer or the customer's location in advance. For example, when identification information or authentication information of the customer-side apparatus or the like is sent at the time of a registration request, information that is associated with the customer or the customer's location in advance may be sent in the same frame as the registration request, in the frame before or after the frame of the registration request, or in the frame after the registration request (the service may be started for trial, generally before service starts, before legitimate service starts).

The terminal 18 that is associated with the customer in advance is, for example, a mobile terminal, such as a smartphone. The line that is associated with the customer in advance is, for example, a telephone line. It is desirable that this line should be a line for which cell phone spoofing is difficult (a telephone line, an SMS line, etc.). When order data or the like passes through the communication line 100, such as the Internet, it is desirable to make spoofing of the transmitter of the order data or the like difficult, by using a VPN or the like. The identification information of the terminal 18 or line that is associated with the customer in advance (e.g., a telephone number and/or information on the terminal) may be input to the order data as the customer information at the time of ordering the service opening, or may be input to predetermined data as the customer information after ordering the service opening. The identification information of the terminal 18 or line that is associated with the customer in advance may be written in the order data as customer information, by ordering the customer-side apparatus 19*a* through the terminal 18 and/or line that is associated in advance. Here, the identification information of the terminal 18 is, for example, a terminal number such as an international mobile equipment identity (IMEI) or an MEID, or a MAC address.

When the terminal 18 has been changed after association, the authentication unit 14 needs to acquire the change information of the terminal 18 in order for the authentication unit 14 to correctly authenticate the customer-side apparatus 19*a* using the identification information of the changed terminal 18. When the terminal 18 has been resold, information on the resale destination of the terminal 18 (resale information) is required. It should be noted that when the position information of the terminal 18 and the identification information of the terminal 18 are combined, the authentication unit 14 can correctly authenticate the customer-side apparatus by using the resale information of the terminal 18.

The authentication unit 14 is an apparatus that authenticates a device (the customer-side apparatus 19*a*, etc.) and authenticates the opening of a service via the authenticated device. The authentication unit 14 receives the identification information or the authentication information of the customer-side apparatus 19*a* or the like from the service order unit 11. The identification information or the authentication information is information used for authentication. The authentication unit 14 authenticates the customer-side apparatus 19*a* on the basis of the acquired authentication information. When the service order unit has received together the identification information or the authentication information of the device and the information that is associated with the customer or the customer's location in advance, the authentication unit 14 determines whether or not the device is a legitimate customer-side apparatus and whether or not the service to be opened via the device is a legitimate service on the basis of the information received together by the service order unit. The authentication unit 14 determines whether or not the device is a legitimate customer-side apparatus and whether or not the service to be opened via the device is a legitimate service on the basis of the identification information or the authentication information of the device received by the service order unit from the terminal or the line that is associated with the customer in advance. The authentication unit 14 authenticates the customer-side apparatus 19*a* (a device), which is an apparatus to be authenticated, and the service to be opened on the basis of the determination result.

The authentication unit 14 has an advantageous effect that authentication can be performed without registering the identification information and the authentication information of the customer-side apparatus 19*a* in the central office-side apparatus 15*a* via the controller 20 or the like when the service is ordered.

Upon the authentication by the authentication unit 14, configuration information and software, such as application software or firmware, in accordance with a contract may be downloaded from another apparatus (e.g., the controller of the central office-side apparatus (not shown)) to the central office-side apparatus, the customer-side apparatus directly connected to the line 16*a*, or the customer-side apparatus indirectly connected to the line 16*a* (e.g., a set top box, a gateway, or a customer device). The software may be configured. A startup process or the like may be executed. Management such as OAM may be performed in accordance with the status of the device or a device of the central office-side apparatus connected to that device and the status of the business operator who provides the service. Software related to other functions may be downloaded. The authentication unit and/or the DHCP server on the controller-side may dynamically allocate the network address using DHCP or the like. The configuration information may be transmitted to a customer-side apparatus (host) directly connected to the line 16*a* or to a customer-side apparatus indirectly connected to the line 16*a*.

The above system is provided with the order reception unit 10, the service order unit 11, the shipment unit 12, the dispatch unit 13, the authentication unit 14, the controller (not shown) of the central office-side apparatus 15*a*, the central office-side apparatus 15*a*, the line 16*a*, and the terminal 18. Each unit may have a single configuration or a plurality of configurations. For example, the order reception unit 10, the service order unit 11, the authentication unit 14, and the controller of the central office-side apparatus 15*a* may be integrated, or the shipment unit 12 and the dispatch unit 13 may be integrated.

Regarding the transfer position, the communication system may acquire the position information of the terminal or the device within a predetermined time range relative to the time when the terminal or the device transmitted the identification information or the authentication information, and if the position information indicates the position within the predetermined range, may perform the authentication.

Here, the temporal deviation of the time when the transmission was performed from the time when the acquisition was performed by the acquisition unit or the time when the association was performed by the associating unit must be within an allowable range. Within an allowable range is, for example, less than or equal to the time normally required to move from the insertion port of one terminal to the insertion port of another terminal, or from one customer premises to another customer premises. In this setting, the time when the transmission was performed is replaced with the time when the association was performed or the time when the acquisition was performed. That is, when the position information of the terminal or the device is acquired within a predetermined time range relative to the time when the identification information or the authentication information was acquired, and the position information indicates a position within a predetermined range, authentication may be performed and the service may be stared, or when the position information of the terminal or the device is acquired within a predetermined time range relative to the time when the identification information or the authentication information was associated, and the position information indicates a position within a predetermined range, authentication may be performed and the service may be started. The position of the terminal or the device that performed the transmission may be the position of the acquisition unit or the associating unit. It should be noted that even if the identification information or the authentication information of the devices of a plurality of customers is acquired by the terminal of the off-site worker, association can be made by association with the sequential order of the work for each customer and/or the scheduled work time, without using the terminal and/or line that is associated with the customer in advance. In this case, the terminal that has acquired the information cannot directly associate the customer information by itself; however, since it is obtained by acquiring the information necessary for the association (the sequential order, time zone, etc., in which the acquisition is performed), the association is indirectly performed and thus the acquisition is a part of the association. Therefore, the associating unit is configured by an acquisition unit and an authentication unit and/or a service order unit that compare it with the order and/or the time zone. The position of the associating unit in the present example in such a situation is the position of the acquisition unit.

Furthermore, from the viewpoint of not allowing a third party to use the identification information or the authentication information obtained by, for example, capturing a QR code or the like when the third party visits or the third party sneaks into the customer's location, it is desirable to perform encryption in a format in which the time is specified by a time-based TOTP or the like. The execution of the authentication process may be limited in accordance with the number of attempts of the authentication. In addition, it is desirable that it should be used only once from the viewpoint of preventing repeated use similar to replay attacks. A limit based on the number of attempts may be set. To this end, for example, the used TOTP is saved for each device or customer ID. When a plurality of devices correspond to the customer ID, the TOTPs the number of which corresponding to a predetermined number such as the number of contracts may be held, and that number may be set as the upper limit. When the number is reached, the older ones may be invalidated one after another, or when the upper limit is reached or immediately before the upper limit is reached, a notification to that effect may be given to a predetermined contact address, for example, a terminal and/or a line of a customer that is associated. The HOTP, which is a counter-based OTP, may be used.

Regarding TOTP, authentication is exchanged in consideration of delay and delay variation. Synchronization is established at a time shifted by the transmission time statistically processed by means of, for example, the average from the location where TOTP is generated. Alternatively, from the viewpoint of reducing frequent resynchronization, it is desirable to allow a deviation by the delay variation and perform the synchronization.

It should be noted that when the device such as a terminal to be associated is a device such as a customer-side apparatus or a fixed line, position information of the terminal insertion port of the line or the like may be used. In the case of a device such as a customer-side apparatus or a fixed line, it suffices that the position information is within a range of an error expected in installation relative to a predetermined distance from the place of the device or the place where the device is connected.

Moreover, as position information, a history of the position and time over a predetermined time in the past, for example, from the time after the start of the contract until the time when authentication is performed, or from the last use of the line of the terminal, may be saved, and the history may be used if it continues until the time when the authentication is performed. In that case, when the positioning result by radio waves of an artificial satellite is used, the time during which the radio waves of an artificial satellite could not be captured may be excluded, and when the radio waves of a base station are used, the time during which the radio waves of the base station could not be captured may be excluded.

The difference between FIG. 11, FIG. 12, and FIG. 13, and FIG. 2 is that the terminal or the line used for ordering is notified of the opening in FIG. 11, FIG. 12, and FIG. 13. In the figures, the authentication unit 14 performs notification but the service order unit, the order reception unit, or the like may perform notification.

Although the terminal is notified of the opening after the opening, the terminal may be notified of the opening either before the opening after the association or before the association. Furthermore, it is desirable that the terminal should be able to acknowledge the notification. The terminal 18 transmits an acknowledgement to the authentication unit 14.

The service may be opened if the opening has been approved using the acknowledgement, if there is no acknowledgement of denial, or if there is no acknowledgement within a predetermined period. The opened state of the service may be continued if the opening has been approved using the acknowledgement, if there is no acknowledgement of denial, or if there is no acknowledgement within a predetermined period.

The process may be stopped until the opening is approved using the acknowledgement. The process may be stopped until a state in which there is no acknowledgement continues for a predetermined time. The former is particularly suitable for notification after opening. The latter is suitable for notification before association and/or before opening.

In FIG. 11, FIG. 12, and FIG. 13, the terminal or the line used for ordering is notified of the opening. In the figures, the authentication unit 14 performs notification, but the service order unit, the order reception unit, or the like may perform notification. The same applies to "A-1", "A-2", "A-3", "B-1", "B-2", and "B-3".

There is a case in which the functional components and hardware of the communication system are not placed in the same site but are located dispersedly in different sites, and the routes connecting the functional components is not closed in the closed network. In this case, it is desirable that control signals or main signals flowing between the functional components should be exchanged via a secure route. Here, the functions to be dispersedly located include, for example, an order reception unit such as a customer controller for adding, deleting, or modifying a function in accordance with a customer's request, a BoD that changes the bandwidth setting or the like, assignment of a public or private address by Mobile IP and/or a VPN connection, Internet connection or DHCP, or the like, security functions or the like such as SG, NAT, DNS, and CDN, a firewall, virus scanning, or Web filtering, or the like, functions for realizing them, and/or an authentication unit when their services are activated.

The authentication unit, the order reception unit, and respective units of the other functions may each be added or activated each time a new B2B2C middle B business operator or carrier is accommodated, or may each be added or activated each time a customer-side apparatus (an ONU, etc.) is newly accommodated. Each unit may be activated each time a new B2B2C middle B business operator or carrier is accommodated. Each unit may be deleted or deactivated each time a B2B2C middle B business operator or carrier is no longer accommodated, or may be blocked, suspended, deleted, or deactivated each time a customer-side apparatus (an ONU, etc.) is no longer accommodated.

The authentication unit, the order reception unit, and respective units of the other functions may be arranged for each B2B2C middle B business operator or carrier, or may be arranged all together. The authentication unit, the order reception unit, and respective units of the other functions may be arranged for each customer-side apparatus (an ONU, etc.), or may be arranged all together. The arrangement may be timely changed depending on the costs of resources or the like.

Control signals or main signals are sequentially passed between the functional units (an authentication unit, etc.) dispersedly located at different places. After a signal is passed between functional units within a place, the signal is not always passed between functional units within the next place.

A signal may be passed from a functional unit at a certain place to a functional unit at another place, and then the signal may be passed to the same functional unit or another functional unit at the certain place. Under such a situation, it is assumed that the control signal or the main signal is passed between the site-to-site functional units. A site-to-site functional unit is, for example, a router or a switch using Internet Protocol (IP) or the like.

For example, when a signal is to be passed in the order of a functional unit "A1" at place A, a functional unit "B1" at place B, and a functional unit "A2" at place A, there is a risk that the signal or the like is short circuited and passed from the functional unit "A1" at place A to the functional unit "A2" at place A without the signal or the like passing through the functional unit "B1" at place B.

For this reason, the functional unit "A1" at place A and the functional unit "A2" at place A are isolated so that they do not directly pass signals, and then a setting is performed so that the signal is passed between the functional unit "A1" at place A and the functional unit "B1" at place B and the signal is passed between the functional unit "B1" at place B and the functional unit "A2" at place A.

When routers or the like are used, the functional unit "A1" at place A and the functional unit "A2" at place A are respectively connected to different routers or virtual routers.

The functional unit "A1" itself at place A and the functional unit "A2" itself at place A are not directly connected, the router or the virtual router connected to the functional unit "A1" at place A and the router or the virtual router connected to the functional unit "A2" at place A are not directly connected, and the router or the virtual router connected to the functional unit "A1" at place A and the router or the virtual router connected to the functional unit "B1" at place B are connected.

The functional unit "A1" itself at place A and the functional unit "A2" itself at place A are not directly connected, the router or the virtual router connected to the functional unit "A1" at place A and the router or the virtual router connected to the functional unit "A2" at place A are not directly connected, and the router or the virtual router connected to the functional unit "A2" at place A and the router or the virtual router connected to the functional unit "B1" at place B are connected.

When routing is performed, the distance or the value is determined so that the functional unit "A1" at place A and the functional unit "A2" at place A do not directly pass signals.

For example, the distance between the router or the virtual router connected to the functional unit "A1" at place A and the router or the virtual router connected to the functional unit "A2" at place A is set to be shorter than the distance between the router or the virtual router connected to the functional unit "A1" at place A and the router or the virtual router connected to the functional unit "B1" at place B.

For example, the distance between the router or the virtual router connected to the functional unit "A1" at place A and the router or the virtual router connected to the functional unit "A2" at place A is set to be shorter than the distance between the router or the virtual router connected to the functional unit "A2" at place A and the router or the virtual router connected to the functional unit "B1" at place B.

For example, a value for determining a route such as a metric is set to be a value smaller than the value for determining the route between the router or the virtual router connected to the functional unit "A1" at place A and the router or the virtual router connected to the functional unit "B1" at place B.

For example, a value for determining a route such as a metric is set to be a value smaller than the value for determining the route between the router or the virtual router connected to the functional unit "A2" at place A and the router or the virtual router connected to the functional unit "B1" at place B.

A router or a virtual router may be an endpoint of a VPN connection. That is, virtual routers or endpoints of the VPN respectively connected to the functional unit "A1" at place A and the functional unit "A2" at place A are set so that they do not directly communicate with each other, and the functional unit "A1", the functional unit "B1", the functional unit "A2", and the functional unit "B1" are connected by a VPN.

A plurality of virtual routers or VPN endpoints are required when a signal arrives at a function that deploys a certain function from a certain function via a function at another place. The number thereof increases with each loop back. Functions of which correspondent places are different from each other may share a virtual router or an end point of a VPN.

This prevents short circuits in communication between functions at different places. For this reason, different routers or endpoints are placed or generated each time functional units that communicate at places different from each other are placed or generated, and thus communication between routers or endpoints within the same place is suppressed. It should be noted that the functional components that communicate within the same place may be accommodated in the same router or end point.

When the processing proceeds sequentially using the authentication units (approval units) at different sites, there is a problem that the processing takes time by the delay time related to the communication between the sites. Therefore, when there is a request for activation of a predetermined number of customers, devices, or services and signals are exchanged between a predetermined number or more of functional units, it is desirable to process them all together in batch processing. When there is a request for activation of a predetermined number of the same customers, devices, or services and signals are exchanged between a predetermined number or more of functional units, it is desirable to process them all together in batch processing.

The locations where the functional units (an authentication unit, etc.) are arranged may be arranged depending on the availability of the site or the line between the sites. The locations where the functional units (an authentication unit, etc.) are arranged may be arranged depending on the remaining resources, cost, and processing speed. The locations where the functional units are arranged may be changed appropriately. The number of functional units may be scaled in (reduced) or scaled out (increased). The functional units (an authentication unit, etc.) may be dispersedly located or centralized.

Association information may be shared by a plurality of carriers and/or B2B business operators. The result authenticated by the first business operator may be used by the second business operator. This is effective in roaming and the like.

Supplementary Note

One aspect of the present invention is the service start method described above, and in the step in which authentication is made to succeed, position information of the customer, the device, or the terminal is acquired within a predetermined time for acquiring the position information from the time when the terminal transmitted the identification information or the authentication information, and in the step of starting the provision, the service is started when the position information indicates a position within a predetermined range.

This can reduce the possibility that the device will be installed in the wrong place. When a third party visits or sneaks into the customer premises, there is a possibility that the third party will capture information such as a QR code of the device with a camera. From the viewpoint of not allowing the third party to use both the information such as a QR code and the information acquired by the off-site worker in the past, it is desirable that the information such as a QR code should be encrypted in a format in which the time is specified using TOTP or the like. Moreover, from the viewpoint of suppressing replay attacks, it is desirable that the password can be used only once. The communication system saves the used TOTP for each device or customer ID. The communication system may use the HOTP, which is a counter-based OTP. From the viewpoint of preventing resynchronization from being executed frequently, it is desirable that only a temporal deviation corresponding to the delay variation should be allowed and the device should be synchronized.

When a terminal (a customer's mobile phone, etc.) is associated with a device (an ONU, etc.) or a fixed line (an optical line, etc.), the position information of the installation location of the fixed line (e.g., an optical outlet, etc.) may be used for the association. It suffices if the terminal (a customer's mobile phone, etc.) is within a predetermined distance from the location where the device (an ONU, etc.) is connected (the position of an optical outlet, etc.) or the position of the device (an ONU, etc.). Here, the predetermined distance may include an error assumed as an error in the installation position.

The communication system may save a history of position information of the terminal (a customer's mobile phone, etc.) at each time. The history of position information may be used to associate the terminal with the device or the fixed line. For example, the communication system may save a history of position information of the terminal for the time from when the customer ordered a service contract using the terminal to when the device or the like is authenticated. For example, the communication system may save a history of position information of the terminal for the time from when the terminal of the customer last used the line to when the device is authenticated. When radio waves of a satellite, such as those of the global positioning system, are used to measure the position of the terminal, the time during which the radio waves of the satellite could not be captured may be excluded from the time for which the history is to be saved. When radio waves of a base station are used for measuring the position of the terminal, the time when the radio waves of the base station could not be captured may be excluded from the time for which the history is to be saved.

One aspect of the present invention is the service start method described above, and in the step in which authentication is made to succeed, authentication of the device, the customer, or the service is made to succeed when the identification information or the authentication information is included in information within a predetermined range including a plurality of elements. As a result, the communication system makes the association information of the device and the customer unknown until the time when dispatching of the device is requested. The communication system can facilitate the protection of personal information. The communication system can reduce the possibility that the devices other than the dispatched device will be used for authentication.

One aspect of the present invention is a communication system that includes: an acquisition unit that acquires identification information or authentication information of a device, a customer, or a service; an authentication unit that makes authentication of the device, the customer, or the service to succeed when the identification information or the authentication information has been acquired together with information that is associated with the customer or the customer's location in advance, or when the identification information or the authentication information has been acquired from a terminal or a line that is associated with the customer or the customer's location in advance; and a control unit that starts provision of the service for the device or the customer for which the authentication has succeeded.

Thereby, the communication system can discriminate the customer and authenticate the device or the like on the basis of the fact that both the identification information or the authentication information of the device and the information that is associated with the customer or the customer's location in advance have been received, without registering the identification information or the authentication information of the device in association with the customer in advance. The communication system can discriminate the customer and authenticate the device or the like on the basis of the fact that the identification information or the authentication information of the device has been received from the terminal or the line that is associated with the customer in advance, without registering the identification information or the authentication information of the device in association with the customer in advance. For example, when a service is ordered, the communication system associates the customer with a telephone number or a serial number of a terminal (a mobile phone, etc.) or an identifier of a line or the like. The communication system receives the identification information or the authentication information of the device from the associated terminal or line. Thereby, the communication system can indirectly associate the identification information or the authentication information of the device with the customer via the associated terminal or line. The communication system associates the identification information or the authentication information of the installation location (e.g., a QR code) with the customer's location in advance. The communication system transmits the identification information or the authentication information of the device and the identification information or the authentication information of the installation location within a predetermined time. Thereby, the communication system can indirectly associate the identification information or the authentication information of the device with the customer via the identification information or the authentication information of the associated installation location.

One aspect of the present invention is the communication system described above, and the acquisition unit acquires the position information of the customer, the device, or the terminal within a predetermined time for acquiring the position information, from the time when the terminal transmitted the identification information or the authentication information, and if the position information indicates a position within a predetermined range, the authentication unit makes authentication of the device, the customer, or the service to succeed.

This can reduce the possibility that the device will be installed in the wrong place. When a third party visits or sneaks into the customer premises, there is a possibility that the third party will capture information such as a QR code of the device with a camera. From the viewpoint of not allowing the third party to use both the information such as a QR code and the information acquired by the off-site worker in the past, it is desirable that the information such as a QR code should be encrypted in a format in which the time is specified using TOTP or the like. Moreover, from the viewpoint of suppressing replay attacks, it is desirable that the password can be used only once. The communication system saves the used TOTP for each device or customer ID. The communication system may use the HOTP, which is a counter-based OTP. From the viewpoint of preventing resynchronization from being executed frequently, it is desirable that only a temporal deviation corresponding to the delay variation should be allowed and the device should be synchronized.

One aspect of the present invention is the communication system described above, and the authentication unit makes authentication of the device, the customer, or the service to succeed if the identification information or the authentication information is included in information within a predetermined range including a plurality of elements. As a result, the communication system makes the association information of the device and the customer unknown until the time when dispatching of the device is requested. The communication system can facilitate the protection of personal information. The communication system can reduce the possibility that the devices other than the dispatched device will be used for authentication.

One aspect of the present invention is the communication system described above, an associating unit that associates the device, the customer, or the service with the identification information or the authentication information is further provided, and the authentication unit makes authentication of the device, the customer, or the service to succeed in accordance with the identification information or the authentication information for which the association has been executed.

Thereby the communication system has an advantageous effect of making it easy to prevent erroneous delivery and/or pilferage of devices.

One aspect of the present invention is the communication system described above, a consistency unit (e.g., the service order unit 11, the dispatch unit 13, etc.) for confirming consistency between the identification information or the authentication information associated with the device before dispatch is further provided, and the identification information or the authentication information associated with the device after dispatch and the authentication unit makes authentication of the device, the customer, or the service to succeed in accordance with a confirmation result of the consistency.

Thereby, the communication system has an advantageous effect of making it easy to prevent erroneous delivery and/or pilferage of devices.

One aspect of the present invention is the communication system described above, and the authentication unit notifies the terminal that the device, the customer, or the service has been successfully authenticated.

One aspect of the present invention is the communication system described above, and the authentication unit makes the authentication of relocation of the device, the customer, or the service to succeed when the authentication unit has acquired the identification information or the authentication information together with the information that is associated with the customer in advance, the information that is associated with the customer's location in advance, or the information that is associated with a customer's location (a relocation destination) different from the customer's location before relocation in advance, or when the authentication unit has acquired the identification information or the authentication information from a terminal or a line that is associated with the customer in advance, from a terminal or a line that is associated with the customer's location in advance, or from a terminal or a line that is associated with a customer's location (a relocation destination) different from the customer's location before relocation in advance.

Although embodiments of the present invention has been described in detail above with reference to the drawings, the specific configuration is not limited to these embodiments, and includes designs and the like within a scope not departing from the gist of the present invention.

Each functional unit of the communication system in the above-described embodiments may be realized by a computer. In that case, each functional unit may be realized by recording a program for realizing functions in a computer-readable recording medium and reading and executing the program recorded in this recording medium by a computer system. It should be noted that the "computer system" mentioned here includes an OS and/or hardware such as peripheral devices. Further, the "computer-readable recording medium" refers to a portable medium such as a flexible disk, a magneto-optical disk, a ROM, a CD-ROM, or a storage apparatus such as a hard disk built into a computer system. Further, the "computer-readable recording medium" may include one that holds a program dynamically for a short time such as a communication line when transmitting the program through a network such as the Internet or a communication line such as a telephone line, and one that holds a program for a certain period of time like a volatile memory inside a computer system that serves as a server and/or a client in that case. Further, the program may be one for realizing some of the functions described above, or may be one that can realize the functions described above in combination with a program already recorded in the computer system. It may be realized as hardware including an electronic circuit (circuitry) using a field programmable gate array (FPGA) or the like.

INDUSTRIAL APPLICABILITY

The present invention can be applied to an apparatus and a communication system that authenticate devices such as ONUs.

DESCRIPTION OF REFERENCE SYMBOLS

1 Communication system
1*a* Communication system
10 Order reception unit
11 Service order unit
12 shipment unit
13 Dispatch unit
14 Authentication unit
15 OLT
15*a* Central office-side apparatus
16 Optical fiber
16*a* Line
17 Optical branch network
18 Terminal
19 ONU
19*a* Customer-side apparatus
20 Controller
100 Communication line
150 OLT
190 ONU
200 Factory 300 Logistics center
400 Customer premises

The invention claimed is:

1. A service start method executed by a communication system, the service start method comprising:
    acquiring identification information or authentication information of a device, a customer, or a service;
    wherein the customer is associated with an identifier of a terminal different from the device, or an identifier of a line when accepting an order for opening the service from the customer,
    making authentication of the device, the customer, or the service to succeed by associating the customer with the identification information or the authentication information, when the identification information or the authentication information has been acquired from the terminal indicated by the identifier of the terminal associated with the customer, or acquired from the line indicated by the identifier of the line associated with the customer; and
    starting provision of the service for the device or the customer for which the authentication has succeeded.

2. The service start method according to claim 1, wherein in the making authentication to succeed, the authentication of the device, the customer, or the service is made to succeed when the identification information or the authentication information has been acquired from the terminal or the line that is associated in advance with the customer, the customer's location, or the service, and the identification information or the authentication information acquired together with the information that is associated in advance or the identification information or the authentication information acquired from the terminal or the line is included in information of a predetermined range including a plurality of elements.

3. The service start method according to claim 2, wherein the predetermined range including a plurality of elements is a range including two or more pieces of the identification information or the authentication information of the device.

4. The service start method according to claim 2, wherein in the making authentication to succeed, position information of the customer, the device, or the terminal is acquired within a predetermined time for acquiring the position information from a time when the terminal or the line transmitted the identification information or the authentication information, and
    in the starting the provision, the service is started when the position information indicates a position within a predetermined range.

5. The service start method according to claim 1, wherein in the making authentication to succeed, position information of the customer, the device, or the terminal is acquired within a predetermined time for acquiring the position information from a time when the terminal or the line transmitted the identification information or the authentication information, and
    in the starting the provision, the service is started when the position information indicates a position within a predetermined range.

6. The service start method according to claim 1, wherein the identification information or authentication information is not transmitted to the device or the customer.

7. A communication system comprising:
    one or more processors and/or one or more circuitries configured to perform as:
    an acquisition unit that acquires identification information or authentication information of a device, a customer, or a service;
    wherein the customer is associated with an identifier of a terminal different from the device, or an identifier of a line when accepting an order for opening the service from the customer,
    an authentication unit that makes authentication of the device, the customer, or the service to succeed by associating the customer with the identification information or the authentication information, when the identification information or the authentication information has been acquired from the terminal indicated by the identifier of the terminal associated with the customer, or acquired from the line indicated by the identifier of the line associated with the customer; and
    a control unit that starts provision of the service for the device or the customer for which the authentication has succeeded.

8. The communication system according to claim 7, wherein the authentication unit makes the authentication of the device, the customer, or the service to succeed when the identification information or the authentication information has been acquired from the terminal or the line that is associated in advance with the customer, the customer's location, or the service, and the identification information or the authentication information acquired together with the information that is associated in advance, or the identification information or the authentication information acquired from the terminal or the line is included in information of a predetermined range including a plurality of elements.

9. The communication system according to claim 7, wherein the acquisition unit acquires position information of the customer, the device, or the terminal within a predetermined time for acquiring the position information from a time when the terminal or the line transmitted the identification information or the authentication information, and
    the authentication unit makes the authentication of the device, the customer, or the service to succeed when the position information indicates a position within a predetermined range.

10. The communication system according to claim 7, wherein the one or more processors and/or the one or more circuitries further configured to perform as an associating unit that executes association of the device, the customer, or the service with the identification information or the authentication information,
    wherein the authentication unit makes the authentication of the device, the customer, or the service to succeed in accordance with the identification information or the authentication information for which the association has been executed.

11. The communication system according to claim 10, wherein the one or more processors and/or the one or more circuitries further configured to perform as a consistency unit that confirms consistency between the identification information or the authentication information associated before acquisition in the acquisition unit and the identification information or the authentication information associated after the acquisition in the acquisition unit,
    wherein the authentication unit makes the authentication of the device, the customer, or the service to succeed in accordance with a confirmation result of the consistency.

12. The communication system according to claim 7, wherein the authentication unit notifies the terminal or the line that the authentication of the device, the customer, or the service has been attempted.

13. The communication system according to claim 7, wherein the authentication unit makes authentication of relocation of the device, the customer, or the service to succeed when the identification information or the authentication information together with information that is associated with a customer's location different from the customer's location in advance have been acquired, or when the identification information or the authentication information has been acquired from a terminal or a line that is associated with the customer in advance, from a terminal or a line that is associated with the customer's location in advance, or from a terminal or a line that is associated with the customer's location different from the customer's location in advance.

14. A service start method executed by a communication system, the service start method comprising:
  acquiring identification information or authentication information of a device, a customer, or a service;
  wherein the customer is associated with an identifier of a terminal different from the device, or an identifier of a line when accepting an order for opening the service from the customer,
  making authentication of the device, the customer, or the service to succeed by associating the customer with the identification information or the authentication information, when the identification information or the authentication information and information indicating the identifier of the terminal or the line have been acquired together; and
  starting provision of the service for the device or the customer for which the authentication has succeeded.

15. A service start method executed by a communication system, the service start method comprising:
  acquiring identification information or authentication information of a device, a customer, or a service;
  wherein the customer is associated with an identifier of a line,
  making authentication of the device, the customer, or the service to succeed by associating the customer with the identification information or the authentication information when the identification information or the authentication information and information indicating the identifier of the line have been acquired together; and
  starting provision of the service for the device or the customer for which the authentication has succeeded.

16. The service start method according to claim 15, wherein the identifier of the line is a contractor number of the line.

17. The service start method according to claim 15, wherein the customer is associated with an identifier of a line when accepting an order for opening the service from the customer.

18. A service start method executed by a communication system, the service start method comprising:
  acquiring identification information or authentication information of a device, a customer, or a service;
  wherein the customer is associated with an identifier of a line,
  making authentication of the device, the customer, or the service to succeed by associating the customer with the identification information or the authentication information, when the identification information or the authentication information has been acquired from the line indicated by the identifier associated with the customer; and
  starting provision of the service for the device or the customer for which the authentication has succeeded.

19. A communication system comprising:
  one or more processors and/or one or more circuitries configured to perform as:
  an acquisition unit that acquires identification information or authentication information of a device, a customer, or a service;
  wherein the customer is associated with an identifier of a line,
  an authentication unit that makes authentication of the device, the customer, or the service to succeed associating the customer with the identification information or the authentication information, when the identification information or the authentication information has been acquired from the line indicated by the identifier of the line associated with the customer; and
  a control unit that starts provision of the service for the device or the customer for which the authentication has succeeded.

* * * * *